US007424677B2

(12) United States Patent
Sezan et al.

(10) Patent No.: US 7,424,677 B2
(45) Date of Patent: Sep. 9, 2008

(54) AUDIOVISUAL INFORMATION MANAGEMENT SYSTEM WITH USAGE PREFERENCES

(75) Inventors: Muhammed Ibrahim Sezan, Camas, WA (US); Petrus Van Beek, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 762 days.

(21) Appl. No.: 10/977,716

(22) Filed: Oct. 28, 2004

(65) Prior Publication Data

US 2005/0091165 A1 Apr. 28, 2005

Related U.S. Application Data

(63) Continuation of application No. 09/541,447, filed on Mar. 31, 2000, now abandoned.

(60) Provisional application No. 60/154,388, filed on Sep. 16, 1999.

(51) Int. Cl.
*G06F 3/00* (2006.01)
*G06F 3/14* (2006.01)
*H04N 7/173* (2006.01)

(52) U.S. Cl. ............... 715/719; 715/716; 715/747; 725/37; 725/46

(58) Field of Classification Search ............... 715/716, 715/719, 727, 733, 738, 741, 744, 745, 747; 725/37, 44, 46, 47, 53
See application file for complete search history.

(56) References Cited

U.S. PATENT DOCUMENTS

| 4,183,056 A | 1/1980 | Evans et al. |
| 4,253,108 A | 2/1981 | Engel |
| 4,298,884 A | 11/1981 | Reneau |
| 4,321,635 A | 3/1982 | Tsuyugychi |
| 4,324,402 A | 4/1982 | Klose |
| 4,520,404 A | 5/1985 | Von Kohorn |

(Continued)

FOREIGN PATENT DOCUMENTS

EP 0 854 645 7/1998

(Continued)

OTHER PUBLICATIONS

Ehrmantraut, Harder, Wittig & Steinmatz, "The Personal Electronic Program Guide—Towards the Pre-selection of Individual TV Programs," Proceedings of the International Conference on Information and Knowledge Management CIKM, ACM, New York, NY, US, Nov. 12, 1996, pp. 243-250.

(Continued)

*Primary Examiner*—X. L Bautista
(74) *Attorney, Agent, or Firm*—Chernoff, Vilhauer, McClung & Stenzel

(57) ABSTRACT

A method of using a system with at least one of audio, image, and a video comprises a plurality of frames comprising the steps of providing a usage preferences description where the usage preference description includes at least one of a browsing preferences description, a filtering preferences description, a search preferences description, and a device preferences description. A usage history description is provided where the usage preference description includes at least one of a browsing history description, a filtering history description, a search history description, and a device usage history description. The usage preferences description and the usage history description are used to enhance system functionality.

7 Claims, 24 Drawing Sheets

U.S. PATENT DOCUMENTS

| | | | |
|---|---|---|---|
| 4,729,044 A | 3/1988 | Kiesel | |
| 4,937,685 A | 6/1990 | Barker et al. | |
| 5,012,334 A | 4/1991 | Etra | |
| 5,027,400 A | 6/1991 | Baji et al. | |
| 5,101,364 A | 3/1992 | Davenport et al. | |
| 5,109,482 A | 4/1992 | Bohrman | |
| 5,148,154 A | 9/1992 | MacKay et al. | |
| 5,200,825 A | 4/1993 | Perine | |
| 5,222,924 A | 6/1993 | Shin et al. | |
| 5,223,924 A | 6/1993 | Strubbe | |
| 5,241,671 A | 8/1993 | Reed et al. | |
| 5,288,069 A | 2/1994 | Matsumoto | |
| D348,251 S | 6/1994 | Hendricks | |
| 5,333,091 A | 7/1994 | Iggulden et al. | |
| 5,339,393 A | 8/1994 | Duffy et al. | |
| D354,059 S | 1/1995 | Hendricks | |
| 5,381,477 A | 1/1995 | Beyers, II et al. | |
| 5,404,316 A | 4/1995 | Klingler et al. | |
| 5,410,344 A | 4/1995 | Graves et al. | |
| 5,424,770 A | 6/1995 | Schmelzer et al. | |
| 5,434,678 A | 7/1995 | Abecassis | |
| 5,444,499 A | 8/1995 | Saitoh | |
| 5,452,016 A | 9/1995 | Ohara et al. | |
| 5,483,278 A | 1/1996 | Strubbe et al. | |
| D368,263 S | 3/1996 | Hendricks | |
| 5,521,841 A | 5/1996 | Arman et al. | |
| 5,550,965 A | 8/1996 | Gabbe et al. | |
| 5,559,549 A | 9/1996 | Hendricks et al. | |
| 5,589,945 A | 12/1996 | Abecassis | |
| 5,600,364 A | 2/1997 | Hendricks et al. | |
| 5,600,573 A | 2/1997 | Hendricks et al. | |
| 5,600,781 A | 2/1997 | Root et al. | |
| 5,610,653 A | 3/1997 | Abecassis | |
| 5,634,849 A | 6/1997 | Abecassis | |
| 5,635,982 A | 6/1997 | Zhang et al. | |
| D381,991 S | 8/1997 | Hendricks | |
| 5,654,769 A | 8/1997 | Ohara et al. | |
| 5,659,350 A | 8/1997 | Hendricks et al. | |
| 5,664,046 A | 9/1997 | Abecassis | |
| 5,664,227 A | 9/1997 | Mauldin et al. | |
| 5,675,752 A | 10/1997 | Scott et al. | |
| 5,682,195 A | 10/1997 | Hendricks et al. | |
| 5,682,460 A | 10/1997 | Hyziak et al. | |
| 5,684,918 A | 11/1997 | Abecassis | |
| 5,694,163 A | 12/1997 | Harrison | |
| 5,696,869 A | 12/1997 | Abecassis | |
| 5,696,965 A | 12/1997 | Dedrick | |
| 5,710,884 A | 1/1998 | Dedrick | |
| 5,717,814 A | 2/1998 | Abecassis | |
| 5,717,923 A | 2/1998 | Dedrick | |
| 5,724,472 A | 3/1998 | Abecassis | |
| 5,727,129 A | 3/1998 | Barrett et al. | |
| 5,734,853 A | 3/1998 | Hendricks et al. | |
| 5,751,953 A | 5/1998 | Shiels et al. | |
| 5,758,257 A | 5/1998 | Herz et al. | |
| 5,758,259 A | 5/1998 | Lawler | |
| 5,761,881 A | 6/1998 | Wall | |
| 5,764,916 A | 6/1998 | Busey et al. | |
| 5,774,357 A | 6/1998 | Hoffberg et al. | |
| 5,774,666 A | 6/1998 | Portuesi | |
| 5,778,108 A | 7/1998 | Coleman, Jr. | |
| 5,781,188 A | 7/1998 | Amiot et al. | |
| 5,794,210 A | 8/1998 | Goldhaber et al. | |
| 5,797,001 A | 8/1998 | Augenbraun et al. | |
| 5,798,785 A | 8/1998 | Hendricks et al. | |
| 5,805,733 A | 9/1998 | Wang et al. | |
| 5,809,426 A | 9/1998 | Radojevic et al. | |
| 5,821,945 A | 10/1998 | Yeo et al. | |
| 5,822,537 A | 10/1998 | Katseff et al. | |
| 5,828,809 A | 10/1998 | Chang et al. | |
| 5,828,839 A | 10/1998 | Moncreiff | |
| 5,835,087 A | 11/1998 | Herz et al. | |
| D402,310 S | 12/1998 | Hendricks | |
| 5,848,396 A | 12/1998 | Gerace | |
| 5,857,190 A | 1/1999 | Brown | |
| 5,861,881 A | 1/1999 | Freeman et al. | |
| 5,867,226 A | 2/1999 | Wehmeyer et al. | |
| 5,867,386 A | 2/1999 | Hoffberg et al. | |
| 5,875,107 A | 2/1999 | Nagai et al. | |
| 5,875,108 A | 2/1999 | Hoffberg et al. | |
| 5,877,821 A | 3/1999 | Newlin et al. | |
| 5,878,222 A | 3/1999 | Harrison | |
| 5,892,536 A | 4/1999 | Logan et al. | |
| 5,900,867 A | 5/1999 | Schindler et al. | |
| 5,901,246 A | 5/1999 | Hoffberg et al. | |
| 5,903,454 A | 5/1999 | Hoffberg et al. | |
| 5,907,324 A | 5/1999 | Larson et al. | |
| 5,913,013 A | 6/1999 | Abecassis | |
| 5,913,030 A | 6/1999 | Lotspiech et al. | |
| 5,920,300 A | 7/1999 | Yamazaki et al. | |
| 5,920,360 A | 7/1999 | Coleman, Jr. | |
| 5,920,477 A | 7/1999 | Hoffberg et al. | |
| 5,923,365 A | 7/1999 | Tamir et al. | |
| 5,926,624 A | 7/1999 | Katz et al. | |
| 5,930,783 A | 7/1999 | Li et al. | |
| 5,933,811 A | 8/1999 | Angles et al. | |
| 5,945,988 A | 8/1999 | Williams et al. | |
| 5,956,026 A | 9/1999 | Ratakonda | |
| 5,956,037 A | 9/1999 | Osawa et al. | |
| 5,958,006 A | 9/1999 | Eggleston et al. | |
| 5,959,681 A | 9/1999 | Cho | |
| 5,959,697 A | 9/1999 | Coleman, Jr. | |
| 5,969,755 A | 10/1999 | Courtney | |
| 5,973,683 A | 10/1999 | Cragun et al. | |
| 5,977,964 A * | 11/1999 | Williams et al. | ............ 715/721 |
| 5,986,690 A | 11/1999 | Hendricks | |
| 5,986,692 A | 11/1999 | Logan et al. | |
| 5,987,211 A | 11/1999 | Abecassis | |
| 5,990,927 A | 11/1999 | Hendricks et al. | |
| 5,990,980 A | 11/1999 | Golin | |
| 5,995,094 A | 11/1999 | Eggen et al. | |
| 5,995,095 A | 11/1999 | Ratakonda | |
| 6,002,833 A | 12/1999 | Abecassis | |
| 6,005,565 A | 12/1999 | Legall et al. | |
| 6,005,597 A | 12/1999 | Barrett et al. | |
| 6,006,265 A | 12/1999 | Rangan et al. | |
| 6,011,895 A | 1/2000 | Abecassis | |
| 6,014,183 A | 1/2000 | Hoang | |
| 6,020,883 A | 2/2000 | Herz et al. | |
| 6,029,195 A | 2/2000 | Herz | |
| 6,038,367 A | 3/2000 | Abecassis | |
| 6,041,323 A | 3/2000 | Kubota | |
| 6,049,821 A | 4/2000 | Theriault et al. | |
| 6,052,554 A | 4/2000 | Hendricks et al. | |
| 6,055,018 A | 4/2000 | Swan | |
| 6,055,569 A | 4/2000 | O'Brien et al. | |
| 6,060,167 A | 5/2000 | Morgan et al. | |
| 6,064,385 A | 5/2000 | Sturgeon et al. | |
| 6,064,449 A * | 5/2000 | White et al. | ................. 348/732 |
| 6,067,401 A | 5/2000 | Abecassis | |
| 6,070,167 A | 5/2000 | Qian et al. | |
| 6,072,934 A | 6/2000 | Abecassis | |
| 6,076,166 A | 6/2000 | Moshfeghi et al. | |
| 6,078,917 A | 6/2000 | Paulsen, Jr. et al. | |
| 6,078,928 A | 6/2000 | Schnase et al. | |
| 6,081,750 A | 6/2000 | Hoffberg et al. | |
| 6,088,455 A | 7/2000 | Logan et al. | |
| 6,088,722 A | 7/2000 | Herz et al. | |
| 6,091,886 A | 7/2000 | Abecassis | |
| RE36,801 E | 8/2000 | Logan et al. | |
| 6,100,941 A | 8/2000 | Dimitrova et al. | |
| 6,115,709 A | 9/2000 | Gilmour et al. | |
| 6,122,657 A | 9/2000 | Hoffman, Jr. et al. | |
| 6,128,624 A | 10/2000 | Papierniak et al. | |

| | | | | | | |
|---|---|---|---|---|---|---|
| 6,133,909 | A | 10/2000 | Schein et al. | 6,546,555 B1 | 4/2003 | Hjelsvold |
| 6,137,486 | A | 10/2000 | Yoshida et al. | 6,549,643 B1 | 4/2003 | Toklu et al. |
| 6,141,041 | A | 10/2000 | Carlbom et al. | 6,553,178 B2 | 4/2003 | Abecassis |
| 6,141,060 | A | 10/2000 | Honey et al. | 6,556,767 B2 | 4/2003 | Okayama et al. |
| 6,144,375 | A | 11/2000 | Jain et al. | 6,571,279 B1 | 5/2003 | Herz et al. |
| 6,151,444 | A | 11/2000 | Abecassis | 6,578,075 B1 | 6/2003 | Niemenen et al. |
| D435,561 | S | 12/2000 | Pettigrew et al. | 6,581,207 B1 | 6/2003 | Sumita et al. |
| 6,157,377 | A | 12/2000 | Shah-Nazaroff et al. | 6,587,127 B1 | 7/2003 | Leeke et al. |
| 6,160,989 | A | 12/2000 | Hendricks et al. | 6,593,936 B1 | 7/2003 | Huang et al. |
| 6,161,142 | A | 12/2000 | Wolfe et al. | 6,594,699 B1 | 7/2003 | Sahai et al. |
| 6,163,779 | A | 12/2000 | Mantha et al. | 6,597,859 B1 | 7/2003 | Leinhart et al. |
| 6,169,542 | B1 | 1/2001 | Hooks et al. | 6,611,876 B1 | 8/2003 | Barrett et al. |
| 6,177,931 | B1 | 1/2001 | Alexander et al. | 6,614,987 B1 | 9/2003 | Ismail et al. |
| 6,181,335 | B1 | 1/2001 | Hendricks et al. | 6,621,895 B1 | 9/2003 | Giese |
| 6,185,625 | B1 | 2/2001 | Tso et al. | 6,628,302 B2 | 9/2003 | White et al. |
| 6,195,497 | B1 | 2/2001 | Nagasaka et al. | 6,637,032 B1 | 10/2003 | Feinleib |
| 6,198,767 | B1 | 3/2001 | Greenfield et al. | 6,658,095 B1 | 12/2003 | Yoakum et al. |
| 6,199,076 | B1 | 3/2001 | Logan et al. | 6,665,423 B1 | 12/2003 | Mehrotra et al. |
| 6,201,536 | B1 | 3/2001 | Hendricks et al. | 6,678,635 B2 | 1/2004 | Tovinkere et al. |
| 6,208,805 | B1 | 3/2001 | Abecassis | 6,678,659 B1 | 1/2004 | Van Kommer |
| 6,212,527 | B1 | 4/2001 | Gustman | 6,681,395 B1 | 1/2004 | Nishi |
| 6,215,526 | B1 | 4/2001 | Barton et al. | 6,691,126 B1 | 2/2004 | Syeda-Mahmood |
| 6,216,129 | B1 | 4/2001 | Eldering | 6,697,523 B1 | 2/2004 | Divakaran et al. |
| 6,219,837 | B1 | 4/2001 | Yeo et al. | 6,704,929 B1 | 3/2004 | Ozer et al. |
| 6,226,678 | B1 | 5/2001 | Mattaway | 6,724,933 B1 | 4/2004 | Lin et al. |
| 6,230,172 | B1 | 5/2001 | Purnaveja et al. | 6,754,904 B1 | 6/2004 | Cooper et al. |
| 6,230,501 | B1 | 5/2001 | Bailey et al. | 6,754,906 B1 | 6/2004 | Finseth et al. |
| 6,233,289 | B1 | 5/2001 | Fredrickson | 6,766,362 B1 | 7/2004 | Miyaska et al. |
| 6,233,389 | B1 | 5/2001 | Barton et al. | 6,774,917 B1 | 8/2004 | Foote et al. |
| 6,233,586 | B1 | 5/2001 | Chang et al. | 6,810,200 B1 | 10/2004 | Aoyama et al. |
| 6,233,590 | B1 * | 5/2001 | Shaw et al. .................. 715/201 | 6,820,278 B1 | 11/2004 | Ellis |
| 6,236,395 | B1 | 5/2001 | Sezan et al. | 6,829,781 B1 | 12/2004 | Bhagavath et al. |
| 6,240,406 | B1 | 5/2001 | Tannen | 6,868,440 B1 | 3/2005 | Gupta et al. |
| 6,252,544 | B1 | 6/2001 | Hoffberg | 6,880,171 B1 | 4/2005 | Ahmad et al. |
| 6,269,216 | B1 | 7/2001 | Abecassis | 6,898,762 B2 | 5/2005 | Ellis et al. |
| 6,275,268 | B1 | 8/2001 | Ellis et al. | 6,925,455 B2 | 8/2005 | Gong et al. |
| 6,286,140 | B1 | 9/2001 | Ivanyi | 6,931,595 B2 | 8/2005 | Pan et al. |
| 6,286,141 | B1 | 9/2001 | Browne et al. | 6,934,964 B1 | 8/2005 | Schaffer et al. |
| 6,289,165 | B1 | 9/2001 | Abecassis | 6,970,510 B1 | 11/2005 | Wee et al. |
| 6,298,482 | B1 | 10/2001 | Seidman et al. | 6,971,105 B1 | 11/2005 | Weber et al. |
| 6,304,665 | B1 | 10/2001 | Cavallaro et al. | 6,981,129 B1 | 12/2005 | Boggs et al. |
| 6,304,715 | B1 | 10/2001 | Abecassis | 6,983,478 B1 | 1/2006 | Grauch et al. |
| 6,311,189 | B1 | 10/2001 | DeVries et al. | 6,993,245 B1 | 1/2006 | Harville |
| 6,317,718 | B1 | 11/2001 | Fano | 7,003,792 B1 | 2/2006 | Yuen |
| 6,317,881 | B1 | 11/2001 | Shah-Nazaroff et al. | 7,127,735 B1 | 10/2006 | Lee et al. |
| 6,320,624 | B1 | 11/2001 | Ayer et al. | 7,136,710 B1 | 11/2006 | Hoffberg et al. |
| 6,324,338 | B1 | 11/2001 | Wood et al. | 7,146,626 B1 | 12/2006 | Arsenault et al. |
| 6,339,842 | B1 | 1/2002 | Fernandez et al. | 7,150,030 B1 | 12/2006 | Eldering et al. |
| 6,342,904 | B1 | 1/2002 | Vasudevan et al. | 7,185,355 B1 | 2/2007 | Ellis et al. |
| 6,353,444 | B1 | 3/2002 | Katta et al. | 7,199,798 B1 | 4/2007 | Echigo et al. |
| 6,363,160 | B1 | 3/2002 | Bradski et al. | 7,249,366 B1 | 7/2007 | Flavin |
| 6,363,380 | B1 | 3/2002 | Dimitrova | 2001/0030664 A1 | 10/2001 | Shulman et al. |
| 6,370,504 | B1 | 4/2002 | Zick et al. | 2002/0013943 A1 | 1/2002 | Haberman et al. |
| 6,370,688 | B1 | 4/2002 | Hejna, Jr. | 2002/0018594 A1 | 2/2002 | Xu et al. |
| 6,374,404 | B1 | 4/2002 | Brotz et al. | 2002/0026345 A1 | 2/2002 | Juels |
| 6,405,371 | B1 | 6/2002 | Oosterhout et al. | 2002/0079165 A1 | 6/2002 | Wolfe |
| 6,412,008 | B1 | 6/2002 | Fields et al. | 2002/0080162 A1 | 6/2002 | Pan et al. |
| 6,418,168 | B1 | 7/2002 | Narita | 2002/0083473 A1 | 6/2002 | Agnihotri et al. |
| 6,421,680 | B1 | 7/2002 | Kumhyr et al. | 2002/0087967 A1 | 7/2002 | Conkwright et al. |
| 6,425,133 | B1 | 7/2002 | Leary | 2002/0097165 A1 | 7/2002 | Hulme |
| 6,426,761 | B1 | 7/2002 | Kanevsky et al. | 2002/0120929 A1 | 8/2002 | Schwalb et al. |
| 6,426,974 | B2 | 7/2002 | Takahaski et al. | 2002/0133412 A1 | 9/2002 | Oliver et al. |
| 6,438,579 | B1 | 8/2002 | Hosken | 2002/0140719 A1 | 10/2002 | Amir et al. |
| 6,439,572 | B1 | 8/2002 | Bowen | 2002/0141619 A1 | 10/2002 | Standridge et al. |
| 6,446,261 | B1 | 9/2002 | Rosser | 2002/0156909 A1 | 10/2002 | Harrington |
| 6,470,378 | B1 | 10/2002 | Tracton et al. | 2002/0178135 A1 | 11/2002 | Tanaka |
| 6,487,390 | B1 | 11/2002 | Virine et al. | 2002/0184220 A1 | 12/2002 | Teraguchi et al. |
| 6,498,783 | B1 | 12/2002 | Lin | 2002/0190991 A1 | 12/2002 | Efran et al. |
| 6,522,342 | B1 | 2/2003 | Gagnon et al. | 2002/0194589 A1 | 12/2002 | Cristofalo et al. |
| 6,530,082 | B1 | 3/2003 | Del Sesto et al. | 2003/0001880 A1 | 1/2003 | Holtz et al. |
| 6,535,639 | B1 | 3/2003 | Uchihachi et al. | 2003/0007555 A1 | 1/2003 | Divakaran et al. |
| 6,542,546 | B1 | 4/2003 | Vetro et al. | 2003/0026592 A1 | 2/2003 | Kawahara et al. |
| 6,543,053 | B1 | 4/2003 | Li et al. | 2003/0033288 A1 | 2/2003 | Shanahan et al. |

| | | | |
|---|---|---|---|
| 2003/0067554 | A1 | 4/2003 | Klarfeld et al. |
| 2003/0072440 | A1 | 4/2003 | Murray et al. |
| 2003/0081937 | A1 | 5/2003 | Li |
| 2003/0093792 | A1 | 5/2003 | Labeeb et al. |
| 2003/0105682 | A1 | 6/2003 | Dicker et al. |
| 2003/0172374 | A1 | 9/2003 | Vinson et al. |
| 2003/0182663 | A1 | 9/2003 | Gudorf et al. |
| 2003/0187650 | A1 | 10/2003 | Moore et al. |
| 2003/0229900 | A1 | 12/2003 | Reisman |
| 2004/0003041 | A1 | 1/2004 | Moore et al. |
| 2004/0015569 | A1 | 1/2004 | Lonnfors et al. |
| 2004/0017389 | A1 | 1/2004 | Pan et al. |
| 2004/0030750 | A1 | 2/2004 | Moore et al. |
| 2004/0032466 | A1 | 2/2004 | Shusman |
| 2004/0088289 | A1 | 5/2004 | Xu et al. |
| 2004/0098754 | A1 | 5/2004 | Vella et al. |
| 2004/0125124 | A1 | 7/2004 | Kim et al. |
| 2004/0125877 | A1 | 7/2004 | Chang et al. |
| 2004/0197088 | A1 | 10/2004 | Ferman et al. |
| 2004/0227768 | A1 | 11/2004 | Bates et al. |
| 2004/0231003 | A1 | 11/2004 | Cooper et al. |
| 2004/0250272 | A1 | 12/2004 | Durden et al. |
| 2005/0021784 | A1 | 1/2005 | Prehofer |
| 2005/0028194 | A1 | 2/2005 | Elenbaas et al. |
| 2005/0102202 | A1 | 5/2005 | Linden et al. |
| 2005/0251827 | A1 | 11/2005 | Ellis et al. |
| 2006/0129544 | A1 | 6/2006 | Yoon et al. |

FOREIGN PATENT DOCUMENTS

| | | |
|---|---|---|
| EP | 0 878964 | 11/1998 |
| EP | 1250807 | 10/2002 |
| GB | 2 325 537 | 11/1998 |
| JP | 08-125957 | 5/1996 |
| JP | 09-322154 | 12/1997 |
| JP | 11-032267 | 2/1999 |
| JP | 11-261908 | 9/1999 |
| JP | 2000-013755 | 1/2000 |
| JP | 2001-036861 | 2/2001 |
| JP | 2002-503896 | 2/2002 |
| WO | WO94/14284 | 6/1994 |
| WO | WO 98/56188 | 12/1998 |
| WO | WO 99/01984 | 1/1999 |
| WO | WO99/04143 | 1/1999 |
| WO | WO99/12194 | 3/1999 |
| WO | WO99/65237 | 12/1999 |
| WO | WO 01/50753 | 7/2001 |

OTHER PUBLICATIONS

Lieberman, Henry, et al., "Let's Browse: A Collaborative Web Browsing Agent", Jan./1999, CPP Conference Paper, Proceeding of IUI 99, Intelligent User Interfaces, pp. 65-68.
LG Corporate Institute of Technology, "Specification of the Usage History DS," Noordwijkerhout, Mar. 2000, ISO/IEC JTC1/SC29/WG11/M5748.
LG Electronics Institute of Technology, "Proposal of Usage History DS," Beijing, Jul. 2000, ISO/IEC JTC1/SC29/WG11 M6259.
"Customer Profile Exchange (CPExchange) Specification", Version 1.0, Oct. 20, 2000.
"XML Schema Part 1: Structures," W3C Recommendation May 2, 2001, http://www.w3.org/TR/xmlschema-1/, pp. 1-188.
"XML Schema Part 2: Datatypes," W3C Recommendation May 2, 2001, http://www.w3.org/TR/xmlschema-2/, pp. 1-136.
"MPEG-7 Requirements Document," ISO/IEC JTC1/SC29/WG11 (N2859), Jul. 1999.
"MPEG-7 Requirements for Description of Users," ISO/IEC JTC1/SC29/WG11 (M4601), Mar. 1999.
"MPEG-7 Description Schemes for Consumer Video," ISO/IEC JTC1/SC29/WG11 (P429), Feb. 1999.
"MPEG-7 Media/Meta Dss (V 2)," ISO/IEC JTC1/SC29/WG11, Aug. 1999.
"MPEG-7 Description Schemes (V 5)," ISO/IEC JTC1/SC29/WG11 (N2844), Jul. 1999.
"XML Schema Part I: Structures, W3C Working Draft May 6, 1999," www.w3.org/1999/05/06-xmlschema-1/.
"Composite Capability/Preference Profiles (CC/PP): A User Side Framework for Content Negotiation," W3C Note Jul. 27, 1999, www.w3.org/TR/1999-NOTE-CCPP-19990727).
"Proposal for User Preference Descriptions in MPEG-7," ISO/IEC JTC1/SC29/WG11 (M5222), Oct. 1999.
"User Preference Descriptions for MPEG-7," ISO/IEC JTC1/SC29/WG11 (Mxxxx), Dec. 1999.
Lewis, "UbiNet: The Ubiquitous Internet Will Be Wireless," Computer Magazine, pp. 128-130, Oct. 1999.
"MPEG-7 Generic AV Description Schemes (V0.7)," ISO/IEC JTC1/SC29/WG11 (N2966), Oct. 1999.
"MPEG-7 Description Definition Language Document," ISO/IEC JTC1/SC29/WG11 (N2997), Oct. 1999.
Yuichi Yagawa et al., "TV Program Planning Agent using Analysis Method of User's Taste", Technical report of IEICE, vol. 98, No. 437, AI98-54-61, Dec. 1, 1998.
"User Preference Description for MPEG-7," ISO/IEC JTC1/SC29/WG11, MPEG 99/MXXXX, Maui, Hawaii, Dec. 1999, pp. 1-18.
Michael G. Christel, Alexander G. Hauptmann, Adrienne S. Warmack, Scott A. Crosby, "Adjustable Filmstrips and Skims as Abstractions for a Digital Video Library," Computer Science Department, Carnegie Mellon University, Pittsburgh, PA 15213 USA.
Peng Xu, et al., "Algorithms and System for High-Level Structure Analysis and Event Detection in Soccer Video," Columbia University, ADVENT—Technical Report #111, Jun. 2001.
Keith Millar and David White, "A Schema for TV-Anytime: Segmentation Metadata AN195," NDS Contribution from MyTV, NDS Limited 2000, 27 pages.
Keith Millar et al., "A Schema for TV-Anytime Segmentation Metadata AN195r1 myTV project," NDS Systems Division, NDS Limited 2000, 28 pages.
S.E. Levinson, L. R. Rabiner, and M. M. Sondhi, "An Introduction to the Application of the Theory of Probabilistic Functions of a Markov Process to Automatic Speech Recognition," Copyright 1983 American Telephone and Telegraph company, The Bell system Technical Journal, vol. 62, No. 4, Apr. 1983, pp. 1035-1074.
Dennis Yow, et al., "Analysis and Presentation of Soccer Highlights from Digital Video," To appear in the Proceedings, Second Asian Conference on Computer Vision (ACCV '95).
Drew D. Saur, et al., "Automated Analysis and Annotation of Basketball Video," SPIE vol. 3022, pp. 176-187, 1997.
Hao Pan et al., "Automatic Detection of Replay Segments in Broadcast Sports Programs by Detection of Logos in Scene Transitions," 2002 IEEE, pp. IV-3385-IV-3388.
Yihong Gong, et al., "Automatic Parsing of TV soccer Programs," 1995 IEEE, pp. 167-174.
Jonathan D. Courtney, "Automatic Video Indexing via Object Motion Analysis," Pattern Recognition, vol. 30, No. 4, pp. 607-625, 1997.
Yong Rui, et al., "Automatically Extracting Highlights for TV Baseball Programs," ACM Multimedia 2000 Los Angeles, CA, USA, pp. 105-115.
Nuno Vasconcelos and Andrew Lippman, "Bayesian Modeling of Video Editing and Structure: Semantic Features for Video Summarization and Browsing," 1998 IEEE, pp. 153-157.
Padhraic Smyth, "Belief Networks, Hidden Markov Models, and Markov Random Fields: a Unifying View," To appear in Pattern Recognition Letters, 1998, Information and Computer Science Department, University of California, Irvine, CA 92697-3425, Mar. 20, 1998.
Francis C. Li et al., "Browsing Digital Video," CHI 2000, Apr. 1-6, 2000, CHI Letters vol. 2 issue 1, pp. 169-176.
T. Lambrou, et al., "Classification of Audio Signals Using Statistical Features on Time and Wavelet Transform Domains," 1998 IEEE, pp. 3621-3624.
Joshua Alspector,et al., "Comparing Feature-based and Clique-based User Models for Movie Selection," Digital Libraries 98, Pittsburgh, PA, Copyright ACM 1998, pp. 11-18.
Rainer Lienhart, "Comparison of Automatic Shot Boundary Detection Algorithms," Part of the IS&T/SPIE conference on Storage and Retrieval for Image and Video Databases VII, San Jose, CA, Jan. 1999, SPIE vol. 3656, pp. 290-301.

John Canny, "A Computational Approach to Edge Detection," IEEE Transactions on Pattern Analysis and Machine Intelligence, vol. PAMI-8, No. 6, Nov. 1986, IEEE 1988, pp. 679-698.

Richard Qian et al., "A Computational Approach to Semantic Event Detection," 1999 IEEE, pp. 200-206.

F. Arman, et al., "Content-based Browsing of Video Sequences," to appear in the Proceedings of ACM International Conference on Multimedia '94, Oct. 15-20, San Francisco, CA, 7 pages.

Hongjiang Zhang, et al. "Content-Based Video Browsing Tools," SPIE vol. 2417, 1995, pp. 389-398.

Stephen W. Smoliar, et al. "Content-Based Video Indexing and Retrieval," 1994 IEEE, pp. 62-72.

Stefan Eickeler, et al., "Content-based Video Indexing of TV Broadcast News Using Hidden Markov Models," Proceedings of IEEE International Conference on Acoustics, Speech, and Signal Processing, Phoenix, AZ, 1999, 4 pages.

Jane Hunter (DSTC Pty Ltd), Editor, "DDL Working Draft 3.0," ISO/IEC JTC1/SC29/WG11 N3391, MPEG 00/ May 2000 (Geneva), 23 pages.

Vikrant Kobla, et al. "Detection of Slow-Motion Replay Sequences for Identifying Sports Videos," Laboratory for Language and Media Processing, University of Maryland, College Park, MD 20742-3275, USA, 6 pages.

Zhu Liu and Qian Huang, "Detecting News Reporting Using Audio/Visual Information," 1999 IEEE, pp. 324-328.

Y Kawai, "Detection of Replay Scenes in Broadcasted Sports Video by focusing on digital Video Effects," IEICE (D-II), vol. J84-D-II, No. 2, pp. 432-435, Feb. 2001, (In Japanese), pp. 432-437.

Vikrant Kobla, et al., "Detection of Slow-Motion Replay Sequences for Identifying Sports Videos," Laboratory for Language and Media Processing, University of Maryland, College Park, MD 20742-3275, USA, pp. 135-140.

H. Pan, et al. "Detection of Slow-Motion Replay Segments in sports Video for Highlights Generation," Proceedings of IEEE International Conference on Acoustics, Speech, and signal Processing, Salt Lake City, UT, 2001, 4 pages.

Alan E Bell, "The dynamic digital disk," IEEE Spectrum, Oct. 1999, pp. 28-35.

Baoxin Li and M. Ibrahim Sezan, "Event Detection and Summarization in Sports Video," Sharp Laboratories of America, 5750 NW Pacific Rim Blvd., Camas, WA 98607, USA, 5 pages.

Minerva Yeung, "Extracting Story Units from Long Programs for Video Browsing and Navigation," Proceedings of Multimedia 1996, 1996 IEEE, pp. 296-304.

Boon-Lock Yeo et al., "On the Extraction of DC Sequence from MPEG Compressed Video," 1995 IEEE, pp. 260-263.

FAP Specifications, MPEG-4 Compliant Facial Animation, http://www.dsp.dist.uniqe.it/~pok/RESEARCH/MPEG/fapspec.htm, 4 pages.

Frank R. Kschischang, et al., "Factor Graphs and the Sum-Product Algorithm," IEEE Transactions on Information Theory, vol. 47, No. 2, Feb. 2001, pp. 498-519.

John S. Boreczky, et al. "A Hidden Markov Model Framework for Video Segmentation Using Audio and Image Features," Proceedings of IEEE International Conference on Acoustics, Speech, and Signal Processing, Seattle, WA, 1998, 4 pages.

Wayne Wolf, "Hidden Markov Model Parsing of Video Programs," Proceedings of the 1997 IEEE International Conference on Acoustics, Speech, and Signal Processing (ICASSP '97), pp. 2609-2611.

Bilge Gunsel, et al., "Hierarchical Temporal video Segmentation and content Characterization," Dept. of Electrical Engineering and Center for Electronic Imaging Systems, University of Rochester, Rochester, NY 14627, SPIE vol. 3229, 1997.

M. R. Naphade, et al. "A High-Performance Shot Boundary Detection Algorithm Using Multiple Cues," Proceedings of IEEE International Conference on Image Processing, Chicago, IL, 1998, pp. 884-887.

Josh Bernoff, "How Cable TV Can Beat Satellite," WholeView TechStrategy Rsearch, Apr. 2002 Forrester Research, Inc., 400 Technology Square, Cambridge, MA 02139 USA.

Vikrant Kobla, et al., "Identifying sports videos using replay, text, and camera motion features," Laboratory for Language and Media Processing, University of Maryland, College Park, MD 20742-3275, USA, Date Unknown.

B. B. Chaudhuri, et al., "Improved fractal geometry based texture segmentation technique," IEE Proceedings-E, vol. 140, No. 5, Sep. 1993, pp. 233-241.

Toshio Kawashima, et al., "Indexing of Baseball Telecast for Content-based Video Retrieval," Dept. of Information engineering, Hokkaido University, Kita-13, Nishi-8, Sapporo, 060-8628, Japan, 1998 IEEE, pp. 871-874.

Nathaniel J. Thurston, et al. "Intelligent Audience guidance: The New Paradigm in Television Navigation," Predictive Networks, Inc., Feb. 21, 2002, 9 pages.

Dulce Ponceleon, et al. "Key to Effective Video Retrieval: Effective Cataloging and Browsing," ACM Multimedia '98, Bristol, UK, 1998, pp. 99-107.

Noboru Babaguchi, et al., "Linking Live and Replay Scenes in Broadcasted Sports Video," ACM Multimedia Workshop, Marina Del Roy, CA, USA, Copyright ACM 2000, pp. 205-208.

Giridharan Iyengar, et al., "Models for automatic classification of video sequences," SPIE vol. 3312, 1997, pp. 216-227.

Nevenka Dimitrova, et al., "Motion Recovery for Video Content Classification," ACM Transactions on Information Systems, vol. 13, No. 4, Oct. 1995, pp. 408-439.

Peter Van Beek, et al, Editors, "MPEG-7 Multimedia Description Schemes WD (Version 3.0)," ISO/IEC JTC 1/SC 29/WG 11/N3411, May 2000, Geneva.

Peter Van Beek, et al., Editors, "MPEG-7 Multimedia Description Schemes XM (Version 3.0)," ISO/IEC JTC 1/SC29/WG 11/N3410, May 2000, Geneva.

Sylvie Jeannin, et al., Editors, "MPEG-7 Visual part of eXperimentation Model Version 6.0," ISO/IEC JTC1/SC29/WG11/N3398, Geneva, Jun. 2000.

Kaushal Kurapati, et al., "A Multi-Agent TV Recommender," Adaptive Systems Department, Philips Research Briarcliff, 345 Scarborough Rd., Briarcliff Manor, NY 10510, USA, Date Unknown.

Jane Hunter (DSTC Pty Ltd.), "Text of ISO/IEC CD 15938-2 Information technology—Multimedia content description interface—Part 2 Description definition language," ISO/IEC JTC1/SC29/WG11 N3702, MPEG 00/3702, Oct. 2000 (La Baule).

"Information Technology—Multimedia Content Description Interface—Part 5: Multimedia Description Schemes," ISO/IEC JTC 1/SC 29 N 3705, Nov. 17, 2000, ISO/IEC CD 15938-5.

Peter Van Beek, et al., "Text of 15938-5 FCD Information Technology—Multimedia Content Description Interface—Part 5 Multimedia Description Schemes," ISO/IEC JTC 1/SC 29 N3966 Mar. 12, 2001, 500 pages.

Yao Wang, et al., "Multimedia Content Analysis," IEEE Signal Processing Magazine, Nov. 2000, pp. 12-35.

Mark T. Maybury, et al., "Multimedia Summaries of Broadcast News," Advanced Information Systems Center, The MITRE Corporation, 202 Burlington Road, Bedford, MA 01730, USA, pp. 442-449.

Shinichi Satoh, et al., "Name-It: Association of Face and Name in Video," School of Computer Science, Carnegie Mellon University, Pittsburgh, PA 15213, Dec. 20, 1996, 19 pages.

Stuart J. Golin, "New metric to detect wipes and other gradual transitions in . . . " Part of the IS&T/SPIE Conference on Visual communications and Image Processing '99, San Jose, CA Jan. 1999, SPIE vol. 3653, pp. 1464-1474.

Ullas Gargi, et al., "Transactions Letters: Performance Characterization of Video-Shot-Change Detection Methods," IEEE Transactions on Circuits and Systems for Video Technology, vol. 10, No. 1, Feb. 2000, 13 pages.

Marc Light, et al., "Personalized Multimedia Information Access," Communications of the ACM, vol. 45, No. 5, May 2002, pp. 54-59.

Michael T. Chan, et al., "Real-Time Lip Tracking and Bimodal Continuous Speech Recognition," Rockwell Science Center, 1049 Camino Dos Rios, Thousand Oaks, CA 91360, 6 pages, date unknown.

Boon-Lock Yeo, et al., "Retrieving and Visualizing Video," Communications of the ACM, Dec. 1997, vol. 40, No. 12, pp. 43-52.

H.B. Lu, et al., "Robust Gradual Scene Change Detection," Proceedings of IEEE International Conference on Image Processing, Kobe, Japan, 1999, 5 pages.

Richard J. Qian, et al., "A Robust Real-Time Face Tracking Algorithm," Sharp Laboratories of America, 5750 N.W. Pacific Rim Blvd., Camas, WA 98607, 1998 IEEE, pp. 131-135.

Lexing Lie, "Segmentation and Event Detection in Soccer Audio," EE 6820 Project, Soccer Audio, May 15, 2001, 9 pages.

Riccardo Leonardi, et al., "Content-Based Multimedia Indexing and Retrieval: Semantic Indexing of Multimedia Documents," IEEE 2002, pp. 44-51.

R. W. Picard, "A Society of Models for Video and Image Libraries," IBM Systems Journal, vol. 35, Nos. 3 & 4, 1996, pp. 292-312.

Alberto Del Bimbo, et al., "A Spatial Logic for Symbolic Description of Image Contents," Journal of Visual Languages and Computing (1994) 5, pp. 267-286.

Lexing Xie, et al., "Structure Analysis of Soccer Video with Hidden Markov Models," Department of Electrical Engineering, Columbia University, New York, NY, 4 pages.

Selim Aksoy, et al., "Textural Features for Image Database Retrieval," Intelligent Systems Laboratory, Department of Electrical Engineering, University of Washington, Seattle, WA 98195-2500, 5 pages.

B. S. Manjunath, et al., "Texture Features for Browsing and Retrieval of Image Data," IEEE Transactions on Pattern Analysis and Machine Intelligence, vol. 18, No. 8, Aug. 1996, pp. 837-842.

Richard W. Conners, et al., "A Theoretical comparison of Texture Algorithms," IEEE Transactions on Pattern Analysis and Machine Intelligence, vol., PAMI-2, No. 3, May 1980, pp. 204-222.

Noboru Babaguchi, "Towards Abstracting Sports Video by Highlights," ISIR, Osaka University, Ibaraki, Osaka 567-0047, Japan, 2000 IEEE, pp. 1519-1522.

Stephen S. Intille, "Tracking Using a Local Closed-World Assumption: Tracking in the Football Domain," MIT Media Lab Perceptual computing group Technical Report No. 296, pp. 1-62.

Lawrence R. Rabiner, "A Tutorial on Hidden Markov Models and Selected Applications in Speech Recognition," Proceedings of the IEEE, vol. 77, No. 2, Feb. 1989, pp. 257-286.

Jim Stroud, "TV Personalization: A Key Component of Interactive TV," The Carmel Group, 2001, 9 pages.

Richard O. Duda et al., "Use of the Hough Transformation To Detect Lines and Curves in Pictures," Communications of the ACM, Jan. 1972, vol. 15, No. 1, pp. 11-15.

Rainer Lienhart, et al., "Video Abstracting," Communications of the ACM, Dec. 1997/ vol. 40, No. 12, pp. 55-62.

Shingo Uchihashi, et al., "Video Manga: Generating Semantically Meaningful Video Summaries," FX Palo Alto Laboratory, 3400 Hillview Avenue, Palo Alto, CA 94304, USA, pp. 383-392.

Michael A. Smith, et al., "Video Skimming for Quick Browsing based on Audio and Image Characterization," School of Computer Science, Carnegie Mellon University, Pittsburgh, PA 15213, Jul. 30, 1995, 24 pages.

Daniel Dementhon, et al., "Video summarization by Curve Simplification," Language and Media Processing (LAMP), University of Maryland, College Park, MD 20742-3275, 1998 ACM, pp. 211-218.

Chung-Lin Huang, et al., "Video summarization using Hidden Markov Model," Electrical Engineering Department, National Tsing-Hua University, Hsin-Chu, Taiwan, ROC, 2001 IEEE, pp. 473-477.

Ken Masumitsu, et al., "Video Summarization Using Reinforcement Learning in Eigenspace," IBM Research, Tokyo Research Laboratory, 1623-14, Shimotsuruma, Yamato-shi, Kanagawa, Japan, 4 pages.

Yihong Gong, et al., "Video Summarization Using Singular Value Decomposition," C&C Research laboratories, NEc USA, Inc. 110 Rio Robles, San Jose, CA 95134, USA, 2000 IEEE, 7 pages.

Yihong Gong, et al., "Video Summarization with Minimal Visual Content Redundancies" C&C Research Laboratories, NEC USA, Inc., 110 Rio robles, San Jose, CA 95134, USA, 2001 IEEE, pp. 362-365.

Minerva M. Yeung, et al., "Video visualization for Compact Presentation and Fast Browsing of Pictorial Content," IEEE Transactions on circuits and Systems for Video Technology, vol. 7, No. 5, Oct. 1997, pp. 771-785.

Stephen S. Intille, et al., "Visual Tracking Using closed-Worlds,", MIT Media Laboratory Perceptual computing Section Technical Report No. 294, Nov. 1994, pp. 1-18.

Leszek Cieplinski, et al. "Visual Working Draft 3.0," ISO/IEC JTC1/SC29/WG11/N3399, Jun. 2000 (Geneva), 92 pages.

Sunghoon Choi, et al., "Where are the ball and players?: Soccer Game Analysis with Color-based Tracking and Image Mosaick," Dept. of EE, Pohang University of Science and Technology, San 31 Hyoja Dong, Pohang, 790-784, Republic of Korea, pp. 1-15.

http://web.archive.org/web/20001017172449/http://www.pyi-inc.com/.

* cited by examiner

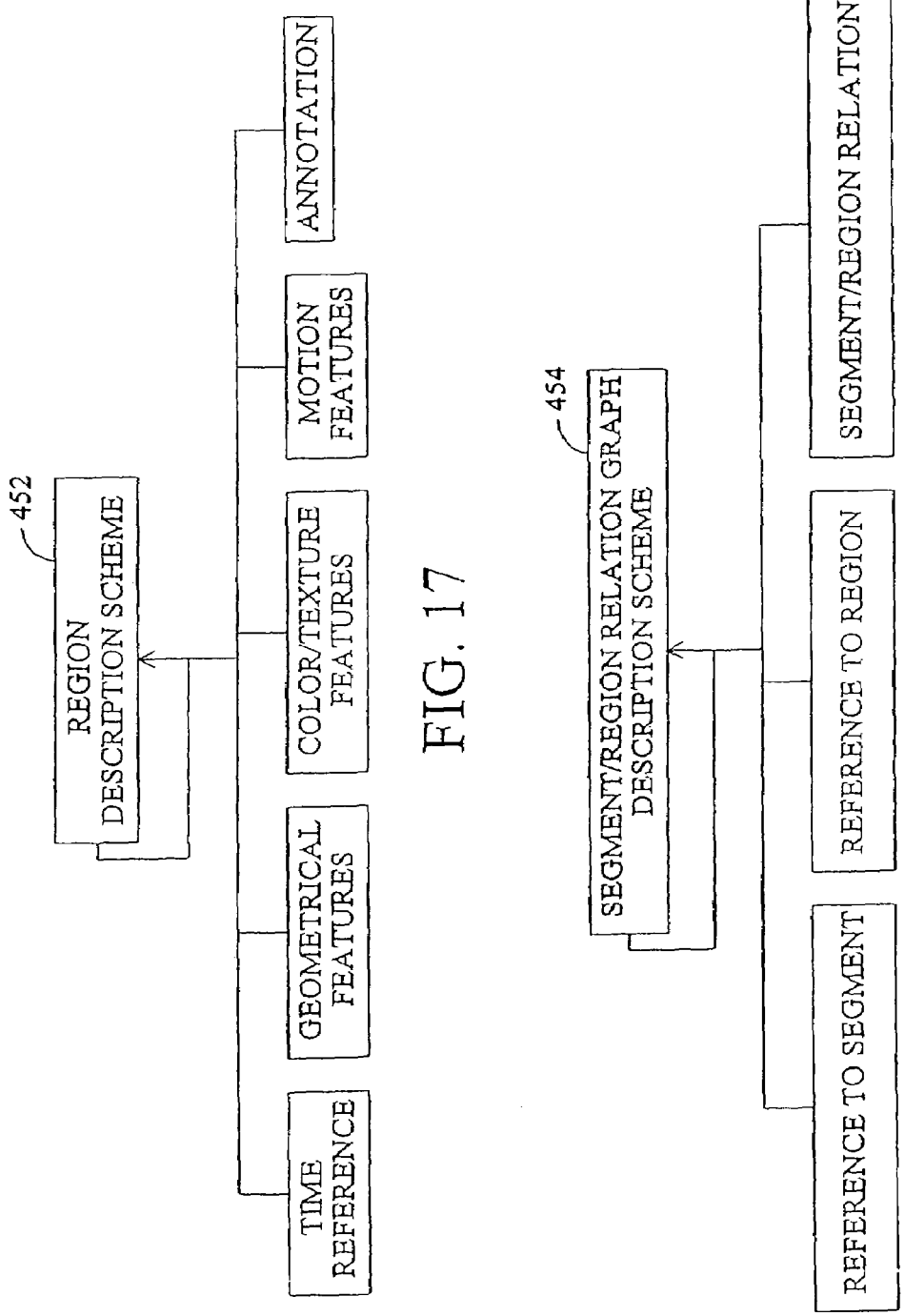

AUDIOVISUAL INFORMATION MANAGEMENT SYSTEM WITH USAGE PREFERENCES

CROSS-REFERENCE TO RELATED APPLICATIONS

This application is a continuation of U.S. patent application Ser. No. 09/541,447 filed Mar. 31, 2000 now abandoned, which claims the benefit of U.S. Provisional Patent Application No. 60/154,388, filed Sep. 16, 1999.

BACKGROUND OF THE INVENTION

The present invention relates to a system for managing audiovisual information, and in particular to a system for audiovisual information browsing, filtering, searching, archiving, and personalization.

Video cassette recorders (VCRs) may record video programs in response to pressing a record button or may be programmed to record video programs based on the time of day. However, the viewer must program the VCR based on information from a television guide to identify relevant programs to record. After recording, the viewer scans through the entire video tape to select relevant portions of the program for viewing using the functionality provided by the VCR, such as fast forward and fast reverse. Unfortunately, the searching and viewing is based on a linear search, which may require significant time to locate the desired portions of the program(s) and fast forward to the desired portion of the tape. In addition, it is time consuming to program the VCR in light of the television guide to record desired programs. Also, unless the viewer recognizes the programs from the television guide as desirable it is unlikely that the viewer will select such programs to be recorded.

RePlayTV and TiVo have developed hard disk based systems that receive, record, and play television broadcasts in a manner similar to a VCR. The systems may be programmed with the viewer's viewing preferences. The systems use a telephone line interface to receive scheduling information similar to that available from a television guide. Based upon the system programming and the scheduling information, the system automatically records programs that may be of potential interest to the viewer. Unfortunately, viewing the recorded programs occurs in a linear manner and may require substantial time. In addition, each system must be programmed for an individual's preference, likely in a different manner.

Freeman et al., U.S. Pat. No. 5,861,881, disclose an interactive computer system where subscribers can receive individualized content.

With all the aforementioned systems, each individual viewer is required to program the device according to his particular viewing preferences. Unfortunately, each different type of device has different capabilities and limitations which limit the selections of the viewer. In addition, each device includes a different interface which the viewer may be unfamiliar with. Further, if the operator's manual is inadvertently misplaced it may be difficult for the viewer to efficiently program the device.

BRIEF SUMMARY OF THE INVENTION

The present invention overcomes the aforementioned drawbacks of the prior art by providing a method of using a system with at least one of audio, image, and a video comprising a plurality of frames comprising the steps of providing a usage preferences description scheme where the usage preference description scheme includes at least one of a browsing preferences description scheme, a filtering preferences description scheme, a search preferences description scheme, and a device preferences description scheme. The browsing preferences description scheme relates to a user's viewing preferences. The filtering and search preferences description schemes relate to at least one of (1) content preferences of the at least one of audio, image, and video, (2) classification preferences of the at least one of audio, image, and video, (3) keyword preferences of the at least one of audio, image, and video, and (4) creation preferences of the at least one of audio, image, and video. The device preferences description scheme relates to user's preferences regarding presentation characteristics. A usage history description scheme is provided where the usage preference description scheme includes at least one of a browsing history description scheme, a filtering history description scheme, a search history description scheme, and a device usage history description scheme. The browsing history description scheme relates to a user's viewing preferences. The filtering and search history description schemes relate to at least one of (1) content usage history of the at least one of audio, image, and video, (2) classification usage history of the at least one of audio, image, and video, (3) keyword usage history of the at least one of audio, image, and video, and (4) creation usage history of the at least one of audio, image, and video. The device usage history description scheme relates to user's preferences regarding presentation characteristics. The usage preferences description scheme and the usage history description scheme are used to enhance system functionality.

The foregoing and other objectives, features and advantages of the invention will be more readily understood upon consideration of the following detailed description of the invention, taken in conjunction with the accompanying drawings.

BRIEF DESCRIPTION OF THE SEVERAL VIEWS OF THE DRAWINGS

FIG. 17 is an exemplary embodiment of a region description scheme for the syntactic structure description scheme of FIG. 13.

FIG. 18 is an exemplary embodiment of a segment/region relation description scheme for the syntactic structure description scheme of FIG. 13.

DETAILED DESCRIPTION OF THE PREFERRED EMBODIMENT

Figure 1:
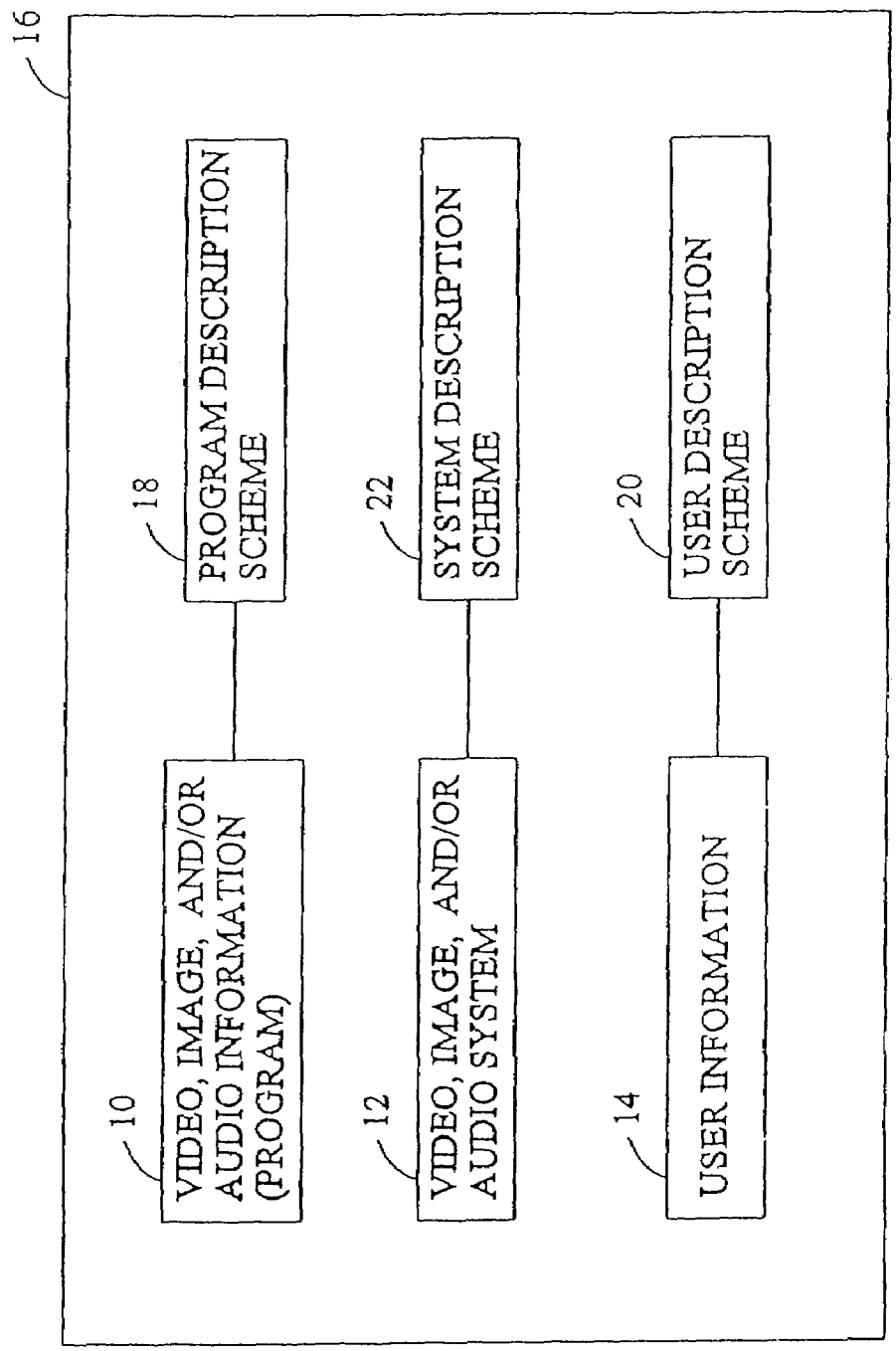
FIG. 1 is an exemplary embodiment of a program, a system, and a user, with associated description schemes, of an audiovisual system of the present invention.

Many households today have many sources of audio and video information, such as multiple television sets, multiple VCR's, a home stereo, a home entertainment center, cable television, satellite television, internet broadcasts, world wide web, data services, specialized Internet services, portable radio devices, and a stereo in each of their vehicles. For each of these devices, a different interface is normally used to obtain, select, record, and play the video and/or audio content. For example, a VCR permits the selection of the recording times but the user has to correlate the television guide with the desired recording times. Another example is the user selecting a preferred set of preselected radio stations for his home stereo and also presumably selecting the same set of preselected stations for each of the user's vehicles. If another household member desires a different set of preselected stereo selections, the programming of each audio device would need to be reprogrammed at substantial inconvenience.

The present inventors came to the realization that users of visual information and listeners to audio information, such as for example radio, audio tapes, video tapes, movies, and news, desire to be entertained and informed in more than merely one uniform manner. In other words, the audiovisual information presented to a particular user should be in a format and include content suited to their particular viewing preferences. In addition, the format should be dependent on the content of the particular audiovisual information. The amount of information presented to a user or a listener should be limited to only the amount of detail desired by the particular user at the particular time. For example with the ever increasing demands on the user's time, the user may desire to watch only 10 minutes of or merely the highlights of a basketball game. In addition, the present inventors came to the realization that the necessity of programming multiple audio and visual devices with their particular viewing preferences is a burdensome task, especially when presented with unfamiliar recording devices when traveling. When traveling, users desire to easily configure unfamiliar devices, such as audiovisual devices in a hotel room, with their viewing and listening preferences in a efficient manner.

The present inventors came to the further realization that a convenient technique of merely recording the desired audio and video information is not sufficient because the presentation of the information should be in a manner that is time efficient, especially in light of the limited time frequently available for the presentation of such information. In addition, the user should be able to access only that portion of all of the available information that the user is interested in, while skipping the remainder of the information.

A user is not capable of watching or otherwise listening to the vast potential amount of information available through all, or even a small portion of, the sources of audio and video information. In addition, with the increasing information potentially available, the user is not likely even aware of the potential content of information that he may be interested in. In light of the vast amount of audio, image, and video information, the present inventors came to the realization that a system that records and presents to the user audio and video information based upon the user's prior viewing and listening habits, preferences, and personal characteristics, generally referred to as user information, is desirable. In addition, the system may present such information based on the capabilities of the system devices. This permits the system to record desirable information and to customize itself automatically to the user and/or listener. It is to be understood that user, viewer, and/or listener terms may be used interchangeability for any type of content. Also, the user information should be portable between and usable by different devices so that other devices may likewise be configured automatically to the particular user's preferences upon receiving the viewing information.

In light of the foregoing realizations and motivations, the present inventors analyzed a typical audio and video presentation environment to determine the significant portions of the typical audiovisual environment. First, referring to FIG. 1 the video, image, and/or audio information 10 is provided or otherwise made available to a user and/or a (device) system. Second, the video, image, and/or audio information is presented to the user from the system 12 (device), such as a television set or a radio. Third, the user interacts both with the system (device) 12 to view the information 10 in a desirable manner and has preferences to define which audio, image, and/or video information is obtained in accordance with the user information 14. After the proper identification of the different major aspects of an audiovisual system the present inventors then realized that information is needed to describe the informational content of each portion of the audiovisual system 16.

With three portions of the audiovisual presentation system 16 identified, the functionality of each portion is identified together with its interrelationship to the other portions. To define the necessary interrelationships, a set of description schemes containing data describing each portion is defined. The description schemes include data that is auxiliary to the programs 10, the system 12, and the user 14, to store a set of information, ranging from human readable text to encoded data, that can be used in enabling browsing, filtering, searching, archiving, and personalization. By providing a separate description scheme describing the program(s) 10, the user 14, and the system 12, the three portions (program, user, and system) may be combined together to provide an interactivity not previously achievable. In addition, different programs 10, different users 14, and different systems 12 may be combined together in any combination, while still maintaining full compatibility and functionality. It is to be understood that the description scheme may contain the data itself or include links to the data, as desired.

A program description scheme 18 related to the video, still image, and/or audio information 10 preferably includes two sets of information, namely, program views and program profiles. The program views define logical structures of the frames of a video that define how the video frames are potentially to be viewed suitable for efficient browsing. For example the program views may contain a set of fields that contain data for the identification of key frames, segment definitions between shots, highlight definitions, video summary definitions, different lengths of highlights, thumbnail set of frames, individual shots or scenes, representative frame of the video, grouping of different events, and a close-up view. The program view descriptions may contain thumbnail, slide, key frame, highlights, and close-up views so that users can filter and search not only at the program level but also within a particular program. The description scheme also enables users to access information in varying detail amounts by supporting, for example, a key frame view as a part of a program view providing multiple levels of summary ranging from coarse to fine. The program profiles define distinctive characteristics of the content of the program, such as actors, stars, rating, director, release date, time stamps, keyword identification, trigger profile, still profile, event profile, character profile, object profile, color profile, texture profile, shape profile, motion profile, and categories. The program profiles are especially suitable to facilitate filtering and searching of the audio and video information. The description scheme enables users to have the provision of discovering interesting programs that they may be unaware of by providing a user description scheme. The user description scheme provides information to a software agent that in turn performs a search and filtering on behalf of the user by possibly using the system description scheme and the program description scheme information. It is to be understood that in one of the embodiments of the invention merely the program description scheme is included.

Program views contained in the program description scheme are a feature that supports a functionality such as close-up view. In the close-up view, a certain image object, e.g., a famous basketball player such as Michael Jordan, can be viewed up close by playing back a close-up sequence that is separate from the original program. An alternative view can be incorporated in a straightforward manner. Character profile on the other hand may contain spatio-temporal position and size of a rectangular region around the character of interest. This region can be enlarged by the presentation engine, or the presentation engine may darken outside the region to focus the user's attention to the characters spanning a certain number of frames. Information within the program description scheme may contain data about the initial size or location of the region, movement of the region from one frame to another, and duration and terms of the number of frames featuring the region. The character profile also provides provision for including text annotation and audio annotation about the character as well as web page information, and any other suitable information. Such character profiles may include the audio annotation which is separate from and in addition to the associated audio track of the video.

The program description scheme may likewise contain similar information regarding audio (such as radio broadcasts) and images (such as analog or digital photographs or a frame of a video).

The user description scheme 20 preferably includes the user's personal preferences, and information regarding the user's viewing history such as for example browsing history, filtering history, searching history, and device setting history. The user's personal preferences includes information regarding particular programs and categorizations of programs that the user prefers to view. The user description scheme may also include personal information about the particular user, such as demographic and geographic information, e.g. zip code and age. The explicit definition of the particular programs or attributes related thereto permits the system 16 to select those programs from the information contained within the available program description schemes 18 that may be of interest to the user. Frequently, the user does not desire to learn to program the device nor desire to explicitly program the device. In addition, the user description scheme 20 may not be sufficiently robust to include explicit definitions describing all desirable programs for a particular user. In such a case, the capability of the user description scheme 20 to adapt to the viewing habits of the user to accommodate different viewing characteristics not explicitly provided for or otherwise difficult to describe is useful. In such a case, the user description scheme 20 may be augmented or any technique can be used to compare the information contained in the user description scheme 20 to the available information contained in the program description scheme 18 to make selections. The user description scheme provides a technique for holding user preferences ranging from program categories to program views, as well as usage history. User description scheme information is persistent but can be updated by the user or by an intelligent software agent on behalf of the user at any arbitrary time. It may also be disabled by the user, at any time, if the user decides to do so. In addition, the user description scheme is modular and portable so that users can carry or port it from one device to another, such as with a handheld electronic device or smart card or transported over a network connecting multiple devices. When user description scheme is standardized among different manufacturers or products, user preferences become portable. For example, a user can personalize the television receiver in a hotel room permitting users to access information they prefer at any time and anywhere. In a sense, the user description scheme is persistent and timeless based. In addition, selected information within the program description scheme may be encrypted since at least part of the information may be deemed to be private (e.g., demographics). A user description scheme may be associated with an audiovisual program broadcast and compared with a particular user's description scheme of the receiver to readily determine whether or not the program's intended audience profile matches that of the user. It is to be understood that in one of the embodiments of the invention merely the user description scheme is included.

The system description scheme 22 preferably manages the individual programs and other data. The management may include maintaining lists of programs, categories, channels, users, videos, audio, and images. The management may include the capabilities of a device for providing the audio, video, and/or images. Such capabilities may include, for example, screen size, stereo, AC3, DTS, color, black/white, etc. The management may also include relationships between any one or more of the user, the audio, and the images in relation to one or more of a program description scheme(s) and a user description scheme(s). In a similar manner the management may include relationships between one or more of the program description scheme(s) and user description scheme(s). It is to be understood that in one of the embodiments of the invention merely the system description scheme is included.

The descriptors of the program description scheme and the user description scheme should overlap, at least partially, so that potential desirability of the program can be determined by comparing descriptors representative of the same information. For example, the program and user description scheme may include the same set of categories and actors. The program description scheme has no knowledge of the user description scheme, and vice versa, so that each description scheme is not dependant on the other for its existence. It is not necessary for the description schemes to be fully populated. It is also beneficial not to include the program description scheme with the user description scheme because there will likely be thousands of programs with associated description schemes which if combined with the user description scheme would result in a unnecessarily large user description scheme. It is desirable to maintain the user description scheme small so that it is more readily portable. Accordingly, a system including only the program description scheme and the user description scheme would be beneficial.

The user description scheme and the system description scheme should include at least partially overlapping fields. With overlapping fields the system can capture the desired information, which would otherwise not be recognized as desirable. The system description scheme preferably includes a list of users and available programs. Based on the master list of available programs, and associated program description scheme, the system can match the desired programs. It is also beneficial not to include the system description scheme with the user description scheme because there will likely be thousands of programs stored in the system description schemes which if combined with the user description scheme would result in a unnecessarily large user description scheme. It is desirable to maintain the user description scheme small so that it is more readily portable. For example, the user description scheme may include radio station preselected frequencies and/or types of stations, while the system description scheme includes the available stations for radio stations in particular cities. When traveling to a different city the user description scheme together with the system description scheme will permit reprogramming the radio stations. Accordingly, a system including only the system description scheme and the user description scheme would be beneficial.

The program description scheme and the system description scheme should include at least partially overlapping fields. With the overlapping fields, the system description scheme will be capable of storing the information contained within the program description scheme, so that the information is properly indexed. With proper indexing, the system is capable of matching such information with the user information, if available, for obtaining and recording suitable programs. If the program description scheme and the system description scheme were not overlapping then no information would be extracted from the programs and stored. System capabilities specified within the system description scheme of a particular viewing system can be correlated with a program description scheme to determine the views that can be supported by the viewing system. For instance, if the viewing device is not capable of playing back video, its system description scheme may describe its viewing capabilities as limited to keyframe view and slide view only. Program description scheme of a particular program and system description scheme of the viewing system are utilized to present the appropriate views to the viewing system. Thus, a server of programs serves the appropriate views according to a particular viewing system's capabilities, which may be communicated over a network or communication channel connecting the server with user's viewing device. It is preferred to maintain the program description scheme separate from the system description scheme because the content providers repackage the content and description schemes in different styles, times, and formats. Preferably, the program description scheme is associated with the program, even if displayed at a different time. Accordingly, a system including only the system description scheme and the program description scheme would be beneficial.

Figure 2:
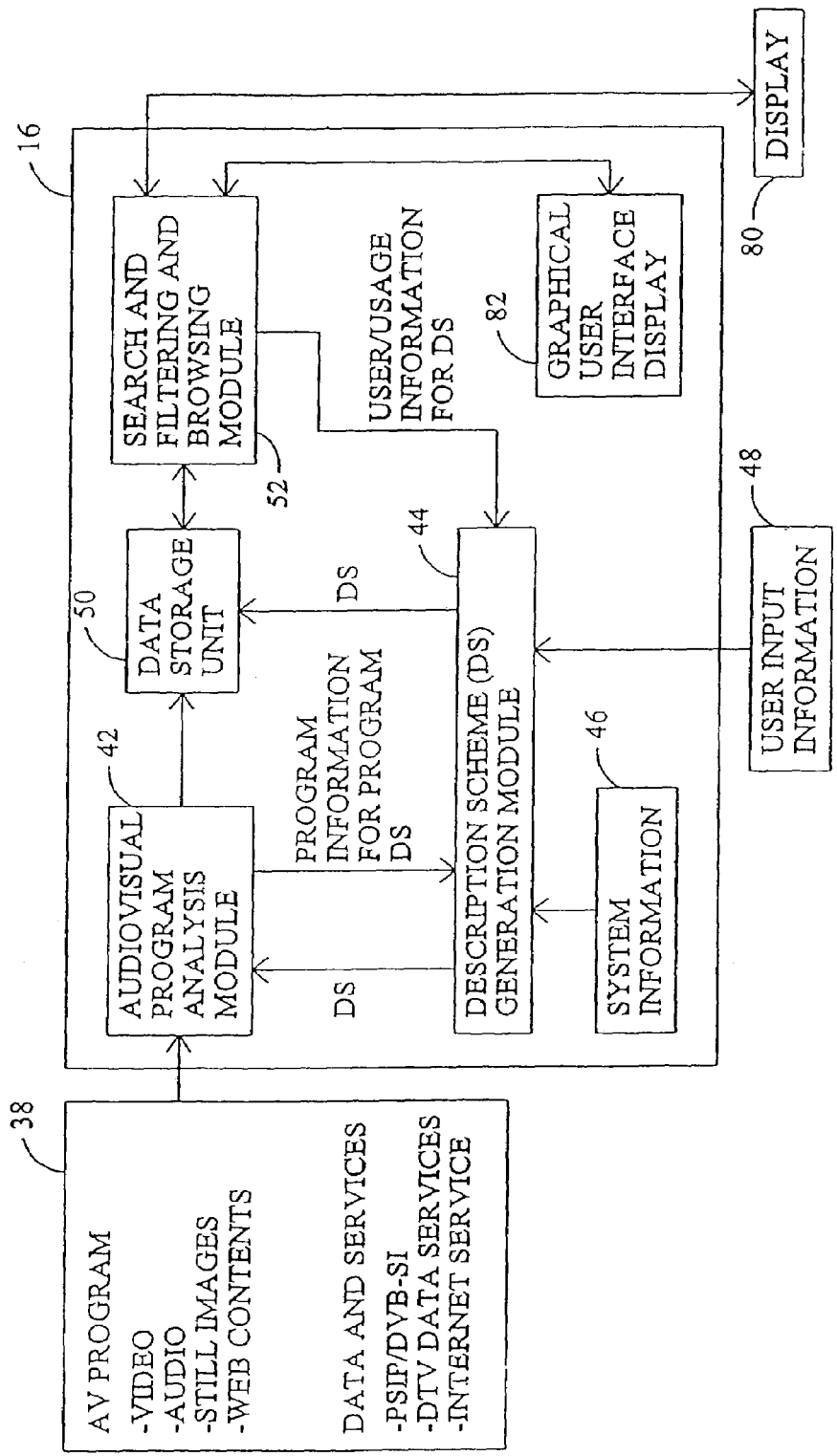
FIG. 2 is an exemplary embodiment of the audiovisual system, including an analysis module, of FIG. 1.

By preferably maintaining the independence of each of the three description schemes while having fields that correlate the same information, the programs 10, the users 14, and the system 12 may be interchanged with one another while maintaining the functionality of the entire system 16. Referring to FIG. 2, the audio, visual, or audiovisual program 38, is received by the system 16. The program 38 may originate at any suitable source, such as for example broadcast television, cable television, satellite television, digital television, Internet broadcasts, world wide web, digital video discs, still images, video cameras, laser discs, magnetic media, computer hard drive, video tape, audio tape, data services, radio broadcasts, and microwave communications. The program description stream may originate from any suitable source, such as for example PSIP/DVB-SI information in digital television broadcasts, specialized digital television data services, specialized Internet services, world wide web, data files, data over the telephone, and memory, such as computer memory. The program, user, and/or system description scheme may be transported over a network (communication channel). For example, the system description scheme may be transported to the source to provide the source with views or other capabilities that the device is capable of using. In response, the source provides the device with image, audio, and/or video content customized or otherwise suitable for the particular device. The system 16 may include any device(s) suitable to receive any one or more of such programs 38. An audiovisual program analysis module 42 performs an analysis of the received programs 38 to extract and provide program related information (descriptors) to the description scheme (DS) generation module 44. The program related information may be extracted from the data stream including the program 38 or obtained from any other source, such as for example data transferred over a telephone line, data already transferred to the system 16 in the past, or data from an associated file. The program related information preferably includes data defining both the program views and the program profiles available for the particular program 38. The analysis module 42 performs an analysis of the programs 38 using information obtained from (i) automatic audio-video analysis methods on the basis of low-level features that are extracted from the program(s), (ii) event detection techniques, (iii) data that is available (or extractable) from data sources or electronic program guides (EPGs, DVB-SI, and PSIP), and (iv) user information obtained from the user description scheme 20 to provide data defining the program description scheme.

Figure 3:
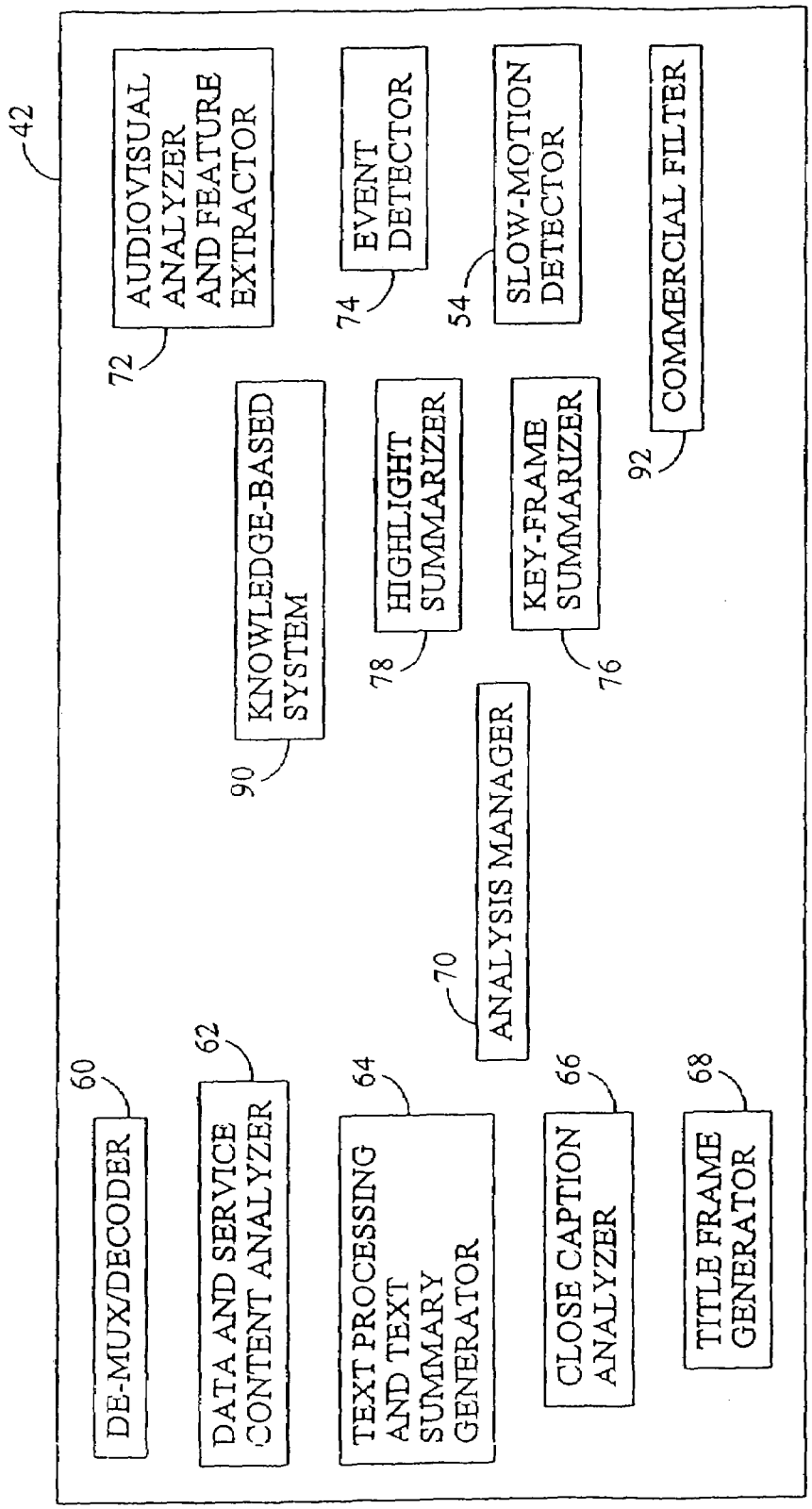
FIG. 3 is an exemplary embodiment of the analysis module of FIG. 2.

The selection of a particular program analysis technique depends on the amount of readily available data and the user preferences. For example, if a user prefers to watch a 5 minute video highlight of a particular program, such as a basketball game, the analysis module 42 may invoke a knowledge based system 90 (FIG. 3) to determine the highlights that form the best 5 minute summary. The knowledge based system 90 may invoke a commercial filter 92 to remove commercials and a slow motion detector 54 to assist in creating the video summary. The analysis module 42 may also invoke other modules to bring information together (e.g., textual information) to author particular program views. For example, if the program 38 is a home video where there is no further information available then the analysis module 42 may create a key-frame summary by identifying key-frames of a multi-level summary and passing the information to be used to generate the program views, and in particular a key frame view, to the description scheme. Referring also to FIG. 3, the analysis module 42 may also include other sub-modules, such as for example, a de-mux/decoder 60, a data and service content analyzer 62, a text processing and text summary generator 64, a close caption analyzer 66, a title frame generator 68, an analysis manager 70, an audiovisual analysis and feature extractor 72, an event detector 74, a key-frame summarizer 76, and a highlight summarizer 78.

The generation module 44 receives the system information 46 for the system description scheme. The system information 46 preferably includes data for the system description scheme 22 generated by the generation module 44. The generation module 44 also receives user information 48 including data for the user description scheme. The user information 48 preferably includes data for the user description scheme generated within the generation module 44. The user input 48 may include, for example, meta information to be included in the program and system description scheme. The user description scheme (or corresponding information) is provided to the analysis module 42 for selective analysis of the program(s) 38. For example, the user description scheme may be suitable for triggering the highlight generation functionality for a particular program and thus generating the preferred views and storing associated data in the program description scheme. The generation module 44 and the analysis module 42 provide data to a data storage unit 50. The storage unit 50 may be any storage device, such as memory or magnetic media.

A search, filtering, and browsing (SFB) module 52 implements the description scheme technique by parsing and extracting information contained within the description scheme. The SFB module 52 may perform filtering, searching, and browsing of the programs 38, on the basis of the information contained in the description schemes. An intelligent software agent is preferably included within the SFB module 52 that gathers and provides user specific information to the generation module 44 to be used in authoring and updating the user description scheme (through the generation module 44). In this manner, desirable content may be provided to the user though a display 80. The selections of the desired program(s) to be retrieved, stored, and/or viewed may be programmed, at least in part, through a graphical user interface 82. The graphical user interface may also include or be connected to a presentation engine for presenting the information to the user through the graphical user interface.

The intelligent management and consumption of audiovisual information using the multi-part description stream device provides a next-generation device suitable for the modern era of information overload. The device responds to changing lifestyles of individuals and families, and allows everyone to obtain the information they desire anytime and anywhere they want.

An example of the use of the device may be as follows. A user comes home from work late Friday evening being happy the work week is finally over. The user desires to catch up with the events of the world and then watch ABC's 20/20 show later that evening. It is now 9 PM and the 20/20 show will start in an hour at 10 PM. The user is interested in the sporting events of the week, and all the news about the Microsoft case with the Department of Justice. The user description scheme may include a profile indicating a desire that the particular user wants to obtain all available information regarding the Microsoft trial and selected sporting events for particular teams. In addition, the system description scheme and program description scheme provide information regarding the content of the available information that may selectively be obtained and recorded. The system, in an autonomous manner, periodically obtains and records the audiovisual information that may be of interest to the user during the past week based on the three description schemes. The device most likely has recorded more than one hour of audiovisual information so the information needs to be condensed in some manner. The user starts interacting with the system with a pointer or voice commands to indicate a desire to view recorded sporting programs. On the display, the user is presented with a list of recorded sporting events including Basketball and Soccer. Apparently the user's favorite Football team did not play that week because it was not recorded. The user is interested in basketball games and indicates a desire to view games. A set of title frames is presented on the display that captures an important moment of each game. The user selects the Chicago Bulls game and indicates a desire to view a 5 minute highlight of the game. The system automatically generates highlights. The highlights may be generated by audio or video analysis, or the program description scheme includes data indicating the frames that are presented for a 5 minute highlight. The system may have also recorded web-based textual information regarding the particular Chicago-Bulls game which may be selected by the user for viewing. If desired, the summarized information may be recorded onto a storage device, such as a DVD with a label. The stored information may also include an index code so that it can be located at a later time. After viewing the sporting events the user may decide to read the news about the Microsoft trial. It is now 9:50 PM and the user is done viewing the news. In fact, the user has selected to delete all the recorded news items after viewing them. The user then remembers to do one last thing before 10 PM in the evening. The next day, the user desires to watch the VHS tape that he received from his brother that day, containing footage about his brother's new baby girl and his vacation to Peru last summer. The user wants to watch the whole 2-hour tape but he is anxious to see what the baby looks like and also the new stadium built in Lima, which was not there last time he visited Peru. The user plans to take a quick look at a visual summary of the tape, browse, and perhaps watch a few segments for a couple of minutes, before the user takes his daughter to her piano lesson at 10 AM the next morning. The user plugs in the tape into his VCR, that is connected to the system, and invokes the summarization functionality of the system to scan the tape and prepare a summary. The user can then view the summary the next morning to quickly discover the baby's looks, and playback segments between the key-frames of the summary to catch a glimpse of the crying baby. The system may also record the tape content onto the system hard drive (or storage device) so the video summary can be viewed quickly. It is now 10:10 PM, and it seems that the user is 10 minutes late for viewing 20/20. Fortunately, the system, based on the three description schemes, has already been recording 20/20 since 10 PM. Now the user can start watching the recorded portion of 20/20 as the recording of 20/20 proceeds. The user will be done viewing 20/20 at 11:10 PM.

The average consumer has an ever increasing number of multimedia devices, such as a home audio system, a car stereo, several home television sets, web browsers, etc. The user currently has to customize each of the devices for optimal viewing and/or listening preferences. By storing the user preferences on a removable storage device, such as a smart card, the user may insert the card including the user preferences into such media devices for automatic customization. This results in the desired programs being automatically recorded on the VCR, and setting of the radio stations for the car stereo and home audio system. In this manner the user only has to specify his preferences at most once, on a single device and subsequently, the descriptors are automatically uploaded into devices by the removable storage device. The user description scheme may also be loaded into other devices using a wired or wireless network connection, e.g. that of a home network. Alternatively, the system can store the user history and create entries in the user description scheme based on the's audio and video viewing habits. In this manner, the user would never need to program the viewing information to obtain desired information. In a sense, the user descriptor scheme enables modeling of the user by providing a central storage for the user's listening, viewing, browsing preferences, and user's behavior. This enables devices to be quickly personalized, and enables other components, such as intelligent agents, to communicate on the basis of a standardized description format, and to make smart inferences regarding the user's preferences.

Many different realizations and applications can be readily derived from FIGS. 2 and 3 by appropriately organizing and utilizing their different parts, or by adding peripherals and extensions as needed. In its most general form, FIG. 2 depicts an audiovisual searching, filtering, browsing, and/or recording appliance that is personalizable. The list of more specific applications/implementations given below is not exhaustive but covers a range.

The user description scheme is a major enabler for personalizable audiovisual appliances. If the structure (syntax and semantics) of the description schemes is known amongst multiple appliances, the user (user) can carry (or otherwise transfer) the information contained within his user description scheme from one appliance to another, perhaps via a smart card—where these appliances support smart card interface—in order to personalize them. Personalization can range from device settings, such as display contrast and volume control, to settings of television channels, radio stations, web stations, web sites, geographic information, and demographic information such as age, zip code etc. Appliances that can be personalized may access content from different sources. They may be connected to the web, terrestrial or cable broadcast, etc., and they may also access multiple or different types of single media such as video, music, etc.

For example, one can personalize the car stereo using a smart card plugged out of the home system and plugged into the car stereo system to be able to tune to favorite stations at certain times. As another example, one can also personalize television viewing, for example, by plugging the smart card into a remote control that in turn will autonomously command the television receiving system to present the user information about current and future programs that fits the user's preferences. Different members of the household can instantly personalize the viewing experience by inserting their own smart card into the family remote. In the absence of such a remote, this same type of personalization can be achieved by plugging in the smart card directly to the television system. The remote may likewise control audio systems. In another implementation, the television receiving system holds user description schemes for multiple users (users) in local storage and identify different users (or group of users) by using an appropriate input interface. For example an interface using user-voice identification technology. It is noted that in a networked system the user description scheme may be transported over the network.

The user description scheme is generated by direct user input, and by using a software that watches the user to determine his/her usage pattern and usage history. User description scheme can be updated in a dynamic fashion by the user or automatically. A well defined and structured description scheme design allows different devices to interoperate with each other. A modular design also provides portability.

The description scheme adds new functionality to those of the current VCR. An advanced VCR system can learn from the user via direct input of preferences, or by watching the usage pattern and history of the user. The user description scheme holds user's preferences users and usage history. An intelligent agent can then consult with the user description scheme and obtain information that it needs for acting on behalf of the user. Through the intelligent agent, the system acts on behalf of the user to discover programs that fit the taste of the user, alert the user about such programs, and/or record them autonomously. An agent can also manage the storage in the system according to the user description scheme, i.e., prioritizing the deletion of programs (or alerting the user for transfer to a removable media), or determining their compression factor (which directly impacts their visual quality) according to user's preferences and history.

The program description scheme and the system description scheme work in collaboration with the user description scheme in achieving some tasks. In addition, the program description scheme and system description scheme in an advanced VCR or other system will enable the user to browse, search, and filter audiovisual programs. Browsing in the system offers capabilities that are well beyond fast forwarding and rewinding. For instance, the user can view a thumbnail view of different categories of programs stored in the system. The user then may choose frame view, shot view, key frame view, or highlight view, depending on their availability and user's preference. These views can be readily invoked using the relevant information in the program description scheme, especially in program views. The user at any time can start viewing the program either in parts, or in its entirety.

In this application, the program description scheme may be readily available from many services such as: (i) from broadcast (carried by EPG defined as a part of ATSC-PSIP (ATSC-Program Service Integration Protocol) in USA or DVB-SI (Digital Video Broadcast-Service Information) in Europe); (ii) from specialized data services (in addition to PSIP/DVB-SI); (iii) from specialized web sites; (iv) from the media storage unit containing the audiovisual content (e.g., DVD); (v) from advanced cameras (discussed later), and/or may be generated (i.e., for programs that are being stored) by the analysis module 42 or by user input 48.

Contents of digital still and video cameras can be stored and managed by a system that implements the description schemes, e.g., a system as shown in FIG. 2. Advanced cameras can store a program description scheme, for instance, in addition to the audiovisual content itself. The program description scheme can be generated either in part or in its entirety on the camera itself via an appropriate user input interface (e.g., speech, visual menu drive, etc.). Users can input to the camera the program description scheme information, especially those high-level (or semantic) information that may otherwise be difficult to automatically extract by the system. Some camera settings and parameters (e.g., date and time), as well as quantities computed in the camera (e.g., color histogram to be included in the color profile), can also be used in generating the program description scheme. Once the camera is connected, the system can browse the camera content, or transfer the camera content and its description scheme to the local storage for future use. It is also possible to update or add information to the description scheme generated in the camera.

The IEEE 1394 and Havi standard specifications enable this type of "audiovisual content" centric communication among devices. The description scheme API's can be used in the context of Havi to browse and/or search the contents of a camera or a DVD which also contain a description scheme associated with their content, i.e., doing more than merely invoking the PLAY API to play back and linearly view the media.

The description schemes may be used in archiving audiovisual programs in a database. The search engine uses the information contained in the program description scheme to retrieve programs on the basis of their content. The program description scheme can also be used in navigating through the contents of the database or the query results. The user description scheme can be used in prioritizing the results of the user query during presentation. It is possible of course to make the program description scheme more comprehensive depending on the nature of the particular application.

The description scheme fulfills the user's desire to have applications that pay attention and are responsive to their viewing and usage habits, preferences, and personal demographics. The proposed user description scheme directly addresses this desire in its selection of fields and interrelationship to other description schemes. Because the description schemes are modular in nature, the user can port his user description scheme from one device to another in order to "personalize" the device.

The proposed description schemes can be incorporated into current products similar to those from TiVo and Replay TV in order to extend their entertainment informational value. In particular, the description scheme will enable audiovisual browsing and searching of programs and enable filtering within a particular program by supporting multiple program views such as the highlight view. In addition, the description scheme will handle programs coming from sources other than television broadcasts for which TiVo and Replay TV are not designed to handle. In addition, by standardization of TiVo and Replay TV type of devices, other products may be interconnected to such devices to extend their capabilities, such as devices supporting an MPEG 7 description. MPEG-7 is the Moving Pictures Experts Group-7, acting to standardize descriptions and description schemes for audiovisual information. The device may also be extended to be personalized by multiple users, as desired.

Because the description scheme is defined, the intelligent software agents can communicate among themselves to make intelligent inferences regarding the user's preferences. In addition, the development and upgrade of intelligent software agents for browsing and filtering applications can be simplified based on the standardized user description scheme.

The description scheme is multi-modal in the following sense that it holds both high level (semantic) and low level features and/or descriptors. For example, the high and low level descriptors are actor name and motion model parameters, respectively. High level descriptors are easily readable by humans while low level descriptors are more easily read by machines and less understandable by humans. The program description scheme can be readily harmonized with existing EPG, PSIP, and DVB-SI information facilitating search and filtering of broadcast programs. Existing services can be extended in the future by incorporating additional information using the compliant description scheme.

For example, one case may include audiovisual programs that are prerecorded on a media such as a digital video disc where the digital video disc also contains a description scheme that has the same syntax and semantics of the description scheme that the FSB module uses. If the FSB module uses a different description scheme, a transcoder (converter) of the description scheme may be employed. The user may want to browse and view the content of the digital video disc. In this case, the user may not need to invoke the analysis module to author a program description. However, the user may want to invoke his or her user description scheme in filtering, searching and browsing the digital video disc content. Other sources of program information may likewise be used in the same manner.

It is to be understood that any of the techniques described herein with relation to video are equally applicable to images (such as still image or a frame of a video) and audio (such as radio).

Figure 4:
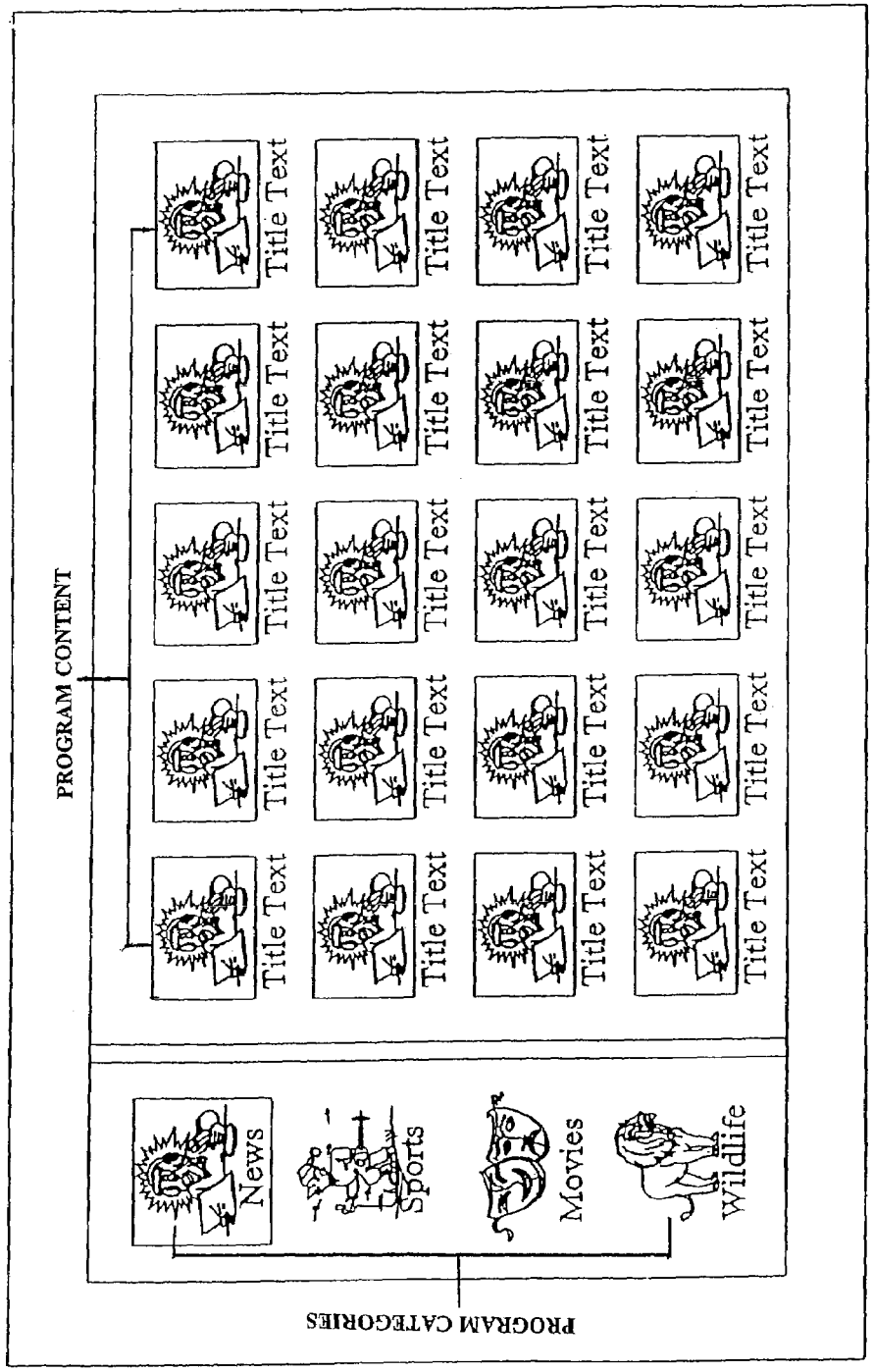
FIG. 4 is an illustration of a thumbnail view (category) for the audiovisual system.
Figure 5:
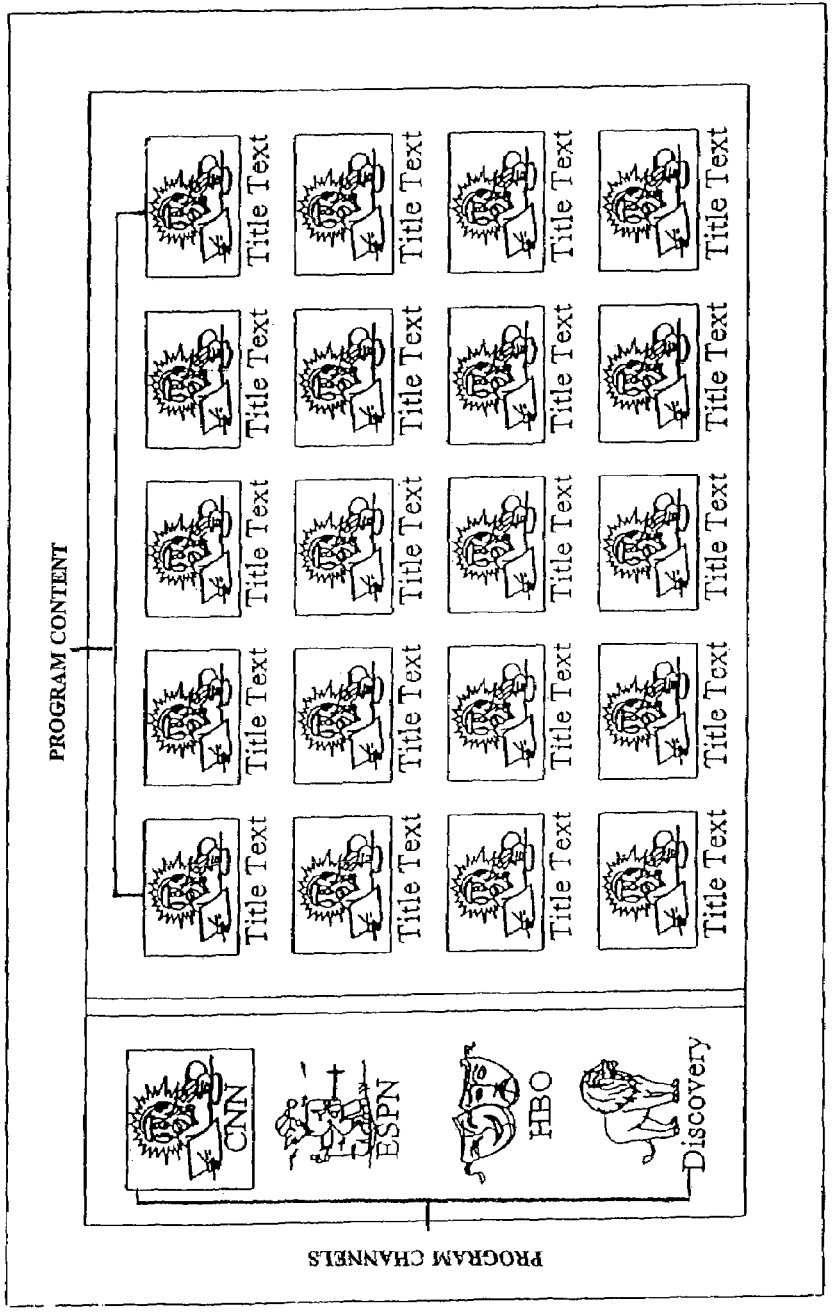
FIG. 5 is an illustration of a thumbnail view (channel) for the audiovisual system.
Figure 6:
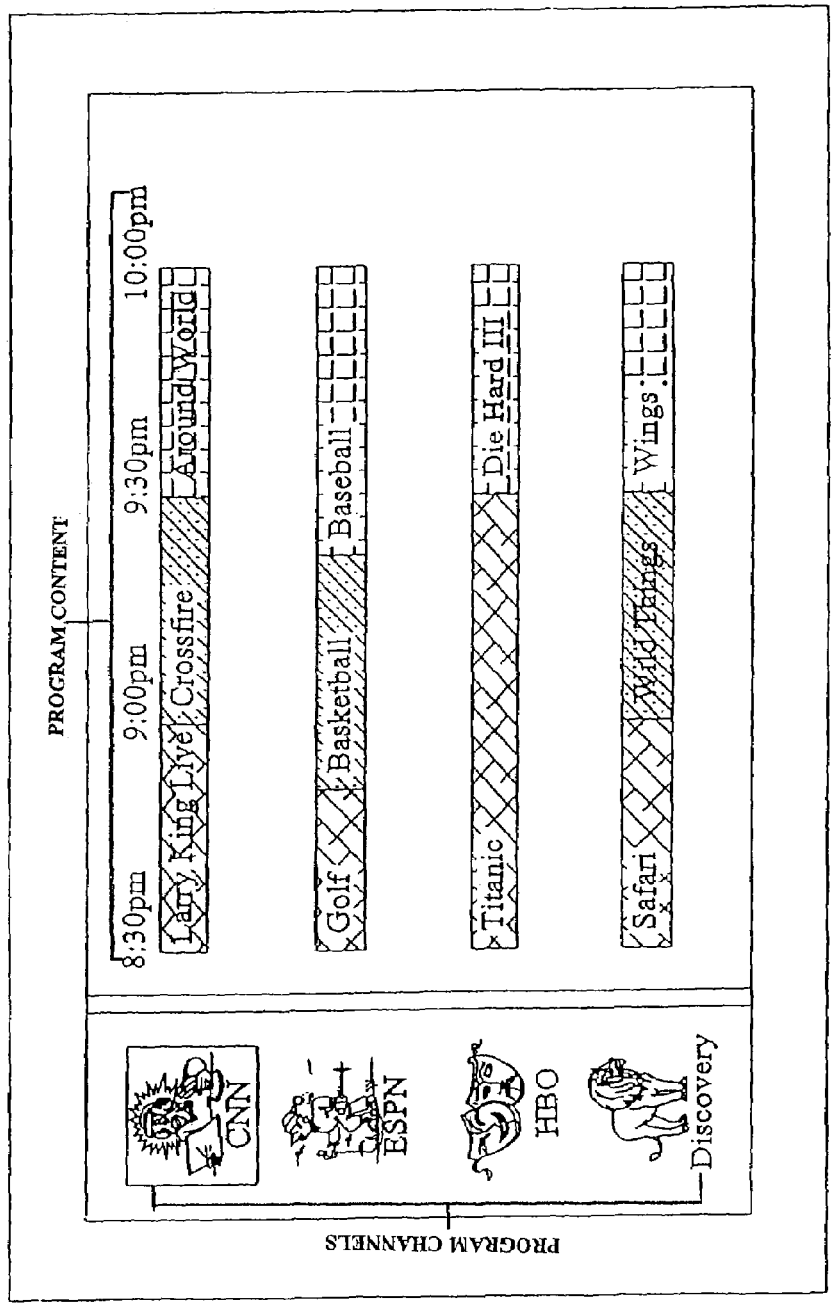
FIG. 6 is an illustration of a text view (channel) for the audiovisual system.
Figure 7:
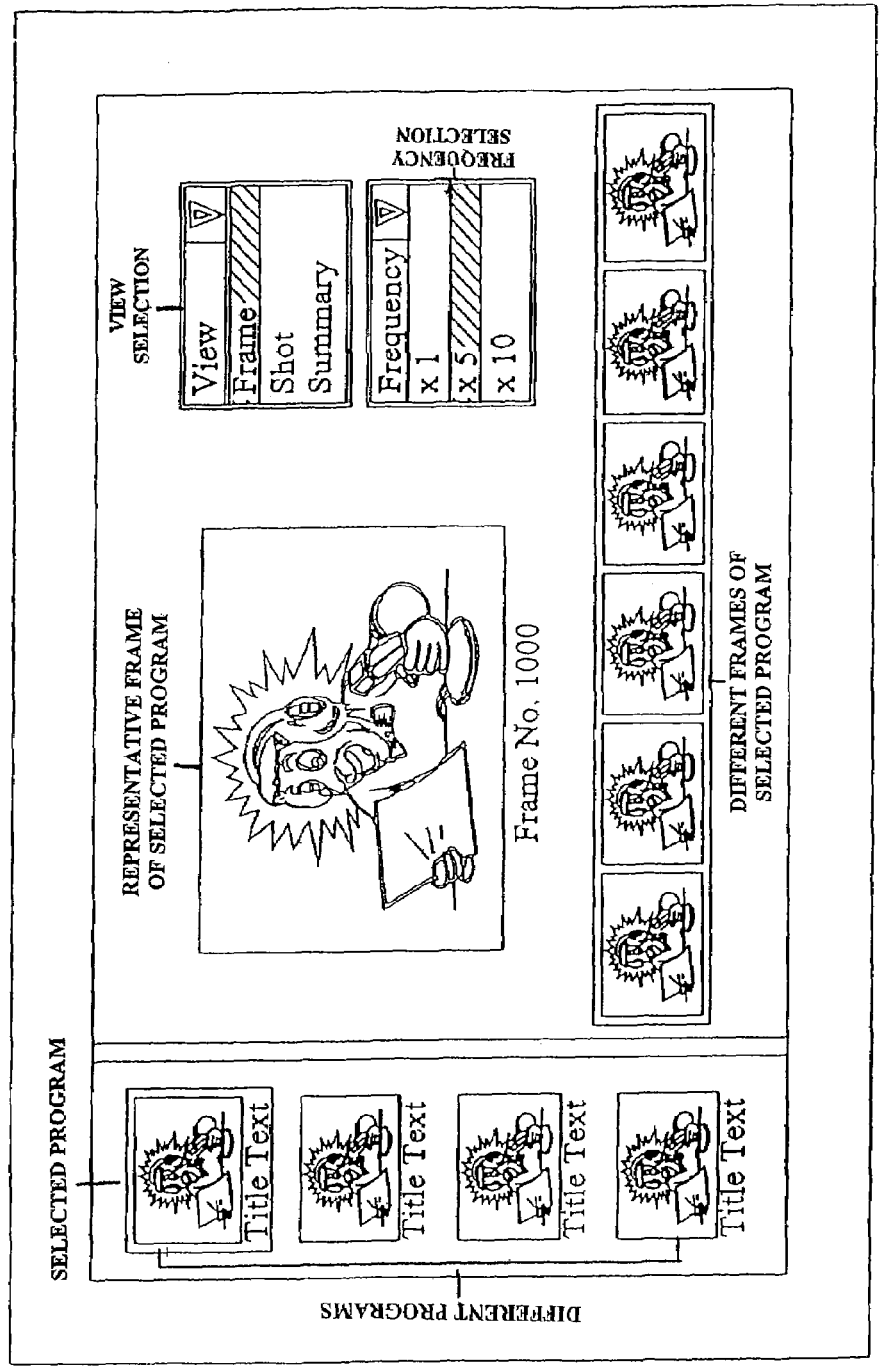
FIG. 7 is an illustration of a frame view for the audiovisual system.
Figure 8:
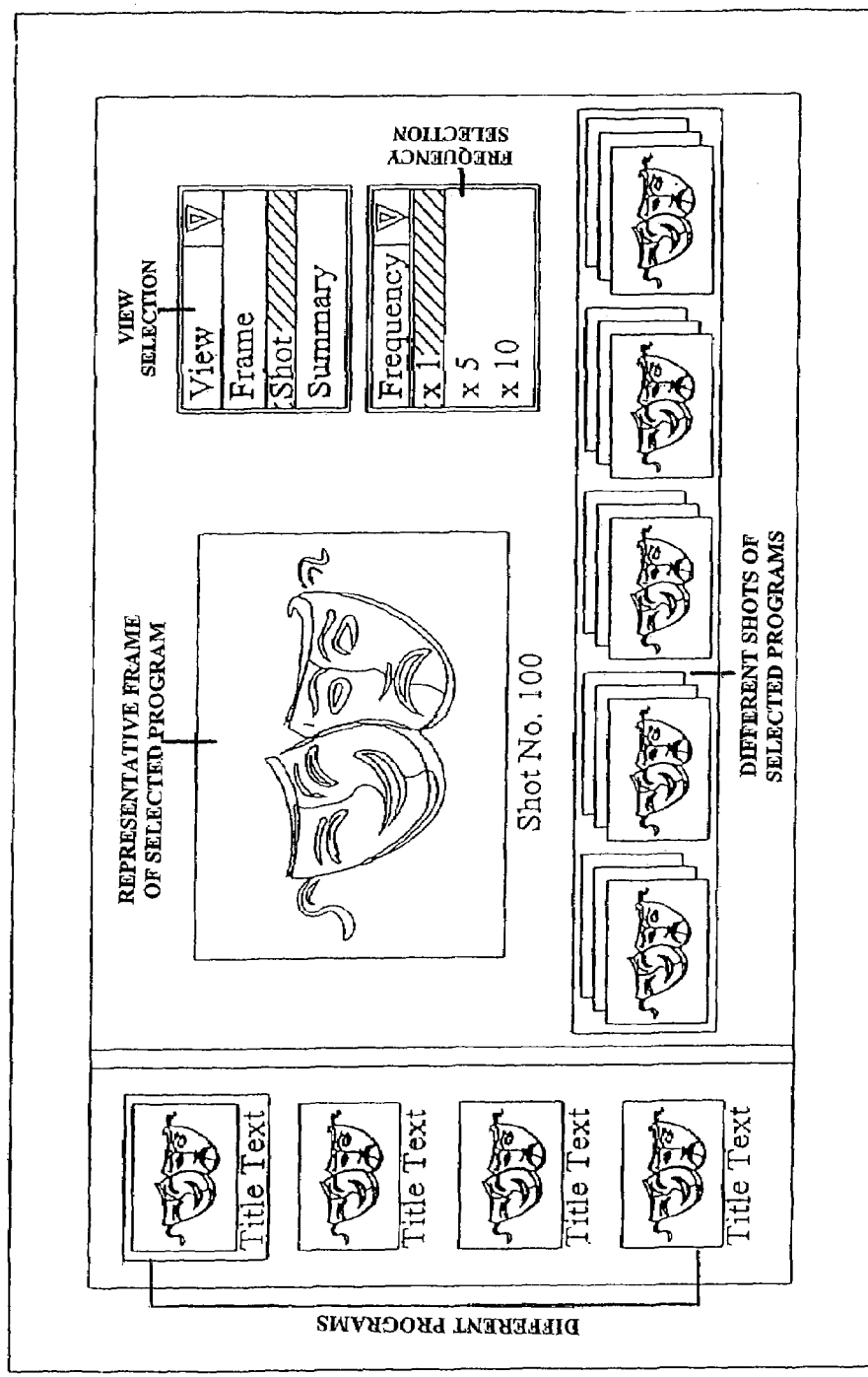
FIG. 8 is an illustration of a shot view for the audiovisual system.
Figure 9:
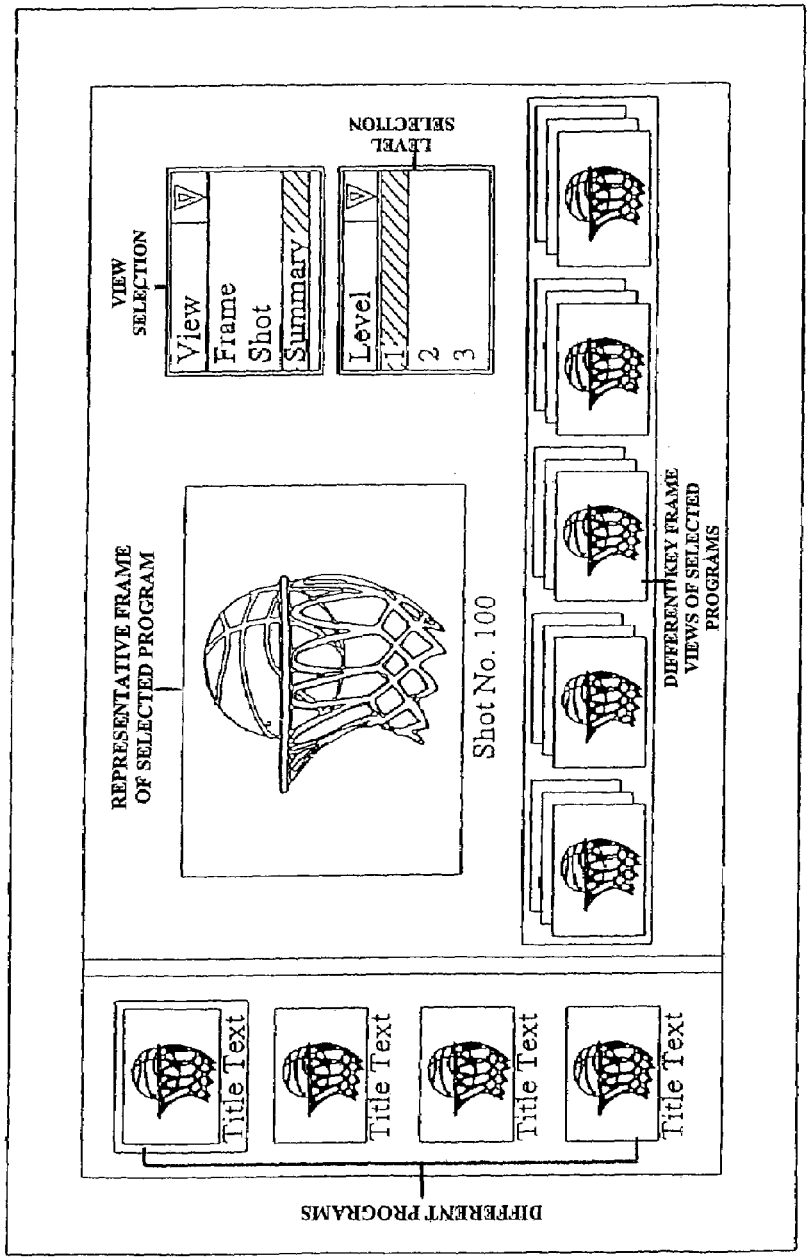
FIG. 9 is an illustration of a key frame view the audiovisual system.
Figure 10:
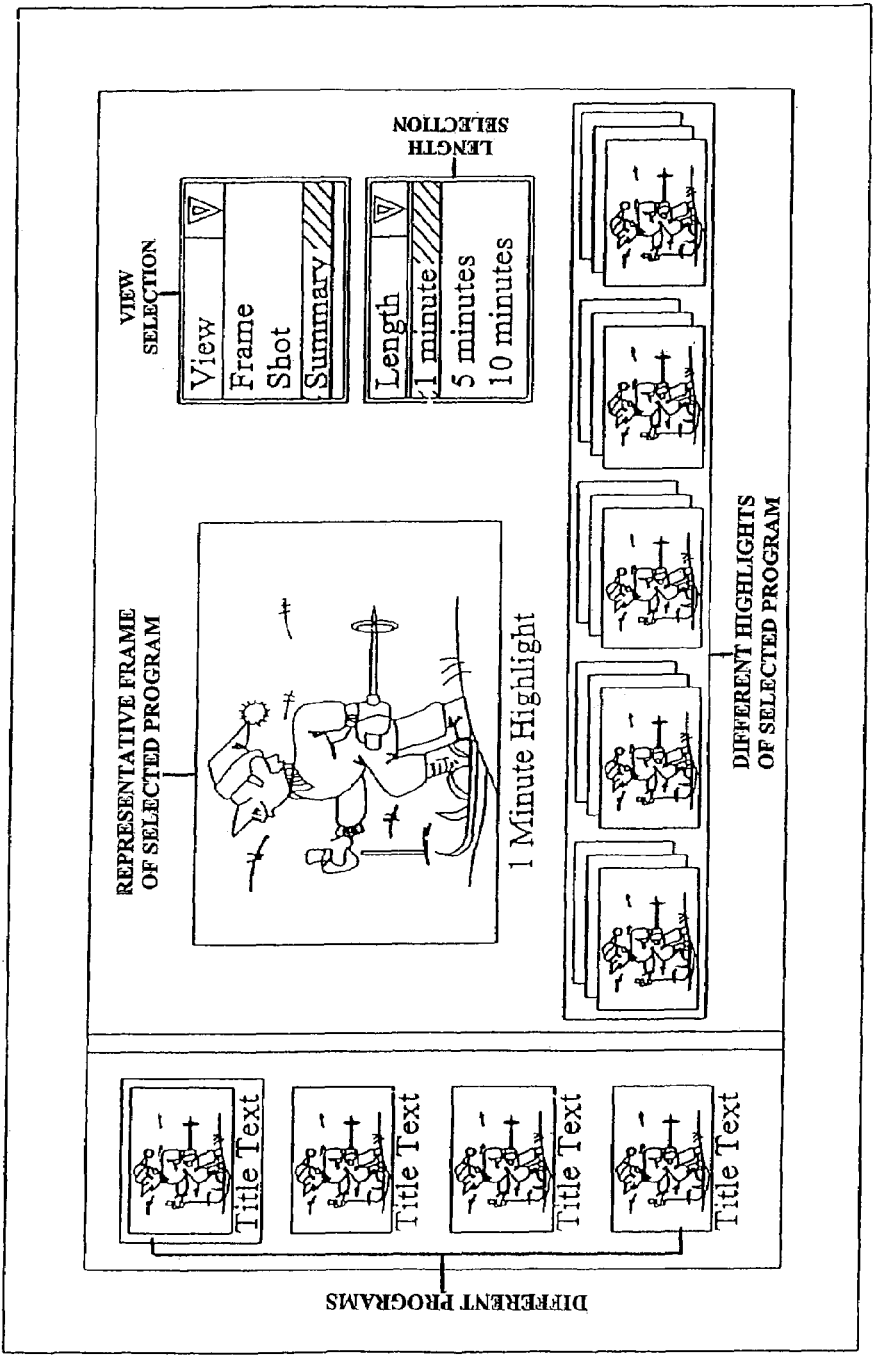
FIG. 10 is an illustration of a highlight view for the audiovisual system.
Figure 11:
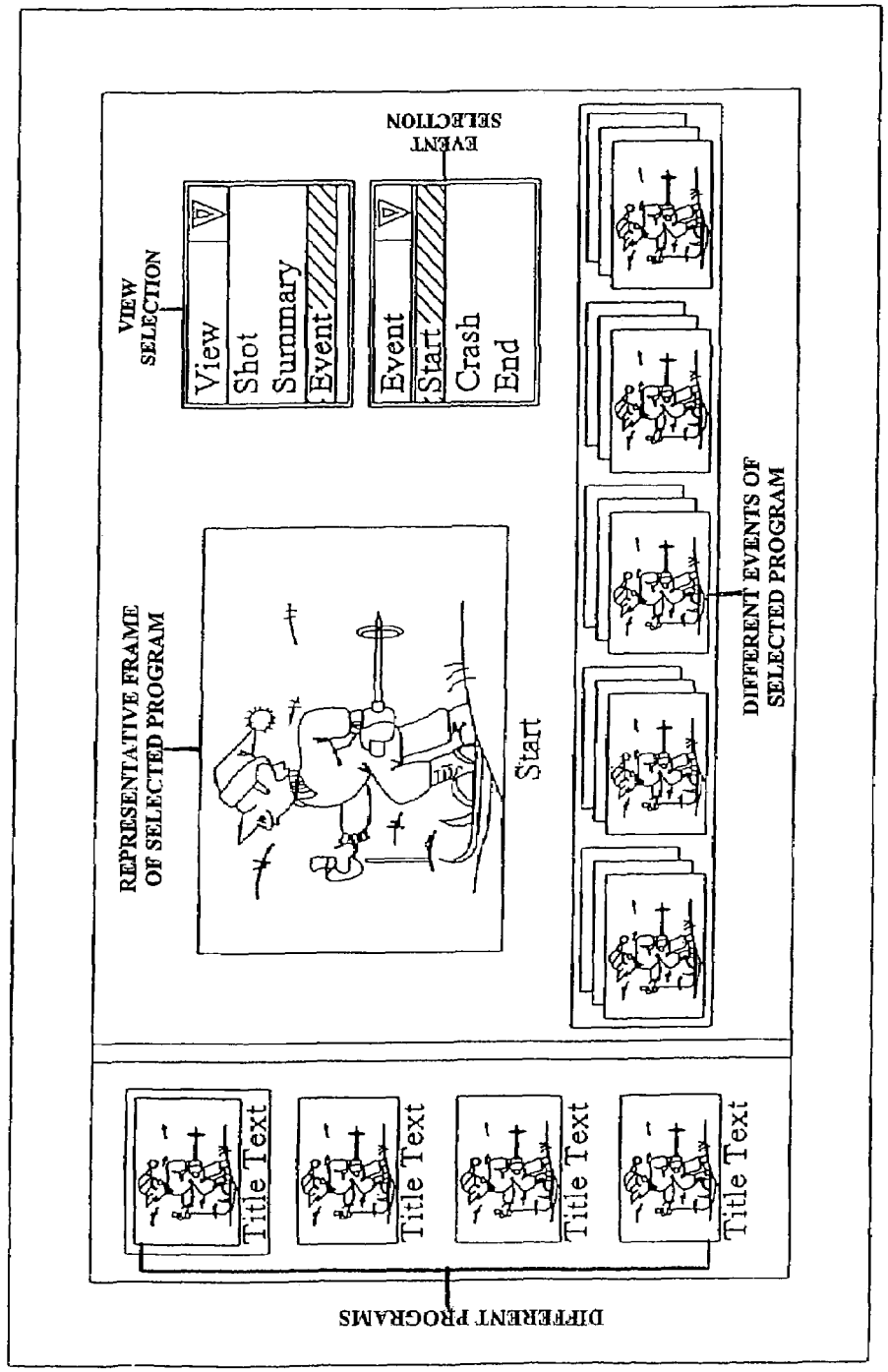
FIG. 11 is an illustration of an event view for the audiovisual system.
Figure 12:
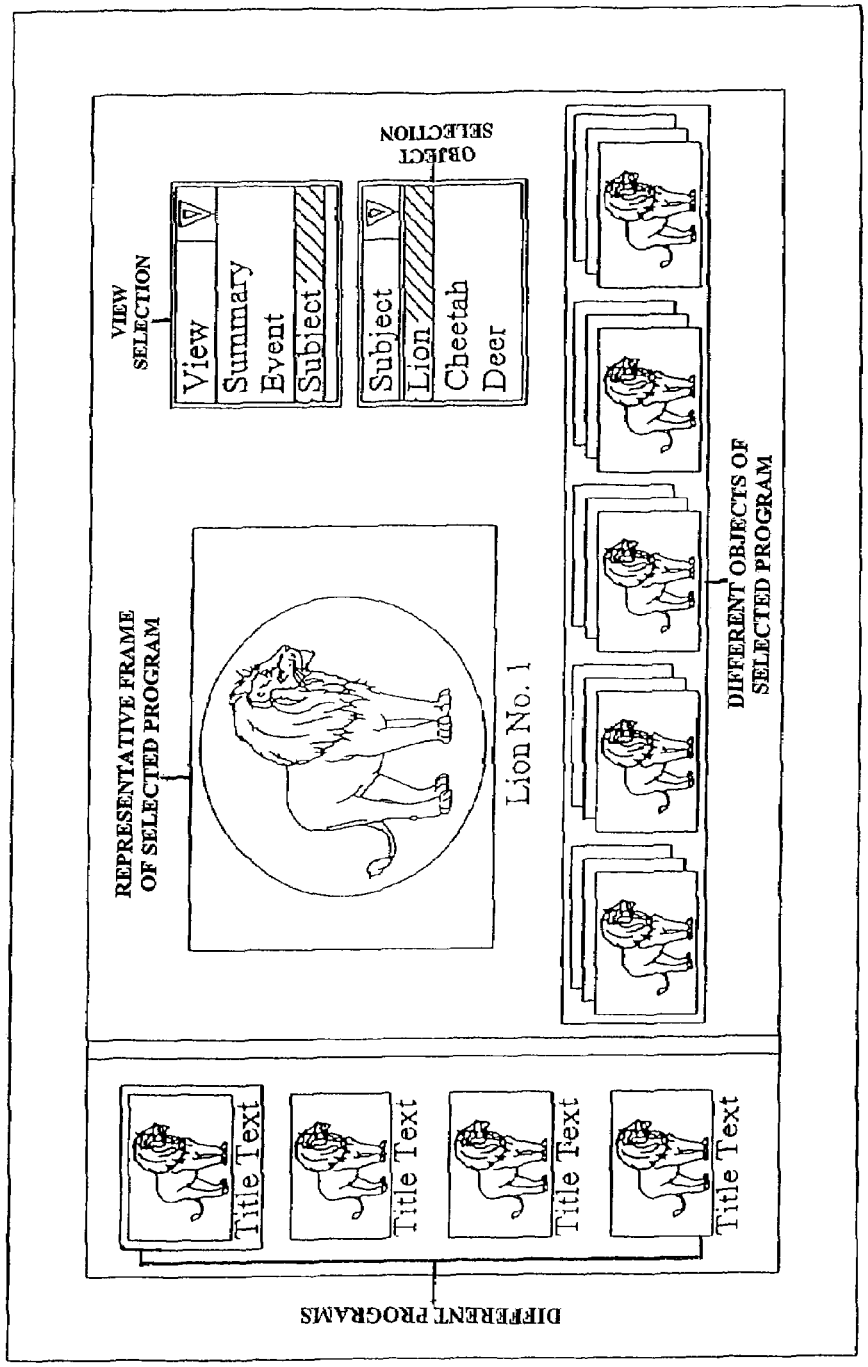
FIG. 12 is an illustration of a character/object view for the audiovisual system.

An example of an audiovisual interface is shown in FIGS. 4-12 which is suitable for the preferred audiovisual description scheme. Referring to FIG. 4, by selecting the thumbnail function as a function of category provides a display with a set of categories on the left hand side. Selecting a particular category, such as news, provides a set of thumbnail views of different programs that are currently available for viewing. In addition, the different programs may also include programs that will be available at a different time for viewing. The thumbnail views are short video segments that provide an indication of the content of the respective actual program that it corresponds with. Referring to FIG. 5, a thumbnail view of available programs in terms of channels may be displayed, if desired. Referring to FIG. 6, a text view of available programs in terms of channels may be displayed, if desired. Referring to FIG. 7, a frame view of particular programs may be displayed, if desired. A representative frame is displayed in the center of the display with a set of representative frames of different programs in the left hand column. The frequency of the number of frames may be selected, as desired. Also a set of frames are displayed on the lower portion of the display representative of different frames during the particular selected program. Referring to FIG. 8, a shot view of particular programs may be displayed, as desired. A representative frame of a shot is displayed in the center of the display with a set of representative frames of different programs in the left hand column. Also a set of shots are displayed on the lower portion of the display representative of different shots (segments of a program, typically sequential in nature) during the particular selected program. Referring to FIG. 9, a key frame view of particular programs may be displayed, as desired. A representative frame is displayed in the center of the display with a set of representative frames of different programs in the left hand column. Also a set of key frame views are displayed on the lower portion of the display representative of different key frame portions during the particular selected program. The number of key frames in each key frame view can be adjusted by selecting the level. Referring to FIG. 10, a highlight view may likewise be displayed, as desired. Referring to FIG. 11, an event view may likewise be displayed, as desired. Referring to FIG. 12, a character/object view may likewise be displayed, as desired.

An example of the description schemes is shown below in XML. The description scheme may be implemented in any language and include any of the included descriptions (or more), as desired.

The proposed program description scheme includes three major sections for describing a video program. The first section identifies the described program. The second section defines a number of views which may be useful in browsing applications. The third section defines a number of profiles which may be useful in filtering and search applications. Therefore, the overall structure of the proposed description scheme is as follows:

```
<?XML version="1.0">
<!DOCTYPE MPEG-7 SYSTEM "mpeg-7.dtd">
<ProgramIdentity>
    <ProgramID> ... </ProgramID>
    <ProgramName> ... </ProgramName>
    <SourceLocation> ... </SourceLocation>
</ProgramIdentity>
<ProgramViews>
    <ThumbnailView> ... </ThumbnailView>
    <SlideView> ... </SlideView>
    <FrameView> ... </FrameView>
    <ShotView> ... </ShotView>
    <KeyFrameView> ... </KeyFrameView>
    <HighlightView> ... </HighlightView>
    <EventView> ... </EventView>
    <CloseUpView> ... </CloseUpView>
    <AlternateView> ... </AlternateView>
</ProgramViews>
<ProgramProfiles>
    <GeneralProfile> ... </GeneralProfile>
    <CategoryProfile> ... </CategoryProfile>
    <DateTimeProfile> ... </DateTimeProfile>
    <KeywordProfile> ... </KeywordProfile>
    <TriggerProfile> ... </TriggerProfile>
    <StillProfile> ... </StillProfile>
    <EventProfile> ... </EventProfile>
    <CharacterProfile> ... </CharacterProfile>
    <ObjectProfile> ... </ObjectProfile>
    <ColorProfile> ... </ColorProfile>
    <TextureProfile> ... </TextureProfile>
    <ShapeProfile> ... </ShapeProfile>
    <MotionProfile> ... </MotionProfile>
</ProgramProfiles>
```

Program Identity
Program ID
    <ProgramID> program-id </ProgramID>
The descriptor <ProgramID> contains a number or a string to identify a program.
Program name
    <ProgramName> program-name </ProgramName>
The descriptor <ProgramName> specifies the name of a program.
Source location
    <SourceLocation> source-url </SourceLocation>
The descriptor <SourceLocation> specifies the location of a program in URL format.
Program Views
Thumbnail view
    <ThumbnailView>
      <Image> thumbnail-image </Image>
    </ThumbnailView>

The descriptor <ThumbnailView> specifies an image as the thumbnail representation of a program.
Slide view
    <SlideView> frame-id ... </SlideView>
The descriptor <SlideView> specifies a number of frames in a program which may be viewed as snapshots or in a slide show manner.
Frame view
    <FrameView> start-frame-id </FrameView>
The descriptor <FrameView> specifies the start and end frames of a program. This is the most basic view of a program and any program has a frame view.
Shot view

```
<ShotView>
    <Shot id=" "> start-frame-id end-frame-id display-frame-id </Shot>
    <Shot id=" "> start-frame-id end-frame-id display-frame-id </Shot>
    ...
</ShotView>
```

The descriptor <ShotView> specifies a number of shots in a program. The <Shot> descriptor defines the start and end frames of a shot. It may also specify a frame to represent the shot.
Key-frame view

```
<KeyFrameView>
    <KeyFrames level=" ">
        <Clip id=" "> start-frame-id end-frame-id display-frame-id
        </Clip>
        <Clip id=" "> start-frame-id end-frame-id display-frame-id
        </Clip>
        ...
    </KeyFrames>
    <KeyFrames level=" ">
        <Clip id=" "> start-frame-id end-frame-id display-frame-id
        </Clip>
        <Clip id=" "> start-frame-id end-frame-id display-frame-id
        </Clip>
        ...
    </KeyFrames>
    ...
</KeyFrameView>
```

The descriptor <KeyFrameView> specifies key frames in a program. The key frames may be organized in a hierarchical manner and the hierarchy is captured by the descriptor <KeyFrames> with a level attribute. The clips which are associated with each key frame are defined by the descriptor <Clip>. Here the display frame in each clip is the corresponding key frame.
Highlight view

```
<HighlightView>
    <Highlight length=" ">
        <Clip id=" "> start-frame-id end-frame-id display-frame-id
        </Clip>
        <Clip id=" "> start-frame-id end-frame-id display-frame-id
        </Clip>
        ...
    </Highlight>
    <Highlight length=" ">
        <Clip id=" "> start-frame-id end-frame-id display-frame-id
        </Clip>
        <Clip id=" "> start-frame-id end-frame-id display-frame-id
```

```
        </Clip>
        ...
    </Highlight>
    ...
</HighlightView>
```

The descriptor <HighlightView> specifies clips to form highlights of a program. A program may have different versions of highlights which are tailored into various time length. The clips are grouped into each version of highlight which is specified by the descriptor <Highlight> with a length attribute.

Event view

```
<EventView>
    <Events name=" ">
        <Clip id=" "> start-frame-id end-frame-id display-frame-id
        </Clip>
        <Clip id=" "> start-frame-id end-frame-id display-frame-id
        </Clip>
        ...
    </Events>
    <Events name=" ">
        <Clip id=" "> start-frame-id end-frame-id display-frame-id
        </Clip>
        <Clip id=" "> start-frame-id end-frame-id display-frame-id
        </Clip>
        ...
    </Events>
    ...
</EventView>
```

The descriptor <EventView> specifies clips which are related to certain events in a program. The clips are grouped into the corresponding events which are specified by the descriptor <Event> with a name attribute.

Close-up view

```
<CloseUpView>
    <Target name=" ">
        <Clip id=" "> start-frame-id end-frame-id display-frame-id
        </Clip>
        <Clip id=" "> start-frame-id end-frame-id display-frame-id
        </Clip>
        ...
    </Target>
    <Target name=" ">
        <Clip id=" "> start-frame-id end-frame-id display-frame-id
        </Clip>
        <Clip id=" "> start-frame-id end-frame-id display-frame-id
        </Clip>
        ...
    </Target>
    ...
</CloseUpView>
```

The descriptor <CloseUpView> specifies clips which may be zoomed in to certain targets in a program. The clips are grouped into the corresponding targets which are specified by the descriptor <Target> with a name attribute.

Alternate view

```
<AlternateView>
    <AlternateSource id=" "> source-url </AlternateSource>
    <AlternateSource id=" "> source-url </AlternateSource>
    ...
</AlternateView>
```

The descriptor <AlternateView> specifies sources which may be shown as alternate views of a program. Each alternate view is specified by the descriptor <AlternateSource> with an id attribute. The locate of the source may be specified in URL format.

Program Profiles

General profile

```
<GeneralProfile>
    <Title> title-text </Title>
    <Abstract> abstract-text </Abstract>
    <Audio> voice-annotation </Audio>
    <Www> web-page-url </Www>
    <ClosedCaption> yes/no </ClosedCaption>
    <Language> language-name </Language>
    <Rating> rating </Rating>
    <Length> time </Length>
    <Authors> author-name ... </Authors>
    <Producers> producer-name ... </Producers>
    <Directors> director-name ... </Directors>
    <Actors> actor-name ... </Actors>
    ...
</GeneralProfile>
```

The descriptor <GeneralProfile> describes the general aspects of a program.

Category profile

<CategoryProfile> category-name ... </CategoryProfile>

The descriptor <CategoryProfile> specifies the categories under which a program may be classified.

Date-time profile

```
<DateTimeProfile>
    <ProductionDate> date </ProductionDate>
    <ReleaseDate> date </ReleaseDate>
    <RecordingDate> date </RecordingDate>
    <RecordingTime> time </RecordingTime>
    ...
</DateTimeProfile>
```

The descriptor <DateTimeProfile> specifies various date and time information of a program.

Keyword profile

<KeywordProfile> keyword ... </KeywordProfile>

The descriptor <KeywordProfile> specifies a number of keywords which may be used to filter or search a program.

Trigger profile

<TriggerProfile> trigger-frame-id ... </TriggerProfile>

The descriptor <TriggerProfile> specifies a number of frames in a program which may be used to trigger certain actions while the playback of the program.

Still profile

```
<StillProfile>
    <Still id=" ">
        <HotRegion id =" ">
            <Location> x1 y1 x2 y2 </Location>
            <Text> text-annotation </Text>
            <Audio> voice-annotation </Audio>
            <Www> web-page-url </Www>
        </HotRegion>
        <HotRegion id =" ">
            <Location> x1 y1 x2 y2 </Location>
            <Text> text-annotation </Text>
            <Audio> voice-annotation </Audio>
            <Www> web-page-url </Www>
        </HotRegion>
        ...
    </Still>
    <Still id=" ">
        <HotRegion id =" ">
            <Location> x1 y1 x2 y2 </Location>
            <Text> text-annotation </Text>
            <Audio> voice-annotation </Audio>
            <Www> web-page-url </Www>
        </HotRegion>
        <HotRegion id =" ">
            <Location> x1 y1 x2 y2 </Location>
            <Text> text-annotation </Text>
            <Audio> voice-annotation </Audio>
            <Www> web-page-url </Www>
        </HotRegion>
        ...
    </Still>
    ...
</StillProfile>
```

The descriptor <StillProfile> specifies hot regions or regions of interest within a frame. The frame is specified by the descriptor <Still> with an id attribute which corresponds to the frame-id. Within a frame, each hot region is specified by the descriptor <HotRegion> with an id attribute.

Event profile

```
<EventProfile>
    <EventList> event-name ... </EventList>
    <Event name=" ">
        <Www> web-page-url </Www>
        <Occurrence id=" ">
            <Duration> start-frame-id end-frame-id </Duration>
            <Text> text-annotation </Text>
            <Audio> voice-annotation </Audio>
        </Occurrence>
        <Occurrence id=" ">
            <Duration> start-frame-id end-frame-id </Duration>
            <Text> text-annotation </Text>
            <Audio> voice-annotation </Audio>
        </Occurrence>
        ...
    </Event>
    <Event name=" ">
        <Www> web-page-url </Www>
        <Occurrence id=" ">
            <Duration> start-frame-id end-frame-id </Duration>
            <Text> text-annotation </Text>
            <Audio> voice-annotation </Audio>
        </Occurrence>
        <Occurrence id=" ">
            <Duration> start-frame-id end-frame-id </Duration>
            <Text> text-annotation </Text>
            <Audio> voice-annotation </Audio>
        </Occurrence>
        ...
    </Event>
    ...
</EventProfile>
```

The descriptor <EventProfile> specifies the detailed information for certain events in a program. Each event is specified by the descriptor <Event> with a name attribute. Each occurrence of an event is specified by the descriptor <Occurrence> with an id attribute which may be matched with a clip id under <EventView>.

Character profile

```
<CharacterProfile>
    <CharacterList> character-name ... </CharacterList>
    <Character name=" ">
        <ActorName> actor-name </ActorName>
        <Gender> male </Gender>
        <Age> age </Age>
        <Www> web-page-url </Www>
        <Occurrence id=" ">
            <Duration> start-frame-id end-frame-id </Duration>
            <Location> frame:[x1 y1 x2 y2] ... </Location>
            <Motion> $v_x\ v_y\ v_z\ v_\alpha\ v_\beta\ v_\gamma$ </Motion>
            <Text> text-annotation </Text>
            <Audio> voice-annotation </Audio>
        </Occurrence>
        <Occurrence id=" ">
            <Duration> start-frame-id end-frame-id </Duration>
            <Location> frame:[x1 y1 x2 y2] ... </Location>
            <Motion> $v_x\ v_y\ v_z\ v_\alpha\ v_\beta\ v_\gamma$ </Motion>
            <Text> text-annotation </Text>
            <Audio> voice-annotation </Audio>
        </Occurrence>
        ...
    </Character>
    <Character name=" ">
        <ActorName> actor-name </ActorName>
        <Gender> male </Gender>
        <Age> age </Age>
        <Www> web-page-url </Www>
        <Occurrence id=" ">
            <Duration> start-frame-id end-frame-id </Duration>
            <Location> frame:[x1 y1 x2 y2] ... </Location>
            <Motion> $v_x\ v_y\ v_z\ v_\alpha\ v_\beta\ v_\gamma$ </Motion>
            <Text> text-annotation </Text>
            <Audio> voice-annotation </Audio>
        </Occurrence>
        <Occurrence id=" ">
            <Duration> start-frame-id end-frame-id </Duration>
            <Location> frame:[x1 y1 x2 y2] ... </Location>
            <Motion> $v_x\ v_y\ v_z\ v_\alpha\ v_\beta\ v_\gamma$ </Motion>
            <Text> text-annotation </Text>
            <Audio> voice-annotation </Audio>
        </Occurrence>
        ...
    </Character>
    ...
</CharacterProfile>
```

The descriptor <CharacterProfile> specifies the detailed information for certain characters in a program. Each character is specified by the descriptor <Character> with a name attribute. Each occurrence of a character is specified by the descriptor <Occurrence> with an id attribute which may be matched with a clip id under <CloseUpView>.

Object profile

```
<ObjectProfile>
    <ObjectList> object-name ... </ObjectList>
    <Object name=" ">
        <Www> web-page-url </Www>
        <Occurrence id=" ">
            <Duration> start-frame-id end-frame-id </Duration>
            <Location> frame:[x1 y1 x2 y2] ... </Location>
            <Motion> $v_x\ v_y\ v_z\ v_\alpha\ v_\beta\ v_\gamma$ </Motion>
            <Text> text-annotation </Text>
            <Audio> voice-annotation </Audio>
```

-continued

```
        </Occurrence>
        <Occurrence id=" ">
            <Duration> start-frame-id end-frame-id </Duration>
            <Location> frame:[x1 y1 x2 y2] ... </Location>
            <Motion> vx vy vz vα vβ vγ </Motion>
            <Text> text-annotation </Text>
            <Audio> voice-annotation </Audio>
        </Occurrence>
        ...
    </Object>
    <Object name=" ">
        <Www> web-page-url </Www>
        <Occurrence id=" ">
            <Duration> start-frame-id end-frame-id </Duration>
            <Location> frame:[x1 y1 x2 y2] ... </Location>
            <Motion> vx vy vz vα vβ vγ </Motion>
            <Text> text-annotation </Text>
            <Audio> voice-annotation </Audio>
        </Occurrence>
        <Occurrence id=" ">
            <Duration> start-frame-id end-frame-id </Duration>
            <Location> frame:[x1 y1 x2 y2] ... </Location>
            <Motion> vx vy vz vα vβ vγ </Motion>
            <Text> text-annotation </Text>
            <Audio> voice-annotation </Audio>
        </Occurrence>
        ...
    </Object>
    ...
</ObjectProfile>
```

The descriptor <ObjectProfile> specifies the detailed information for certain objects in a program. Each object is specified by the descriptor <Object> with a name attribute. Each occurrence of a object is specified by the descriptor <Occurrence> with an id attribute which may be matched with a clip id under <CloseUpView>.

Color profile

```
<ColorProfile>
    ...
</ColorProfile>
```

The descriptor <ColorProfile> specifies the detailed color information of a program. All MPEG-7 color descriptors may be placed under here.

Texture profile

```
<TextureProfile>
    ...
</TextureProfile>
```

The descriptor <TextureProfile> specifies the detailed texture information of a program. All MPEG-7 texture descriptors may be placed under here.

Shape profile

```
<ShapeProfile>
    ...
</ShapeProfile>
```

The descriptor <ShapeProfile> specifies the detailed shape information of a program. All MPEG-7 shape descriptors may be placed under here.

Motion profile

```
<MotionProfile>
    ...
</MotionProfile>
```

The descriptor <MotionProfile> specifies the detailed motion information of a program. All MPEG-7 motion descriptors may be placed under here.

User Description Scheme

The proposed user description scheme includes three major sections for describing a user. The first section identifies the described user. The second section records a number of settings which may be preferred by the user. The third section records some statistics which may reflect certain usage patterns of the user. Therefore, the overall structure of the proposed description scheme is as follows:

```
<?XML version="1.0">
<!DOCTYPE MPEG-7 SYSTEM "mpeg-7.dtd">
<UserIdentity>
    <UserID> ... </UserID>
    <UserName> ... </UserName>
</UserIdentity>
<UserPreferences>
    <BrowsingPreferences> ... </BrowsingPreferences>
    <FilteringPreferences> ... </FilteringPreferences>
    <SearchPreferences> ... </SearchPreferences>
    <DevicePreferences> ... </DevicePreferences>
</UserPreferences>
<UserHistory>
    <BrowsingHistory> ... </BrowsingHistory>
    <FilteringHistory> ... </FilteringHistory>
    <SearchHistory> ... </SearchHistory>
    <DeviceHistory> ... </DeviceHistory>
</UserHistory>
<UserDemographics>
    <Age> ... </Age>
    <Gender> ... </Gender>
    <ZIP> ... </ZIP>
</UserDemographics>
```

User Identity
User ID
   <UserID> user-id </UserID>

The descriptor <UserID> contains a number or a string to identify a user.

User name
   <UserName> user-name </UserName>

The descriptor <UserName> specifies the name of a user.

User Preferences
Browsing preferences

```
<BrowsingPreferences>
    <Views>
        <ViewCategory id=" "> view-id ... </ViewCategory>
        <ViewCategory id=" "> view-id ... </ViewCategory>
        ...
    </Views>
    <FrameFrequency> frequency ...<FrameFrequency>
    <ShotFrequency> frequency ...<ShotFrequency>
    <KeyFrameLevel> level-id ...<KeyFrameLevel>
    <HighlightLength> length ...<HighlightLength>
    ...
</BrowsingPreferences>
```

The descriptor <BrowsingPreferences> specifies the browsing preferences of a user. The user's preferred views are specified by the descriptor <Views>. For each category, the preferred views are specified by the descriptor <ViewCategory> with an id attribute which corresponds to the category id. The descriptor <FrameFrequency> specifies at what interval the frames should be displayed on a browsing slider under the frame view. The descriptor <ShotFrequency> specifies at what interval the shots should be displayed on a browsing slider under the shot view. The descriptor <KeyFrameLevel> specifies at what level the key frames should be displayed on a browsing slider under the key frame view. The descriptor <HighlightLength> specifies which version of the highlight should be shown under the highlight view.

Filtering preferences

```
<FilteringPreferences>
    <Categories> category-name . . . </Categories>
    <Channels> channel-number . . . </Channels>
    <Ratings> rating-id . . . </Ratings>
    <Shows> show-name . . . </Shows>
    <Authors> author-name . . . </Authors>
    <Producers> producer-name . . . </Producers>
    <Directors> director-name . . . </Directors>
    <Actors> actor-name . . . </Actors>
    <Keywords> keyword . . . </Keywords>
    <Titles> title-text . . . </Titles>
    . . .
</FilteringPreferences>
```

The descriptor <FilteringPreferences> specifies the filtering related preferences of a user.

Search preferences

```
<SearchPreferences>
    <Categories> category-name . . . </Categories>
    <Channels> channel-number . . . </Channels>
    <Ratings> rating-id . . . </Ratings>
    <Shows> show-name . . . </Shows>
    <Authors> author-name . . . </Authors>
    <Producers> producer-name . . . </Producers>
    <Directors> director-name . . . </Directors>
    <Actors> actor-name . . . </Actors>
    <Keywords> keyword . . . </Keywords>
    <Titles> title-text . . . </Titles>
    . . .
</SearchPreferences>
```

The descriptor <SearchPreferences> specifies the search related preferences of a user.

Device preferences

```
<DevicePreferences>
    <Brightness> brightness-value </Brightness>
    <Contrast> contrast-value </Contrast>
    <Volume> volume-value </Volume>
</DevicePreferences>
```

The descriptor <DevicePreferences> specifies the device preferences of a user.

Usage History
Browsing history

```
<BrowsingHistory>
    <Views>
        <ViewCategory id=" "> view-id . . . </ViewCategory>
```

```
        <ViewCategory id=" "> view-id . . . </ViewCategory>
        . . .
    </Views>
    <FrameFrequency> frequency . . . <FrameFrequency>
    <ShotFrequency> frequency . . . <ShotFrequency>
    <KeyFrameLevel> level-id . . . <KeyFrameLevel>
    <HighlightLength> length . . . <HighlightLength>
    . . .
</BrowsingHistory>
```

The descriptor <BrowsingHistory> captures the history of a user's browsing related activities.

Filtering history

```
<FilteringHistory>
    <Categories> category-name . . . </Categories>
    <Channels> channel-number . . . </Channels>
    <Ratings> rating-id . . . </Ratings>
    <Shows> show-name . . . </Shows>
    <Authors> author-name . . . </Authors>
    <Producers> producer-name . . . </Producers>
    <Directors> director-name . . . </Directors>
    <Actors> actor-name . . . </Actors>
    <Keywords> keyword . . . </Keywords>
    <Titles> title-text . . . </Titles>
    . . .
</FilteringHistory>
```

The descriptor <FilteringHistory> captures the history of a user's filtering related activities.

Search history

```
<SearchHistory>
    <Categories> category-name . . . </Categories>
    <Channels> channel-number . . . </Channels>
    <Ratings> rating-id . . . </Ratings>
    <Shows> show-name . . . </Shows>
    <Authors> author-name . . . </Authors>
    <Producers> producer-name . . . </Producers>
    <Directors> director-name . . . </Directors>
    <Actors> actor-name . . . </Actors>
    <Keywords> keyword . . . </Keywords>
    <Titles> title-text . . . </Titles>
    . . .
</SearchHistory>
```

The descriptor <SearchHistory> captures the history of a user's search related activities.

Device history

```
<DeviceHistory>
    <Brightness> brightness-value . . . </Brightness>
    <Contrast> contrast-value . . . </Contrast>
    <Volume> volume-value . . . </Volume>
</DeviceHistory>
```

The descriptor <DeviceHistory> captures the history of a user's device related activities.

User demographics
Age
   <Age> age </Age>
The descriptor <Age> specifies the age of a user.
Gender
   <Gender> . . . </Gender>

The descriptor <Gender> specifies the gender of a user.

ZIP code

<ZIP> . . . </ZIP>

The descriptor <ZIP> specifies the ZIP code of where a user lives.

System Description Scheme

The proposed system description scheme includes four major sections for describing a user. The first section identifies the described system. The second section keeps a list of all known users. The third section keeps lists of available programs. The fourth section describes the capabilities of the system. Therefore, the overall structure of the proposed description scheme is as follows:

```
<?XML version="1.0">
<!DOCTYPE MPEG-7 SYSTEM "mpeg-7.dtd">
<SystemIdentity>
    <SystemID> . . . </SystemID>
    <SystemName> . . . </SystemName>
    <SystemSerialNumber> . . . </SystemSerialNumber>
</SystemIdentity>
<SystemUsers>
    <Users> . . . </Users>
</SystemUsers>
<SystemPrograms>
    <Categories> . . . </Categories>
    <Channels> . . . </Channels>
    <Programs> . . . </Programs>
</SystemPrograms>
<SystemCapabilities>
    <Views> . . . </Views>
</SystemCapabilities>
```

System Identity

System ID

<SystemID> system-id </SystemID>

The descriptor <SystemID> contains a number or a string to identify a video system or device.

System name

<SystemName> system-name </SystemName>

The descriptor <SystemName> specifies the name of a video system or device.

System serial number

<SystemSerialNumber> system-serial-number </SystemSerialNumber>

The descriptor <SystemSerialNumber> specifies the serial number of a video system or device.

System Users

Users

```
<Users>
    <User>
        <UserID> user-id </UserID>
        <UserName> user-name </UserName>
    </User>
    <User>
        <UserID> user-id </UserID>
        <UserName> user-name </UserName>
    </User>
    . . .
</Users>
```

The descriptor <SystemUsers> lists a number of users who have registered on a video system or device. Each user is specified by the descriptor <User>. The descriptor <UserID> specifies a number or a string which should match with the number or string specified in <UserID> in one of the user description schemes.

Programs in the System

Categories

```
<Categories>
    <Category>
        <CategoryID> category-id </CategoryID>
        <CategoryName> category-name </CategoryName>
        <SubCategories> sub-category-id . . . </SubCategories>
    </Category>
    <Category>
        <CategoryID> category-id </CategoryID>
        <CategoryName> category-name </CategoryName>
        <SubCategories> sub-category-id . . . </SubCategories>
    </Category>
    . . .
</Categories>
```

The descriptor <Categories> lists a number of categories which have been registered on a video system or device. Each category is specified by the descriptor <Category>. The major-sub relationship between categories is captured by the descriptor <SubCategories>.

Channels

```
<Channels>
    <Channel>
        <ChannelID> channel-id </ChannelID>
        <ChannelName> channel-name </ChannelName>
        <SubChannels> sub-channel-id . . . </SubChannels>
    </Channel>
    <Channel>
        <ChannelID> channel-id </ChannelID>
        <ChannelName> channel-name </ChannelName>
        <SubChannels> sub-channel-id . . . </SubChannels>
    </Channel>
    . . .
</Channels>
```

The descriptor <Channels> lists a number of channels which have been registered on a video system or device. Each channel is specified by the descriptor <Channel>. The major-sub relationship between channels is captured by the descriptor <SubChannels>.

Programs

```
<Programs>
    <CategoryPrograms>
        <CategoryID> category-id </CategoryID>
        <Programs> program-id . . . </Programs>
    </CategoryPrograms>
    <CategoryPrograms>
        <CategoryID> category-id </CategoryID>
        <Programs> program-id . . . </Programs>
    </CategoryPrograms>
    . . .
    <ChannelPrograms>
        <ChannelID> channel-id </ChannelID>
        <Programs> program-id . . . </Programs>
    </ChannelPrograms>
    <ChannelPrograms>
        <ChannelID> channel-id </ChannelID>
        <Programs> program-id . . . </Programs>
    </Channel Programs>
    . . .
</Programs>
```

The descriptor <Programs> lists programs who are available on a video system or device. The programs are grouped under corresponding categories or channels. Each group of programs are specified by the descriptor <CategoryPrograms> or <ChannelPrograms>. Each program id contained in the descriptor <Programs> should match with the number or string specified in <ProgramID> in one of the program description schemes.

System Capabilities

Views

```
<Views>
    <View>
        <ViewID> view-id </ViewID>
        <ViewName> view-name </ViewName>
    </View>
    <View>
        <ViewID> view-id </ViewID>
        <ViewName> view-name </ViewName>
    </View>
    ...
</Views>
```

The descriptor <Views> lists views which are supported by a video system or device. Each view is specified by the descriptor <View>. The descriptor <ViewName> contains a string which should match with one of the following views used in the program description schemes: ThumbnailView, SlideView, FrameView, ShotView, KeyFrameView, HighlightView, EventView, and CloseUpView.

Figure 13:
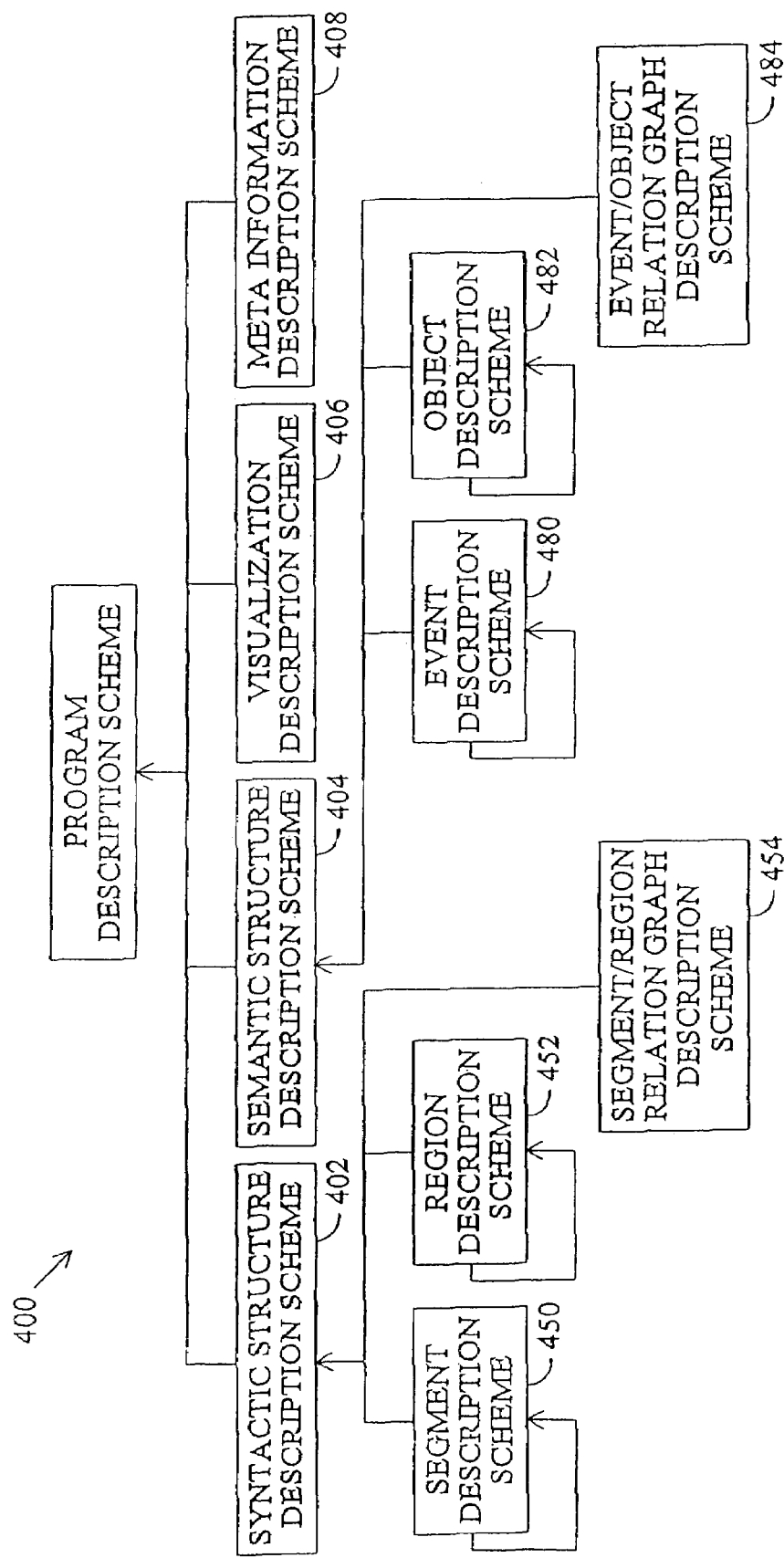
FIG. 13 is an alternative embodiment of a program description scheme including a syntactic structure description scheme, a semantic structure description scheme, a visualization description scheme, and a meta information description scheme.

The present inventors came to the realization that the program description scheme may be further modified to provide additional capabilities. Referring to FIG. 13, the modified program description scheme 400 includes four separate types of information, namely, a syntactic structure description scheme 402, a semantic structure description scheme 404, a visualization description scheme 406, and a meta information description scheme 408. It is to be understood that in any particular system one or more of the description schemes may be included, as desired.

Figure 14:
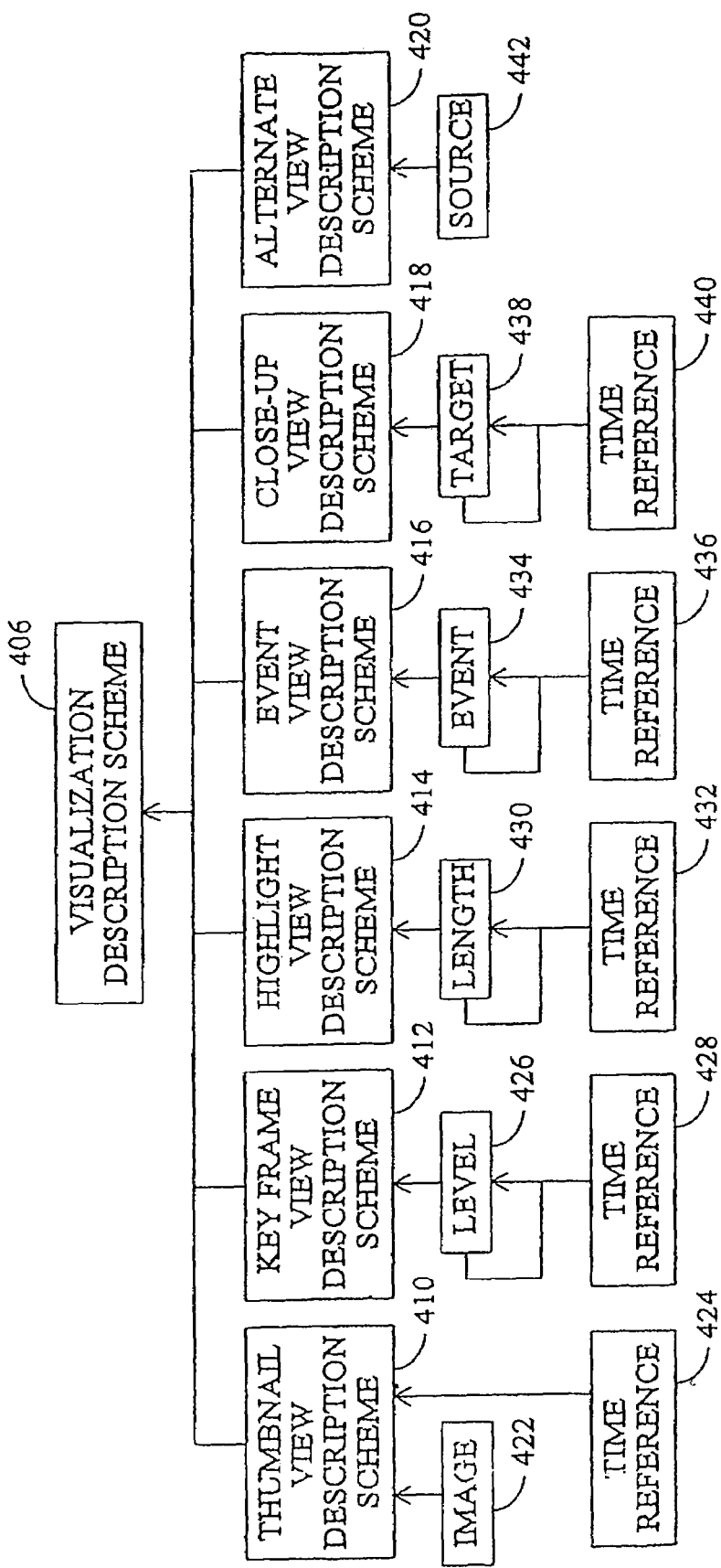
FIG. 14 is an exemplary embodiment of the visualization description scheme of FIG. 13.

Referring to FIG. 14, the visualization description scheme 406 enables fast and effective browsing of video program (and audio programs) by allowing access to the necessary data, preferably in a one-step process. The visualization description scheme 406 provides for several different presentations of the video content (or audio), such as for example, a thumbnail view description scheme 410, a key frame view description scheme 412, a highlight view description scheme 414, an event view description scheme 416, a close-up view description scheme 418, and an alternative view description scheme 420. Other presentation techniques and description schemes may be added, as desired. The thumbnail view description scheme 410 preferably includes an image 422 or reference to an image representative of the video content and a time reference 424 to the video. The key frame view description scheme 412 preferably includes a level indicator 426 and a time reference 428. The level indicator 426 accommodates the presentation of a different number of key frames for the same video portion depending on the user's preference. The highlight view description scheme 414 includes a length indicator 430 and a time reference 432. The length indicator 430 accommodates the presentation of a different highlight duration of a video depending on the user's preference. The event view description scheme 416 preferably includes an event indicator 434 for the selection of the desired event and a time reference 436. The close-up view description scheme 418 preferably includes a target indicator 438 and a time reference 440. The alternate view description scheme preferably includes a source indicator 442. To increase performance of the system it is preferred to specify the data which is needed to render such views in a centralized and straightforward manner. By doing so, it is then feasible to access the data in a simple one-step process without complex parsing of the video.

Figure 15:
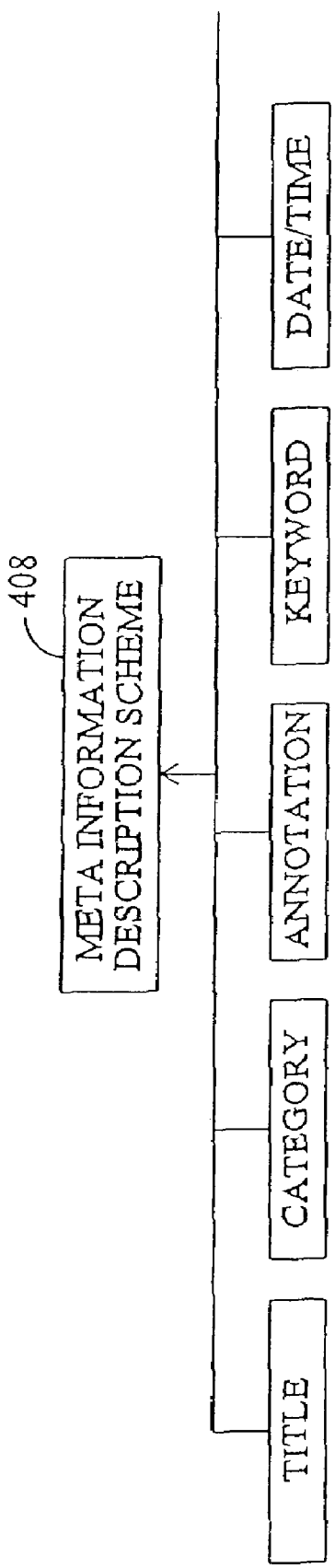
FIG. 15 is an exemplary embodiment of the meta information description scheme of FIG. 13.

Referring to FIG. 15, the meta information description scheme 408 generally includes various descriptors which carry general information about a video (or audio) program such as the title, category, keywords, etc. Additional descriptors, such as those previously described, may be included, as desired.

Figure 16:
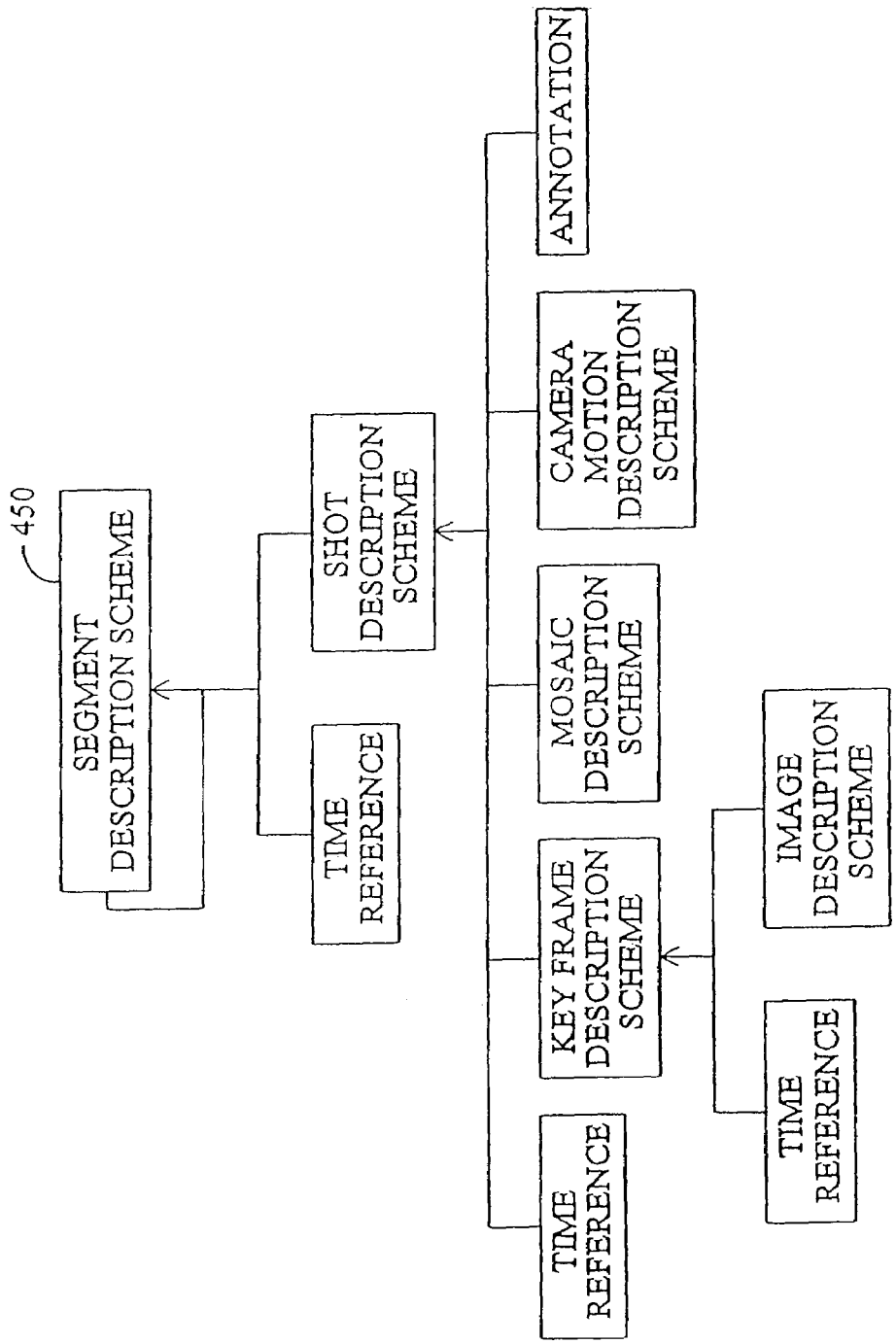
FIG. 16 is an exemplary embodiment of a segment description scheme for the syntactic structure description scheme of FIG. 13.

Referring again to FIG. 13, the syntactic structure description scheme 402 specifies the physical structure of a video program (or audio), e.g., a table of contents. The physical features, may include for example, color, texture, motion, etc. The syntactic structure description scheme 402 preferably includes three modules, namely a segment description scheme 450, a region description scheme 452, and a segment/region relation graph description scheme 454. The segment description scheme 450 may be used to define relationships between different portions of the video consisting of multiple frames of the video. A segment description scheme 450 may contain another segment description scheme 450 and/or shot description scheme to form a segment tree. Such a segment tree may be used to define a temporal structure of a video program. Multiple segment trees may be created and thereby create multiple table of contents. For example, a video program may be segmented into story units, scenes, and shots, from which the segment description scheme 450 may contain such information as a table of contents. The shot description scheme may contain a number of key frame description schemes, a mosaic description scheme(s), a camera motion description scheme(s), etc. The key frame description scheme may contain a still image description scheme which may in turn contains color and texture descriptors. It is noted that various low level descriptors may be included in the still image description scheme under the segment description scheme. Also, the visual descriptors may be included in the region description scheme which is not necessarily under a still image description scheme. On example of a segment description scheme 450 is shown in FIG. 16.

Referring to FIG. 17, the region description scheme 452 defines the interrelationships between groups of pixels of the same and/or different frames of the video. The region description scheme 452 may also contain geometrical features, color, texture features, motion features, etc.

Referring to FIG. 18, the segment/region relation graph description scheme 454 defines the interrelationships between a plurality of regions (or region description schemes), a plurality of segments (or segment description schemes), and/or a plurality of regions (or description schemes) and segments (or description schemes).

Figure 19:
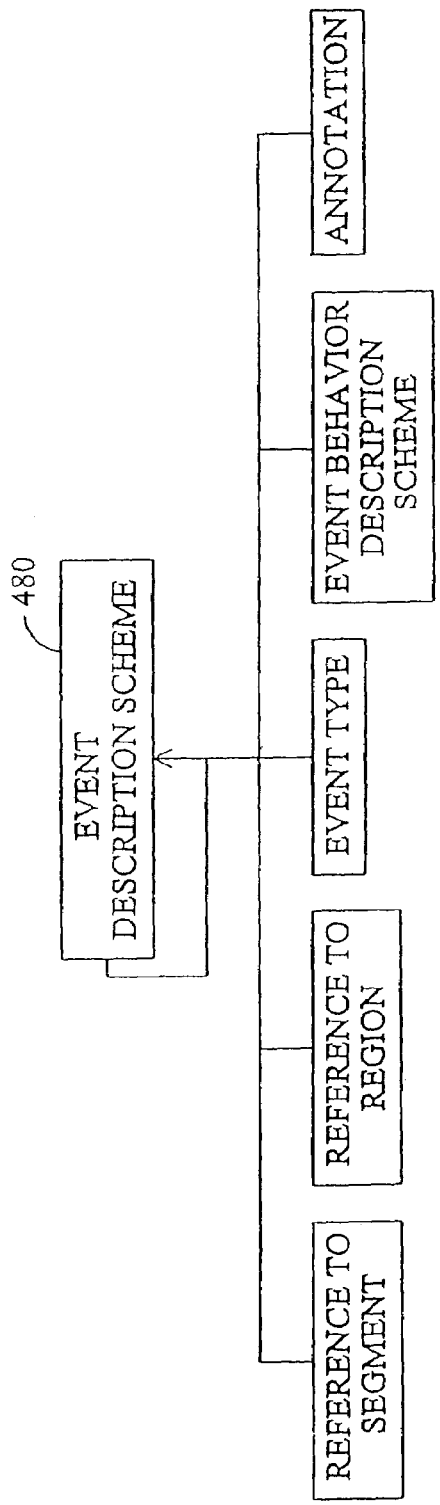
FIG. 19 is an exemplary embodiment of an event description scheme for the semantic structure description scheme of FIG. 13.

Referring again to FIG. 13, the semantic structure description scheme 404 is used to specify semantic features of a video program (or audio), e.g. semantic events. In a similar manner to the syntactic structure description scheme, the semantic structure description scheme 404 preferably includes three modules, namely an event description scheme 480, an object description scheme 482, and an event/objection relation graph description scheme 484. The event description scheme 480 may be used to form relationships between different events of the video normally consisting of multiple frames of the video. An event description scheme 480 may contain another event description scheme 480 to form a segment tree. Such an event segment tree may be used to define a semantic index table for a video program. Multiple event trees may be created and thereby creating multiple index tables. For example, a video program may include multiple events, such as a basketball dunk, a fast break, and a free throw, and the event description scheme may contain such information as an index table. The event description scheme may also contain references which link the event to the corresponding segments and/or regions specified in the syntactic structure description scheme. On example of an event description scheme is shown in FIG. 19.

Figure 20:
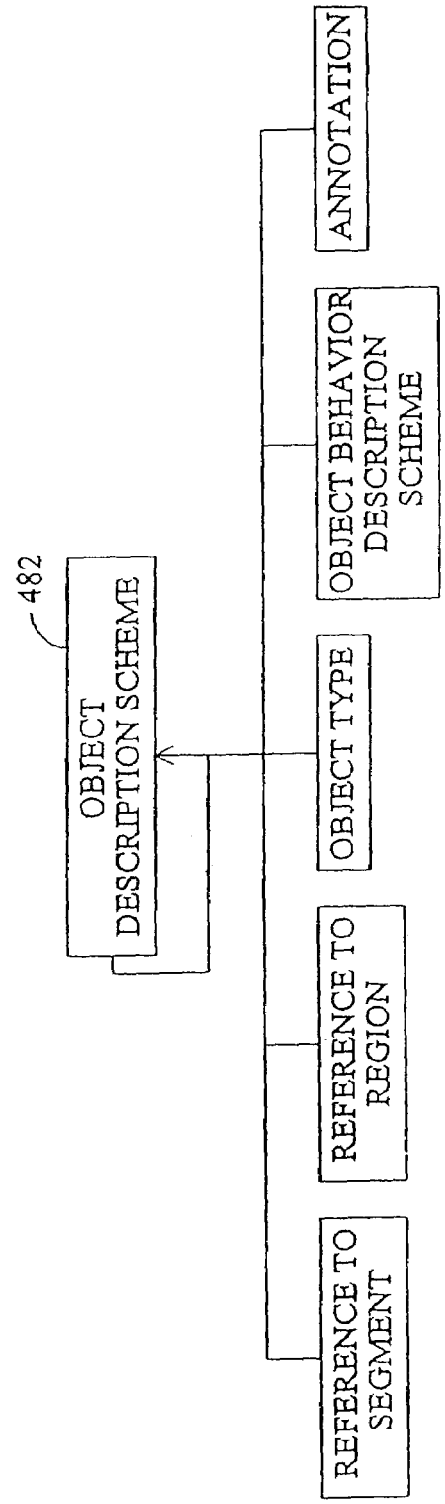
FIG. 20 is an exemplary embodiment of an object description scheme for the semantic structure description scheme of FIG. 13.

Referring to FIG. 20, the object description scheme 482 defines the interrelationships between groups of pixels of the same and/or different frames of the video representative of objects. The object description scheme 482 may contain another object description scheme and thereby form an object tree. Such an object tree may be used to define an object index table for a video program. The object description scheme may also contain references which link the object to the corresponding segments and/or regions specified in the syntactic structure description scheme.

Figure 21:
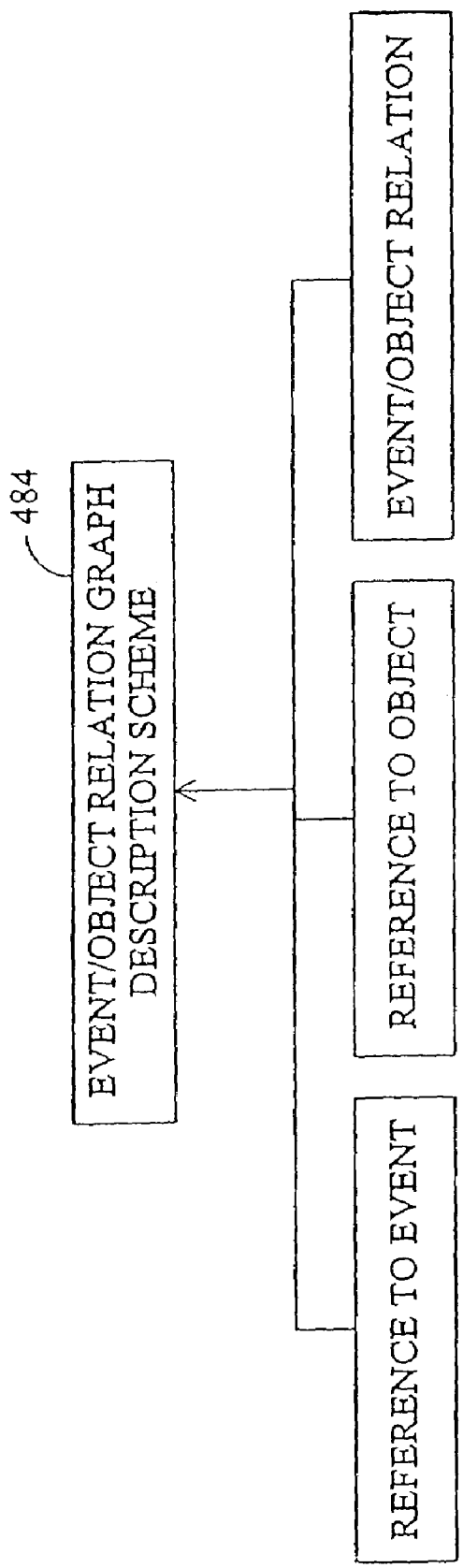
FIG. 21 is an exemplary embodiment of an event/object relation graph description scheme for the syntactic structure description scheme of FIG. 13.

Referring to FIG. 21, the event/object relation graph description scheme 484 defines the interrelationships between a plurality of events (or event description schemes), a plurality of objects (or object description schemes), and/or a plurality of events (or description schemes) and objects (or description schemes).

After further consideration, the present inventors came the realization that the particular design of the user preference description scheme is important to implement portability, while permitting adaptive updating, of the user preference description scheme. Moreover, the user preference description scheme should be readily usable by the system while likewise being suitable for modification based on the user's historical usage patterns. It is possible to collectively track all users of a particular device to build a database for the historical viewing preferences of the users of the device, and thereafter process the data dynamically to determine which content the users would likely desire. However, this implementation would require the storage of a large amount of data and the associated dynamic processing requirements to determine the user preferences. It is to be understood that the user preference description scheme may be used alone or in combination with other description scheme.

Figure 22:
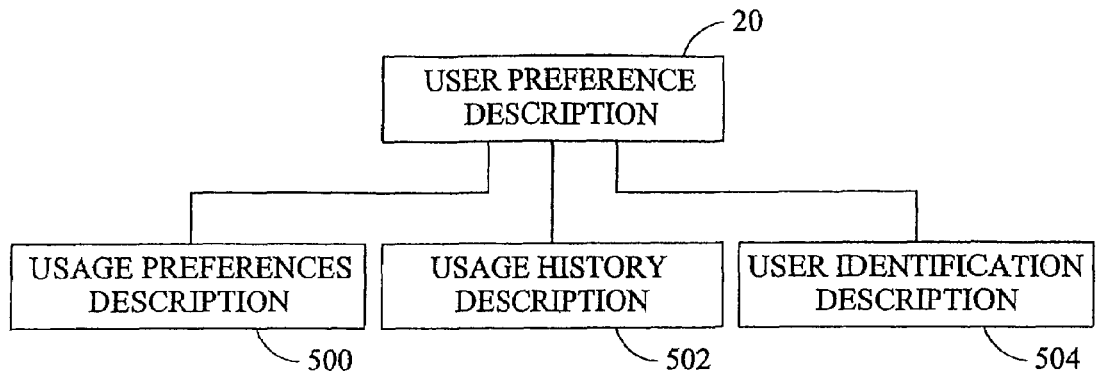
FIG. 22 is an exemplary embodiment of a user preference description scheme.

Referring to FIG. 22, to achieve portability and potentially decreased processing requirements the user preference description scheme 20 should be divided into at least two separate description schemes, namely, a usage preference description scheme 500 and a usage history description scheme 502. The usage preference description scheme 500, described in detail later, includes a description scheme of the user's audio and/or video consumption preferences. The usage preference description scheme 500 describes one or more of the following, depending on the particular implementation, (a) browsing preferences, (b) filtering preferences, (c) searching preferences, and (d) device preferences of the user. The type of preferences shown in the usage preference description scheme 500 are generally immediately usable by the system for selecting and otherwise using the available audio and/or video content. In other words, the usage preference description scheme 500 includes data describing audio and/or video consumption of the user. The usage history description scheme 502, described in detail later, includes a description scheme of the user's historical audio and/or video activity, such as browsing, device settings, viewing, and selection. The usage history description scheme 502 describes one or more of the following, depending on the particular implementation, (a) browsing history,(b) filtering history,(c) searching history, and (d) device usage history. The type of preferences shown in the usage history description scheme 502 are not generally immediately usable by the system for selecting and otherwise using the available audio and/or video content. The data contained in the usage history description scheme 502 may be considered generally "unprocessed", at least in comparison to the data contained in the usage preferences description scheme 500 because it generally contains the historical usage data of the audio and/or video content of the viewer.

In general, capturing the user's usage history facilitates "automatic" composition of user preferences by a machine, as desired. When updating the user preference description scheme 500 it is desirable that the usage history description scheme 502 be relatively symmetric to the usage preference description scheme 500. The symmetry permits more effective updating because less interpretation between the two description schemes is necessary in order to determine what data should be included in the preferences. Numerous algorithms can then be applied in utilization of the history information in deriving user preferences. For instance, statistics can be computed from the history and utilized for this purpose.

After consideration of the usage preference description 500 and the usage history description 502, the present inventors came to the realization that in the home environment many different users with different viewing and usage preferences may use the same device. For example, with a male adult preferring sports, a female adult preferring afternoon talk shows, and a three year old child preferring children's programming, the total information contained in the usage preference description 500 and the usage history description 502 will not be individually suitable for any particular user. The resulting composite data and its usage by the device is frustrating to the users because the device will not properly select and present audio and/or video content that is tailored to any particular user. To alleviate this limitation, the user preference description 20 may also include a user identification (user identifier) description 504. The user identification description 504 includes an identification of the particular user that is using the device. By incorporating a user identification description 504 more than one user may use the device while maintaining a different or a unique set of data within the usage preference description 500 and the usage history description 502. Accordingly, the user identification description 504 associates the appropriate usage preference description(s) 500 and usage history description(s) 502 for the particular user identified by the user identification description 504. With multiple user identification descriptions 504, multiple entries within a single user identification description 504 identifying different users, and/or including the user identification description within the usage preference description 500 and/or usage history description 502 to provide the association therebetween, multiple users can readily use the same device while maintaining their individuality. Also, without the user identification description in the preferences and/or history, the user may more readily customize content anonymously. In addition, the user's user identification description 504 may be used to identify multiple different sets of usage preference descriptions 500—usage history descriptions 502, from which the user may select for present interaction with the device depending on usage conditions. The use of multiple user identification descriptions for the same user is useful when the user uses dultiple different types of devices, such as a television, a home stereo, a business television, a hotel television, and a vehicle audio player, and maintains multiple different sets of preference descriptions. Further, the identification may likewise be used to identify groups of individuals, such as for example, a family. In addition, devices that are used on a temporary basis, such as those in hotel rooms or rental cars, the user identification requirements may be overridden by employing a temporary session user identification assigned by such devices. In applications where privacy concerns may be resolved or are otherwise not a concern, the user identification description 504 may also contain demographic information of the user. In this manner, as the usage history description 502 increases during use over time, this demographic data and/or data regarding usage patterns may be made available to other sources. The data may be used for any purpose, such as for example, providing targeted advertising or programming on the device based on such data.

Figure 23:
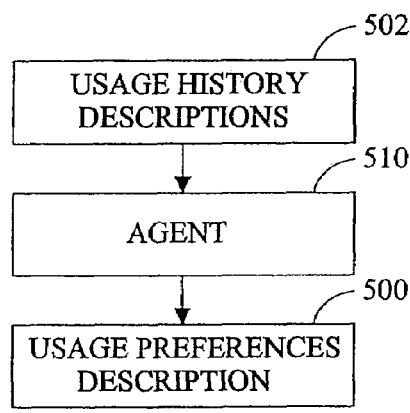
FIG. 23 is an exemplary embodiment of the interrelationship between a usage history description scheme, an agent, and the usage preference description scheme of FIG. 22.

Referring to FIG. 23, periodically an agent 510 processes the usage history description(s) 502 for a particular user to "automatically" determine the particular user's preferences. In this manner, the user's usage preference description 500 is updated to reflect data stored in the usage history description 502. This processing by the agent 510 is preferably performed on a periodic basis so that during normal operation the usage history description 502 does not need to be processed, or otherwise queried, to determine the user's current browsing, filtering, searching, and device preferences. The usage preference description 500 is relatively compact and suitable for storage on a portable storage device, such as a smart card, for use by other devices as previously described.

Frequently, the user may be traveling away from home with his smart card containing his usage preference description 500. During such traveling the user will likely be browsing, filtering, searching, and setting device preferences of audio and/or video content on devices into which he provided his usage preference description 500. However, in some circumstances the audio and/or video content browsed, filtered, searched, and device preferences of the user may not be typically what he is normally interested in. In addition, for a single device the user may desire more than one profile depending on the season, such as football season, basketball season, baseball season, fall, winter, summer, and spring. Accordingly, it may not be appropriate for the device to create a usage history description 502 and thereafter have the agent 510 "automatically" update the user's usage preference description 500. This will in effect corrupt the user's usage preference description 500. Accordingly, the device should include an option that disables the agent 510 from updating the usage preference description 500. Alternatively, the usage preference description 500 may include one or more fields or data structures that indicate whether or not the user desires the usage preference description 500 (or portions thereof) to be updated.

Figure 24:
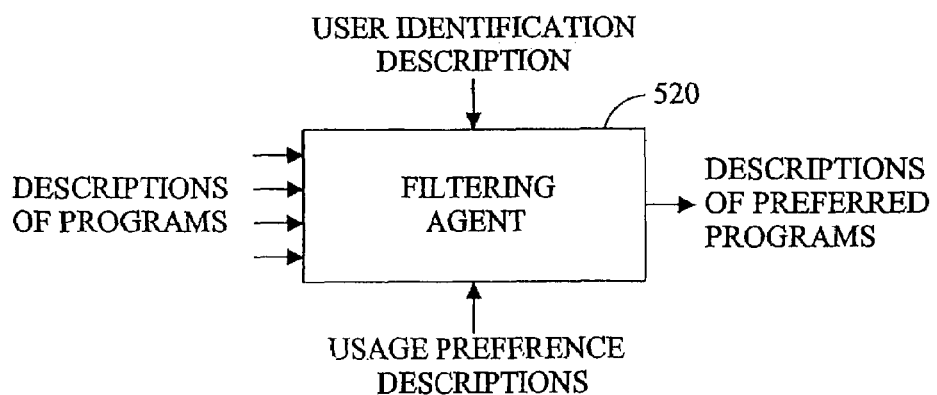
FIG. 24 is an exemplary embodiment of the interrelationship between audio and/or video programs together with their descriptors, user identification, and the usage preference description scheme of FIG. 22.

Referring to FIG. 24, the device may use the program descriptions provided by any suitable source describing the current and/or future audio and/or video content available from which a filtering agent 520 selects the appropriate content for the particular user(s). The content is selected based upon the usage preference description for a particular user identification(s) to determine a list of preferred audio and/or video programs.

As it may be observed, with a relatively compact user preference description 500 the user's preferences are readily movable to different devices, such as a personal video recorder, a TiVO player, a RePlay Networks player, a car audio player, or other audio and/or video appliance. Yet, the user preference description 500 may be updated in accordance with the user's browsing, filtering, searching, and device preferences.

Figure 25:
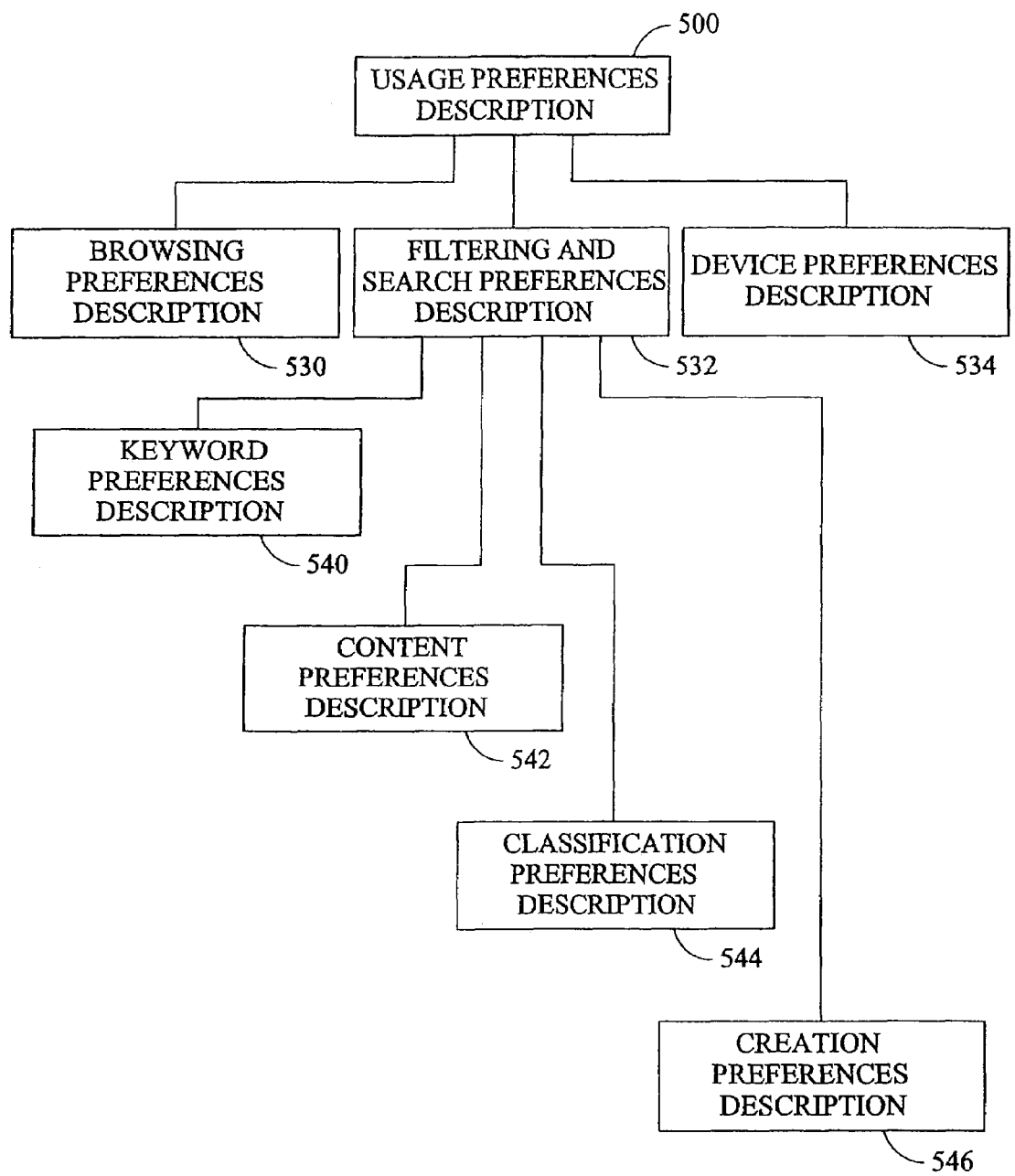
FIG. 25 is an exemplary embodiment of a usage preference description scheme of FIG. 22.

Referring to FIG. 25, the usage preference description 500 preferably includes three different categories of descriptions, depending on the particular implementation. The preferred descriptions include (a) browsing preferences description 530, (b) filtering and search preferences description, 532 and (c) device preferences description 534. The browsing preferences description 530 relates to the viewing preferences of audio and/or video programs. The filtering and search preferences description 532 relates to audio and/or video program level preferences. The program level preferences are not necessarily used at the same time as the (browsing) viewing preferences. For example, preferred programs can be determined as a result of filtering program descriptions according to user's filtering preferences. A particular preferred program may subsequently be viewed in accordance with user's browsing preferences. Accordingly, efficient implementation may be achieved if the browsing preferences description 530 is separate, at least logically, from the filtering and search preferences description 532. The device preferences description 534 relates to the preferences for setting up the device in relation to the type of content being presented, e.g. romance, drama, action, violence, evening, morning, day, weekend, weekday, and/or the available presentation devices. For example, presentation devices may include stereo sound, mono sound, surround sound, multiple potential displays, multiple different sets of audio speakers, AC-3, and Dolby Digital. It may likewise be observed that the device preferences description 534 is likewise separate, at least logically, from the browsing description 530 and filtering/search preferences description 532.

The browsing preferences description 530 contains descriptors that describe preferences of the user for browsing multimedia (audio and/or video) information. In the case of video, for example, the browsing preferences may include user's preference for continuous playback of the entire program versus visualizing a short summary of the program. Various summary types may be described in the program descriptions describing multiple different views of programs where these descriptions are utilized by the device to facilitate rapid non-linear browsing, viewing, and navigation. Parameters of the various summary types should also be specified, i.e., number of hierarchy levels when the keyframe summary is preferred, or the time duration of the video highlight when highlight summary is preferred. In addition, browsing preferences may also include descriptors describing parental control settings. A switch descriptor (set by the user) should also be included to specify whether or not the preferences can be modified without consulting the user first. This prevents inadvertent changing or updating of the preferences by the device. In addition, it is desirable that the browsing preferences are media content dependent. For example, a user may prefer 15 minute video highlight of a basketball game or may prefer to see only the 3-point shots. The same user may prefer a keyframe summary with two levels of hierarchy for home videos.

The filtering and search preferences description 532 preferably has four descriptions defined therein, depending on the particular embodiment. The keyword preferences description 540 is used to specify favorite topics that may not be captured in the title, category, etc., information. This permits the acceptance of a query for matching entries in any of the available data fields. The content preferences description 542 is used to facilitate capturing, for instance, favorite actors, directors. The creation preferences description 544 is used to specify capturing, for instance, titles of favorite shows. The classification preferences description 546 is used to specify descriptions, for instance, a favorite program category. A switch descriptor, activated by the user, may be included to specify whether or not the preferences may be modified without consulting the user, as previously described.

The device preferences description 534 contains descriptors describing preferred audio and/or video rendering settings, such as volume, balance, bass, treble, brightness, contrast, closed captioning, AC-3, Dolby digital, which display device of several, type of display device, etc. The settings of the device relate to how the user browses and consumes the audio and/or video content. It is desirable to be able to specify the device setting preferences in a media type and content-dependent manner. For example the preferred volume settings for an action movie may be higher than a drama, or the preferred settings of bass for classical music and rock music may be different. A switch descriptor, activated by the user, may be included to specify whether or not the preferences may be modified without consulting the user, as previously described.

Figure 26:
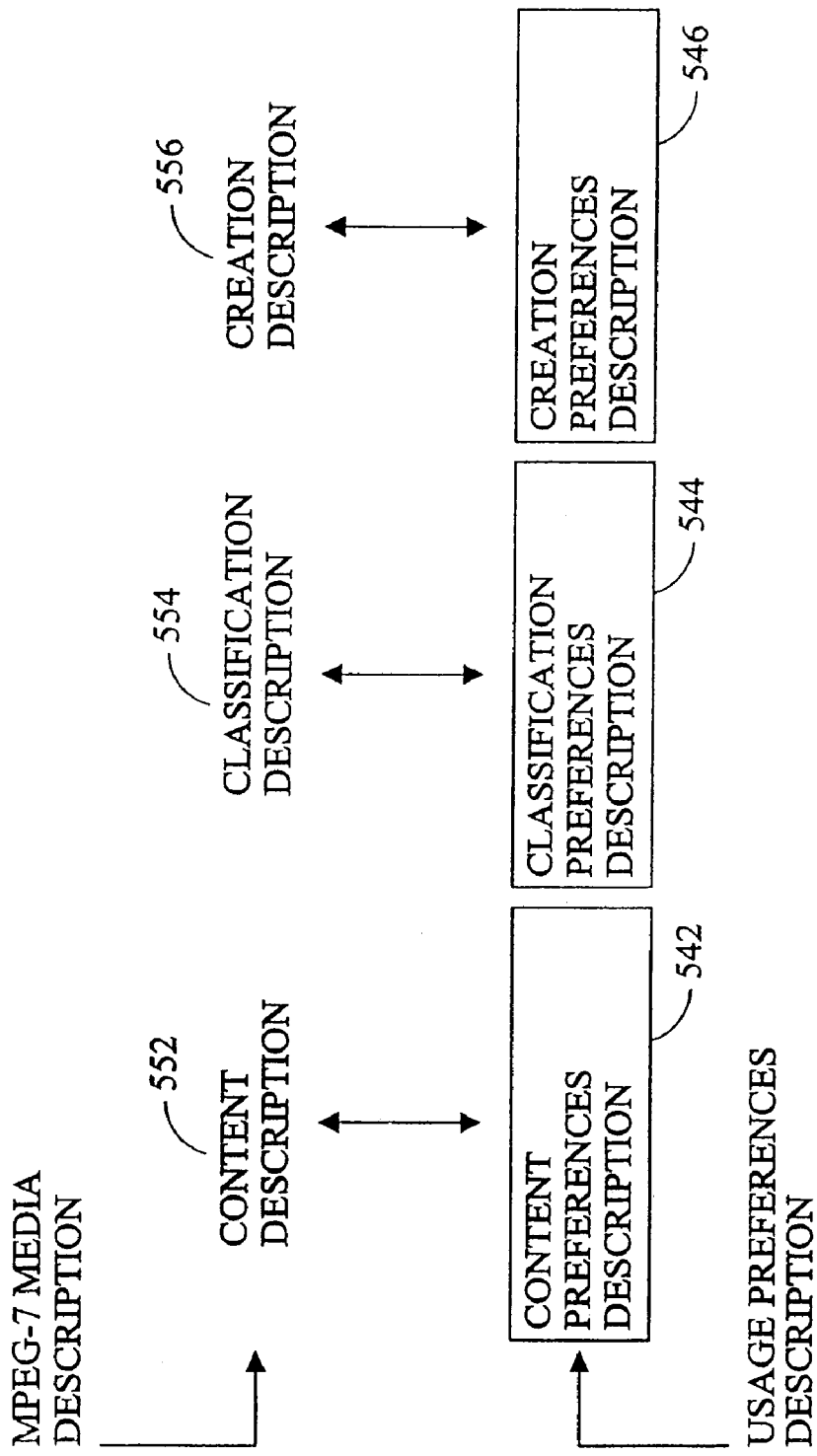
FIG. 26 is an exemplary embodiment of the interrelationship between the usage description schemes and an MPEG-7 description schemes.

Referring to FIG. 26, the usage preferences description may be used in cooperation with an MPEG-7 compliant data stream and/or device. MPEG-7 descriptions are described in ISO/IEC JTC1/SC29/WG11 "MPEG-7 Media/Meta DSs (V0.2), August 1999, incorporated by reference herein. It is preferable that media content descriptions are consistent with descriptions of preferences of users consuming the media. Consistency can be achieved by using common descriptors in media and user preference descriptions or by specifying a correspondence between user preferences and media descriptors. Browsing preferences descriptions are preferably consistent with media descriptions describing different views and summaries of the media. The content preferences description 542 is preferably consistent with, e.g., a subset of the content description of the media 553 specified in MPEG-7 by content description scheme. The classification preferences description 544 is preferably consistent with, e.g., a subset of the classification description 554 defined in MPEG-7 as classification description scheme. The creation preferences description 546 is preferably consistent with, e.g., a subset of the creation description 556 specified in MPEG-7 by creation description scheme. The keyword preferences description 540 is preferably a string supporting multiple languages and consistent with corresponding media content description schemes. Consistency between media and user preference descriptions is depicted or shown in FIG. 26 by double arrows in the case of content, creation, and classification preferences.

Figure 27:
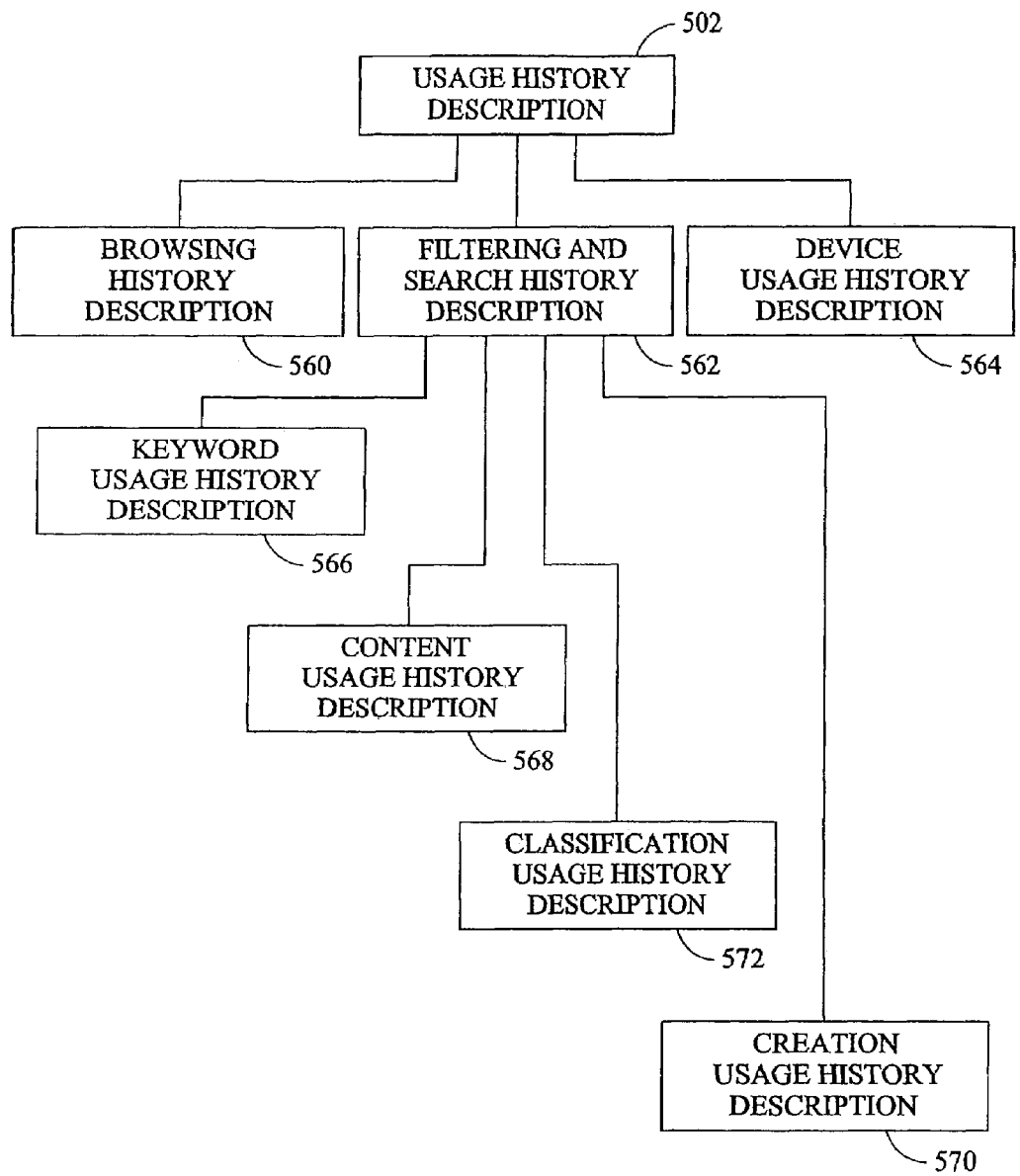
FIG. 27 is an exemplary embodiment of a usage history description scheme of FIG. 22.

Referring to FIG. 27, the usage history description 502 preferably includes three different categories of descriptions, depending on the particular implementation. The preferred descriptions include (a) browsing history description 560, (b) filtering and search history description 562, and (c) device usage history description 564, as previously described in relation to the usage preference description 500. The filtering and search history description 562 preferably has four descriptions defined therein, depending on the particular embodiment, namely, a keyword usage history description 566, a content usage history description 568, a creation preferences description 570, and a classification usage history description 572, as previously described with respect to the preferences. The usage history description 502 may contain additional descriptors therein (or description if desired) that describe the time and/or time duration of information contained therein. The time refers to the duration of consuming a particular audio and/or video program. The duration of time that a particular program has been viewed provides information that may be used to determine user preferences. For example, if a user only watches a show for 5 minutes then it may not be a suitable preference for inclusion the usage preference description 500. In addition, the present inventors came to the realization that an even more accurate measure of the user's preference of a particular audio and/or video program is the time viewed in light of the total duration of the program. This accounts for the relative viewing duration of a program. For example watching 30 minutes of a 4 hour show may be of less relevance than watching 30 minutes of a 30 minute show to determine preference data for inclusion in the usage preference description 500.

Figure 28:
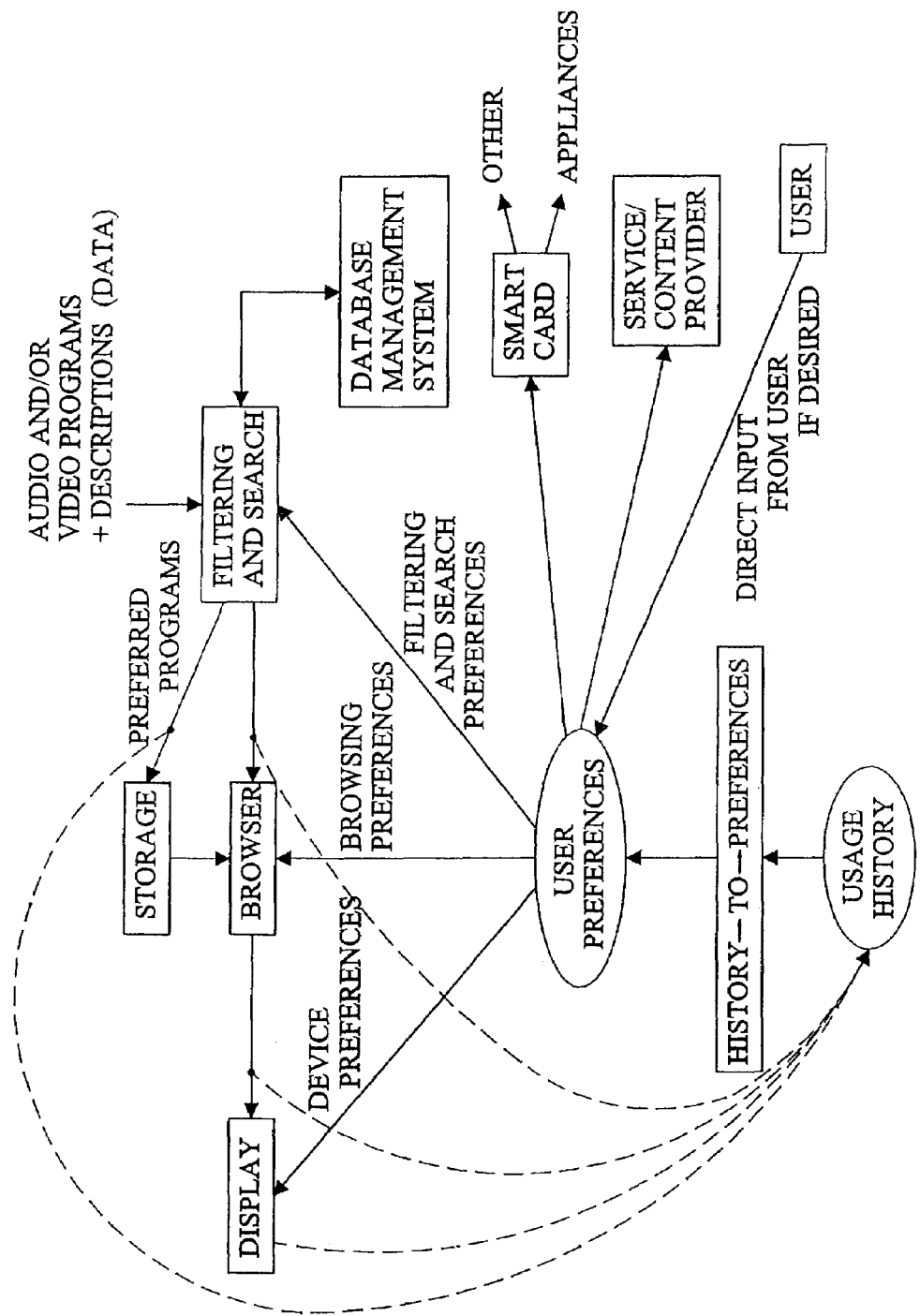
FIG. 28 is an exemplary system incorporating the user history description scheme.

Referring to FIG. 28, an exemplary example of an audio and/or video program receiver with persistent storage is illustrated. As shown, audio/video program descriptions are available from the broadcast or other source, such as a telephone line. The user preference description facilitate personalization of the browsing, filtering and search, and device settings. In this embodiment, the user preferences are stored at the user's terminal with provision for transporting it to other systems, for example via a smart card. Alternatively, the user preferences may be stored in a server and the content adaptation can be performed according to user descriptions at the server and then the preferred content is transmitted to the user. The user may directly provide the user preferences, if desired. The user preferences and/or user history may likewise be provided to a service provider. The system may employ an application that records user's usage history in the form of usage history description, as previously defined. The usage history description is then utilized by another application, e.g., a smart agent, to automatically map usage history to user preferences.

The terms and expressions that have been employed in the foregoing specification are sued as terms of description and not of limitation, and there is no intention, in the use of such terms and expressions, of excluding equivalents of the features shown and described or portions thereof, it being recognized that the scope of the invention is defined and limited only by the claims that follow.;

The invention claimed is:

1. A method of using a system with at least one of audio, image, and a video comprising a plurality of frames, wherein said at least one of audio, image, and a video is provided from a source, said method comprising the steps of:
  (a) providing a usage preferences description where said usage preferences description includes at least two of a browsing preferences description, a filtering preferences description, a search preferences description, and a device preferences description where,
    (i) said browsing preferences description that includes at least one descriptor that specifies a user's persistent, prospective viewing preferences with respect to at least one of: (1) fast forward browsing; (2) rewind browsing; (3) browsing of thumbnail views; (4) browsing of frame views; (5) browsing of shot views; (6) browsing of key frame views; and (7) browsing of highlight views;
    (ii) said filtering preferences description and said search preferences descriptions relate to at least one of (1) content preferences of said at least one of audio, image, and video, (2) classification preferences of said at least one of audio, image, and video, (3) keyword preferences of said at least one of audio, image, and video, and (4) creation preferences of said at least one of audio, image, and video; and
    (iii) said device preferences description relates to user's preferences regarding presentation characteristics of the presentation device;
  (b) providing a usage history description where said usage history description includes at least one of a browsing history description, a filtering history description, a search history description, and a device usage history description where,
    (i) said browsing history description relates to a user's browsing history with respect to at least one of: (1)

fast forward browsing; (2) rewind browsing; (3) browsing of thumbnail views; (4) browsing of frame views; (5) browsing of shot views; (6) browsing of key frame views; and (7) browsing of highlight views;
   (ii) said filtering history description and said search history descriptions relate to at least one of (1) content usage history of said at least one of audio, image, and video, (2) classification usage history of said at least one of audio, image, and video, (3) keyword usage history of said at least one of audio, image, and video, and (4) creation usage history of said at least one of audio, image, and video; and
   (iii) said device usage history description relates to a user's history regarding presentation characteristics of the presentation device; and
(c) updating said usage preferences description based on the content of said usage history description.

2. The method of claim 1 further comprising storing said usage preferences description on a removable storage device.

3. The method of claim 1 wherein said usage preferences description includes at least two of said browsing preferences description, said filtering preferences description, said search preferences description, and said device preferences description.

4. The method of claim 3 wherein said usage preferences description includes said browsing preferences description, said filtering preferences description, said search preferences description, and said device preferences description.

5. The method of claim 3 wherein said usage preferences description includes at least said browsing preferences description, said filtering preferences description, and said search preferences description.

6. The method of claim 3 wherein said usage preferences description includes at least said browsing preferences description, and said device preferences description.

7. The method of claim 3 wherein said usage preferences description includes at least said filtering preferences description, said search preferences description, and said device preferences description.

* * * * *

UNITED STATES PATENT AND TRADEMARK OFFICE
CERTIFICATE OF CORRECTION

PATENT NO. : 7,424,677 B2  Page 1 of 1
APPLICATION NO. : 10/977716
DATED : September 9, 2008
INVENTOR(S) : Muhammed Ibrahim Sezan et al.

It is certified that error appears in the above-identified patent and that said Letters Patent is hereby corrected as shown below:

Title page, item [57]
Abstract, line 8
Change "usage preference description" to --usage history description--.

Signed and Sealed this

Eleventh Day of November, 2008

JON W. DUDAS
*Director of the United States Patent and Trademark Office*